United States Patent
Ishibashi et al.

(10) Patent No.: US 7,693,174 B2
(45) Date of Patent: Apr. 6, 2010

(54) COMMUNICATION COLLISION AVOIDANCE SYSTEM

(75) Inventors: Yoshihito Ishibashi, Tokyo (JP); Susumu Kusakabe, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 582 days.

(21) Appl. No.: 11/452,968

(22) Filed: Jun. 15, 2006

(65) Prior Publication Data

US 2007/0026804 A1    Feb. 1, 2007

(30) Foreign Application Priority Data

Jun. 17, 2005   (JP)   ............... 2005-178427

(51) Int. Cl.
 *H04L 12/413*   (2006.01)
(52) U.S. Cl. ..................................... 370/445
(58) Field of Classification Search ............ 370/445
 See application file for complete search history.

(56) References Cited

U.S. PATENT DOCUMENTS

| | | | |
|---|---|---|---|
| 5,023,597 A | 6/1991 | Salisbury | |
| 5,164,707 A | 11/1992 | Rasmussen et al. | |
| 5,739,746 A | 4/1998 | Shaffer et al. | |
| 5,914,701 A | 6/1999 | Gersheneld et al. | |
| 5,987,438 A | 11/1999 | Nakano et al. | |
| 6,058,477 A | 5/2000 | Kusakabe et al. | |
| 6,195,008 B1 | 2/2001 | Bader | |
| 6,223,018 B1 | 4/2001 | Fukumoto et al. | |
| 6,611,195 B1 | 8/2003 | Manneschi et al. | |
| 6,897,788 B2 | 5/2005 | Khair et al. | |
| 7,152,799 B2 | 12/2006 | Nakabe | |
| 7,181,024 B1 | 2/2007 | Oba et al. | |
| 7,184,581 B2 | 2/2007 | Johansen et al. | |
| 7,260,436 B2 | 8/2007 | Kilgore et al. | |
| 2002/0065711 A1 | 5/2002 | Fujisawa et al. | |
| 2002/0146032 A1* | 10/2002 | Attimont et al. | ............ 370/448 |
| 2003/0137989 A1* | 7/2003 | Nagai | ............ 370/455 |
| 2004/0056811 A1 | 3/2004 | Pakray et al. | |
| 2006/0045118 A1* | 3/2006 | Hyoung et al. | ............ 370/445 |
| 2006/0077616 A1 | 4/2006 | Takiguchi | |
| 2006/0092908 A1 | 5/2006 | Sung et al. | |

(Continued)

FOREIGN PATENT DOCUMENTS

JP     7-20249     1/1995

(Continued)

*Primary Examiner*—Jason E Mattis
*Assistant Examiner*—Kibrom T Hailu
(74) *Attorney, Agent, or Firm*—Finnegan, Henderson, Farabow, Garrett & Dunner LLP

(57) ABSTRACT

A communication system equipped with a communication apparatus for transmitting a transmission signal to another communication apparatus via a communication medium, includes: transmission means for transmitting the transmission signal to the other communication apparatus via the communication medium; detection means for detecting a propagation signal propagated through the communication medium each time a predetermined amount of the transmission signal is transmitted from the transmission means; signal collision judgment means for judging from the propagation signal detected by the detection means whether a signal collision occurs on the communication medium between the transmission signal transmitted from the transmission means and another signal transmitted from the other communication apparatus; and control means for controlling transmission of the transmission signal from the transmission means in accordance with a judgment result by the signal collision judgment means.

10 Claims, 56 Drawing Sheets

U.S. PATENT DOCUMENTS

| | | | |
|---|---|---|---|
| 2007/0021077 A1* | 1/2007 | Amtmann et al. | 455/119 |
| 2007/0221725 A1 | 9/2007 | Kawaguchi | |
| 2007/0222599 A1 | 9/2007 | Coveley et al. | |

FOREIGN PATENT DOCUMENTS

| | | |
|---|---|---|
| JP | 10-229357 | 8/1998 |
| JP | 10-232283 | 9/1998 |
| JP | 11-509380 | 8/1999 |
| JP | 2001-134890 | 5/2001 |
| JP | 2001-144662 | 5/2001 |
| JP | 2002-009710 | 1/2002 |
| JP | 2003-063392 | 3/2003 |
| JP | 2003-163644 | 6/2003 |
| JP | 2003-317042 | 11/2003 |
| JP | 2004-145873 | 5/2004 |
| JP | 2004-214737 | 7/2004 |
| JP | 2004-282733 | 10/2004 |

* cited by examiner

| FREQUENCY f [Hz] | RECEPTION LOAD Rr [Ω] | CAPACITANCE [F] | EXECUTION VOLTAGE [V] |
|---|---|---|---|
| 1.0E+06 | 1.0E+04 | 1.0E-13 | 0.013 |
| 1.0E+06 | 1.0E+04 | 1.0E-12 | 0.125 |
| 1.0E+06 | 1.0E+04 | 1.0E-11 | 1.064 |
| 1.0E+06 | 1.0E+05 | 1.0E-13 | 0.125 |
| 1.0E+06 | 1.0E+05 | 1.0E-12 | 1.064 |
| 1.0E+06 | 1.0E+05 | 1.0E-11 | 1.975 |
| 1.0E+06 | 1.0E+06 | 1.0E-13 | 1.064 |
| 1.0E+06 | 1.0E+06 | 1.0E-12 | 1.975 |
| 1.0E+06 | 1.0E+06 | 1.0E-11 | 2.000 |
| 1.0E+07 | 1.0E+04 | 1.0E-13 | 0.125 |
| 1.0E+07 | 1.0E+04 | 1.0E-12 | 1.064 |
| 1.0E+07 | 1.0E+04 | 1.0E-11 | 1.975 |
| 1.0E+07 | 1.0E+05 | 1.0E-13 | 1.064 |
| 1.0E+07 | 1.0E+05 | 1.0E-12 | 1.975 |
| 1.0E+07 | 1.0E+05 | 1.0E-11 | 2.000 |
| 1.0E+07 | 1.0E+06 | 1.0E-13 | 1.975 |
| 1.0E+07 | 1.0E+06 | 1.0E-12 | 2.000 |
| 1.0E+07 | 1.0E+06 | 1.0E-11 | 2.000 |
| 1.0E+08 | 1.0E+04 | 1.0E-13 | 1.064 |
| 1.0E+08 | 1.0E+04 | 1.0E-12 | 1.975 |
| 1.0E+08 | 1.0E+04 | 1.0E-11 | 2.000 |
| 1.0E+08 | 1.0E+05 | 1.0E-13 | 1.975 |
| 1.0E+08 | 1.0E+05 | 1.0E-12 | 2.000 |
| 1.0E+08 | 1.0E+05 | 1.0E-11 | 2.000 |
| 1.0E+08 | 1.0E+06 | 1.0E-13 | 2.000 |
| 1.0E+08 | 1.0E+06 | 1.0E-12 | 2.000 |
| 1.0E+08 | 1.0E+06 | 1.0E-11 | 2.000 |

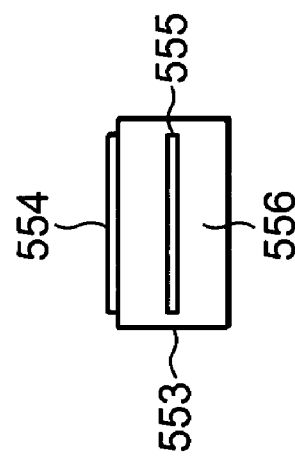
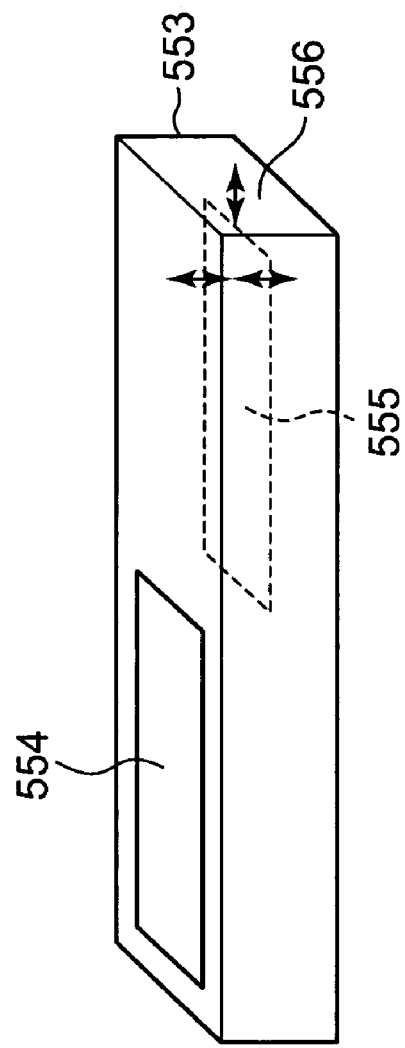
FIG. 17B
FIG. 17A

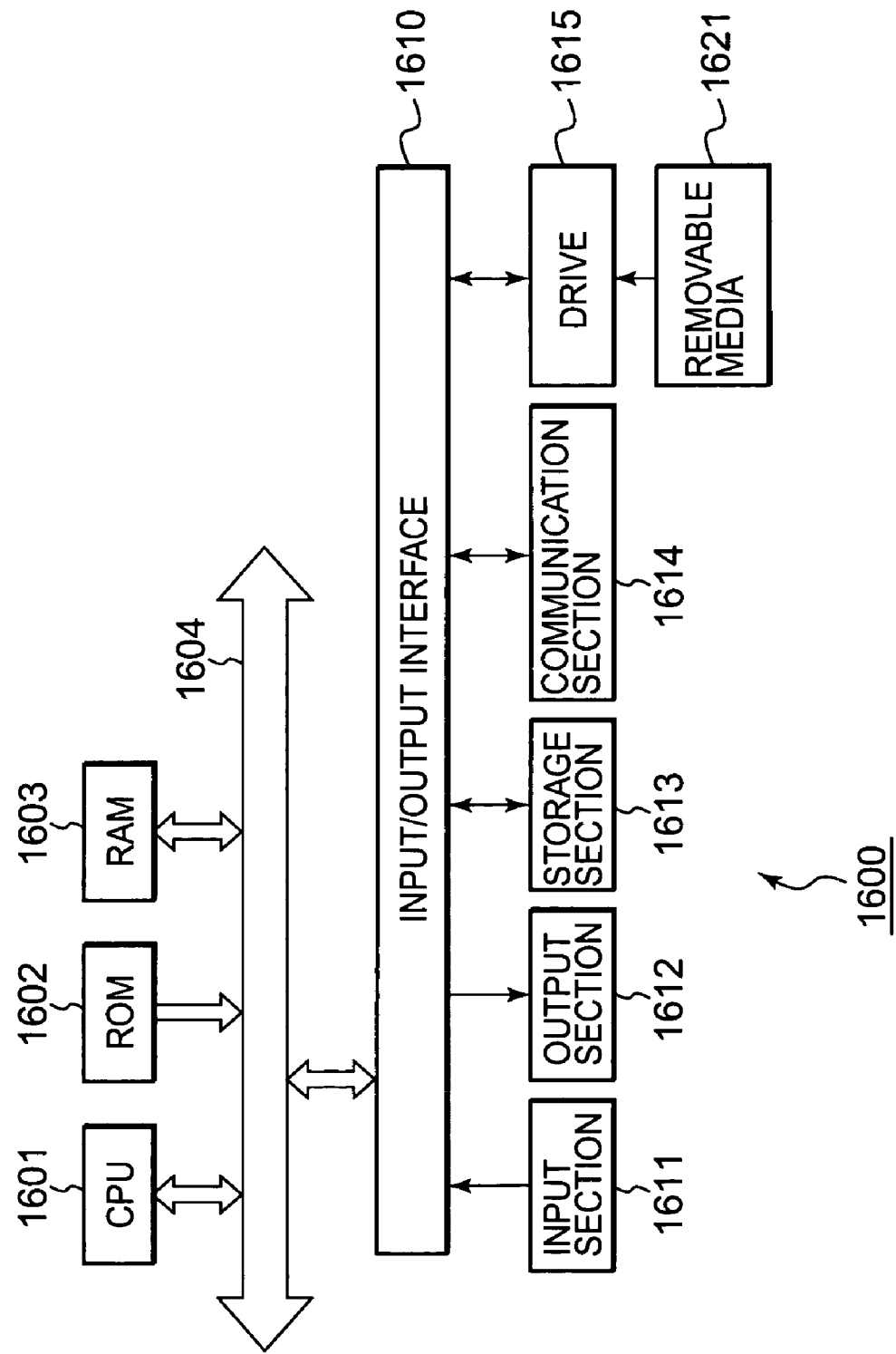

COMMUNICATION COLLISION AVOIDANCE SYSTEM

BACKGROUND OF THE INVENTION

1. Field of the Invention

The present invention relates to a communication system, a communication apparatus and method and a program, and more particularly to a communication system, a communication apparatus and method and a program capable of suppressing a communication process speed from being lowered by signal collision.

2. Description of Related Art

In a conventional communication system, as signals are transmitted from a plurality of transmission apparatus at the same time to the same communication medium, a signal collision occurs so that a reception apparatus cannot receive signals correctly in some cases. Particularly in the case wherein devices respond to a request transmitted from one device through broadcasting, there is a high possibility that response timings of the devices become coincident with each other, and a probability of signal collision occurrence becomes high.

For example, in a non-contact type IC card system for short distance wireless communications, when a reader/writer requests identification information from IC cards existing in a communicable range, the reader/writer transmits the request through broadcasting (transmits the request to many and unspecified IC cards). If there exist a plurality of IC cards in the range communicable with the reader/writer, each IC card responds to the request and transmits its identification information. However, since a possibility of coincident transmission timings becomes high, there is a high fear that the reader/writer cannot acquire correctly each identification information piece, because of signal collision occurrence.

In this connection, for example, there is a method of avoiding a signal collision by assigning a specific code and frequency to each device. However, if the number of devices (in this case, IC cards and a reader/writer) is large such as in a non-contact type IC card system for short distance wireless communications, codes and frequencies to be assigned become insufficient.

In this connection, there is a method of intentionally shifting timings of signal transmissions from devices by providing a communication process with time slots (for example, refer to Japanese Patent Application Publication No. 2003-317042). Namely, one signal transmission process is provided with a plurality of temporal transmission timings (time slots). When a signal is transmitted, each device generates a random number, and transmits the signal at the timing (time slot) corresponding to the generated random number. In this manner, it becomes possible to suppress a signal collision occurrence, because signal transmission timings are dispersed.

SUMMARY OF THE INVENTION

However, even with the method providing time slots, since a signal transmission timing is determined by a random number, there is a case wherein a signal collision occurs. In this case, a reader/writer repetitively requests identification information until signal collision is eliminated and correct identification information can be received. Namely, even with the above-described method providing time slots, there is a fear that if a signal collision occurs, a communication process speed lowers greatly.

Although it is possible to lower a probability of signal collision occurrence by further increasing the number of time slots, an increase in the number of time slots prolongs a time period assignable to the transmission process. Therefore, irrespective of presence/absence of a signal collision occurrence, there is a fear that the communication process time prolongs and a communication process speed lowers unnecessarily.

The present invention has been made under the circumstances described above, and suppresses a communication process speed from being lowered by a signal collision.

According to an embodiment of the present invention, there is provided a communication system equipped with a communication apparatus for transmitting a transmission signal to another communication apparatus via a communication medium, wherein the communication apparatus comprises: transmission means for transmitting the transmission signal to the other communication apparatus via the communication medium; detection means for detecting a propagation signal propagated through the communication medium each time a predetermined amount of the transmission signal is transmitted from the transmission means; signal collision judgment means for judging from the propagation signal detected by the detection means whether a signal collision occurs on the communication medium between the transmission signal transmitted from the transmission means and another signal transmitted from the other communication apparatus; and control means for controlling transmission of the transmission signal from the transmission means in accordance with a judgment result by the signal collision judgment means.

According to another embodiment of the present invention, there is provided a communication apparatus for transmitting a transmission signal to another communication apparatus via a communication medium, comprising: transmission means for transmitting the transmission signal to the other communication apparatus via the communication medium; detection means for detecting a propagation signal propagated through the communication medium each time a predetermined amount of the transmission signal is transmitted from the transmission means; signal collision judgment means for judging from the propagation signal detected by the detection means whether a signal collision occurs on the communication medium between the transmission signal transmitted from the transmission means and another signal transmitted from the other communication apparatus; and control means for controlling transmission of the transmission signal from the transmission means in accordance with a judgment result by the signal collision judgment means.

The detection means may detect the propagation signal each time one bit of the transmission signal is transmitted from the transmission means.

The signal collision judgment means may compare the propagation signal detected by the detection means with the transmission signal transmitted from the transmission means, and if features of the propagation signal and the transmission signal are not coincident, may judge that the signal collision occurred.

The control means may control the transmission means to stop transmission of the transmission signal, if the signal collision judgment means judges that the signal collision occurred.

If the signal collision judgment means judges that the signal collision occurred, the control means may control a transmission timing of the transmission signal from the transmission means in a next transmission event, in accordance with a value of the transmission signal transmitted from the transmission means when the signal collision occurred.

The control means may control the transmission timing earlier or later, if the value of the transmission signal transmitted from the transmission means when the signal collision occurred is a predetermined value.

If the signal collision judgment means judges that the signal collision occurred, the control means may control to increase the number of time slots corresponding to a transmission timing of the transmission means more than the number of present time slots, in a next transmission event.

The transmission means may transmit the transmission signal in one of two time slots corresponding to prepared transmission timings.

According to another embodiment of the present invention, there is provided a communication method for a communication apparatus for transmitting a transmission signal to another communication apparatus via a communication medium, comprising: a transmission step of transmitting the transmission signal to the other communication apparatus via the communication medium; a detection step of detecting a propagation signal propagated through the communication medium each time a predetermined amount of the transmission signal is transmitted under control of a process of the transmission step; a signal collision judgment step of judging from the propagation signal detected under control of a process of the detection step whether a signal collision occurs on the communication medium between the transmission signal transmitted under control of the process of the transmission step and another signal transmitted from the other communication apparatus; and a control step of controlling transmission of the transmission signal from the transmission means in accordance with a judgment result by the signal collision judgment step.

According to another embodiment of the present invention, there is provided a program for making a computer execute a process of transmitting a transmission signal to another communication apparatus via a communication medium, comprising: a transmission step of transmitting the transmission signal to the other communication apparatus via the communication medium; a detection step of detecting a propagation signal propagated through the communication medium each time a predetermined amount of the transmission signal is transmitted under control of a process of the transmission step; a signal collision judgment step of judging from the propagation signal detected under control of a process of the detection step whether a signal collision occurs on the communication medium between the transmission signal transmitted under control of the process of the transmission step and another signal transmitted from the other communication apparatus; and a control step of controlling transmission of the transmission signal from the transmission means in accordance with a judgment result by the signal collision judgment step.

The communication system of the present invention is equipped with a communication apparatus for transmitting a transmission signal to another communication apparatus via a communication medium, and in the communication apparatus, the transmission signal is transmitted to the other communication apparatus via the communication medium, a propagation signal propagated through the communication medium is detected each time a predetermined amount of the transmission signal is transmitted, it is judged from the propagation signal detected by the detection means whether a signal collision occurs on the communication medium between the transmitted transmission signal and another signal transmitted from the other communication apparatus, and transmission of the transmission signal is controlled means in accordance with a judgment result.

In the communication apparatus, method and program of the present invention, the transmission signal is transmitted to the other communication apparatus via the communication medium, a propagation signal propagated through the communication medium is detected each time a predetermined amount of the transmission signal is transmitted, it is judged from the propagation signal detected by the detection means whether a signal collision occurs on the communication medium between the transmitted transmission signal and another signal transmitted from the other communication apparatus, and transmission of the transmission signal is controlled means in accordance with a judgment result.

According to the present invention, it is possible to suppress a communication process speed from being lowered by a signal collision.

BRIEF DESCRIPTION OF THE DRAWINGS

The present invention will become more readily appreciated and understood from the following detailed description of embodiments and examples of the present invention when taken in conjunction with the accompanying drawings, in which:

FIG. 3 is a table showing an example of the calculation result of effective values of the voltage produced across a reception load resistor in the model shown in FIG. 2;

FIG. 17A is a schematic view showing another example of locations at which individual electrodes are disposed;

FIG. 17B is a schematic view showing another example of locations at which individual electrodes are disposed;

FIG. 61 is a diagram showing an example of the structure of a personal computer adopting the present invention.

DETAILED DESCRIPTION OF EMBODIMENTS

In the following description of the embodiments of the present invention, the correspondence between the disclosed inventions and the embodiments is as follows. The description is used for confirming that the embodiments supporting the inventions described in this specification are described in the specification. Therefore, the embodiment described in this specification as not corresponding to some invention is not intended to mean that the embodiment does not correspond to the invention. Conversely, the embodiment described in this specification as corresponding to some invention is not intended to mean that the embodiment does not correspond to the invention other than some invention.

Further, the description is not intended to cover all the inventions described in the specification. In other words, it is not intended to deny the presence of the invention described in this specification but not claimed in this application, i.e., to deny the presence of the invention which may be divisionally submitted in the future and the invention emerging through corrections and additionally submitted in the future.

Figure 34:
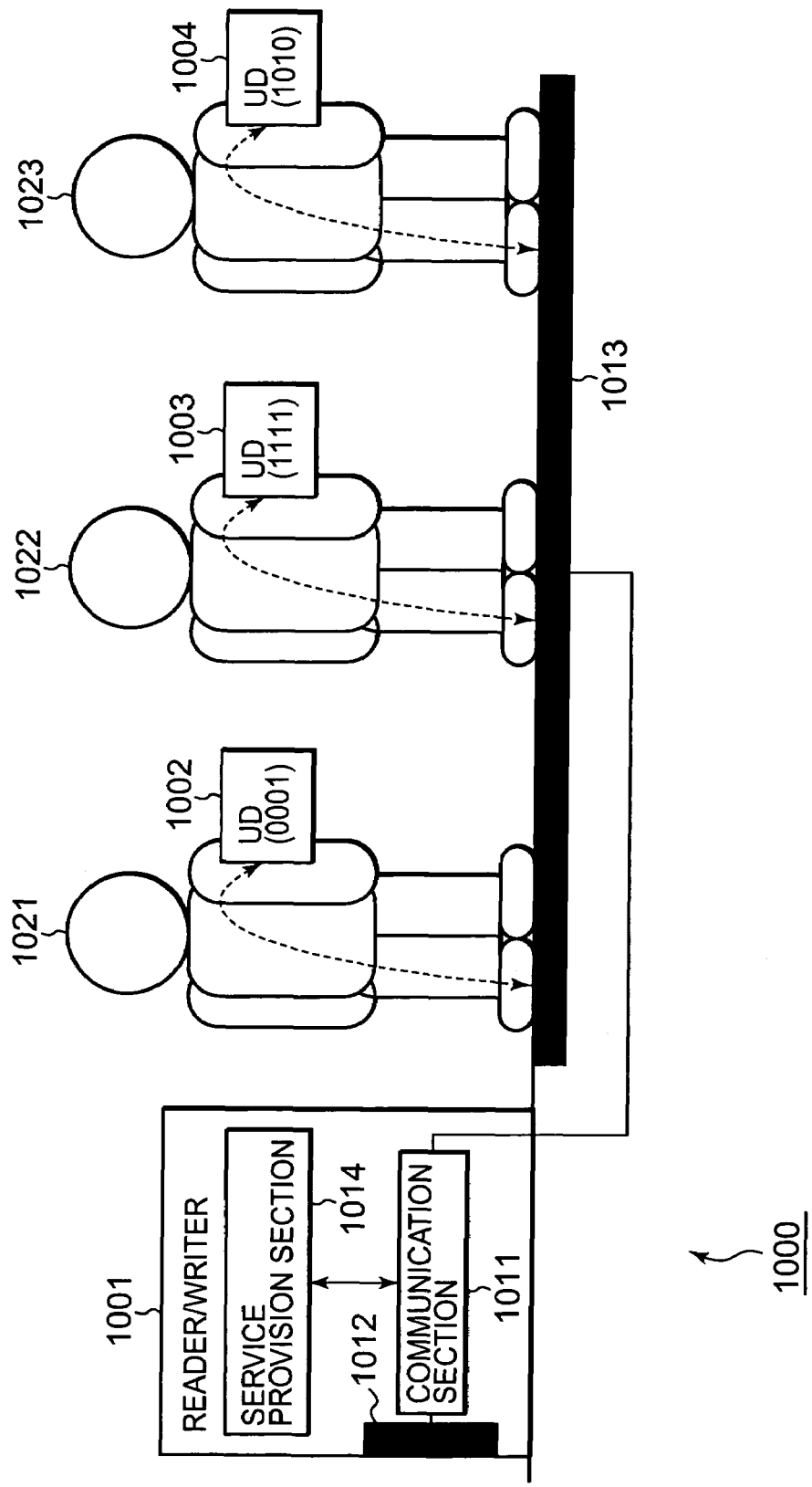
FIG. 34 is a diagram illustrating an actual use example of a communication system according to an embodiment adopting the present invention.

The present invention provides a communication system (e.g., communication system shown in FIG. 34) equipped with a communication apparatus (e.g., UD shown in FIG. 34) for transmitting a transmission signal to another communication apparatus (e.g., reader/writer shown in FIG. 34) via a communication medium (e.g., user shown in FIG. 34). In the communication system, the communication apparatus comprises: transmission means (e.g., bit output section shown in FIG. 34) for transmitting the transmission signal to the other communication apparatus via the communication medium; detection means (e.g., signal detection section shown in FIG. 38) for detecting a propagation signal propagated through the communication medium each time a predetermined amount of the transmission signal is transmitted from the transmission means; signal collision judgment means (e.g., collision judgment section shown in FIG. 38) for judging from the propagation signal detected by the detection means whether a signal collision occurs on the communication medium between the transmission signal transmitted from the transmission means and another signal transmitted from the other communication apparatus; and control means (e.g., output control section shown in FIG. 38) for controlling transmission of the transmission signal from the transmission means in accordance with a judgment result by the signal collision judgment means.

The present invention provides a communication apparatus (e.g., UD shown in FIG. 34) for transmitting a transmission signal to another communication apparatus (e.g., reader/writer shown in FIG. 34) via a communication medium (e.g., user shown in FIG. 34). The communication apparatus comprises: transmission means (e.g., bit output section shown in FIG. 34) for transmitting the transmission signal to the other communication apparatus via the communication medium; detection means (e.g., signal detection section shown in FIG. 38) for detecting a propagation signal propagated through the communication medium each time a predetermined amount of the transmission signal is transmitted from the transmission means; signal collision judgment means (e.g., collision judgment section shown in FIG. 38) for judging from the propagation signal detected by the detection means whether a signal collision occurs on the communication medium between the transmission signal transmitted from the transmission means and another signal transmitted from the other communication apparatus; and control means (e.g., output control section shown in FIG. 38) for controlling transmission of the transmission signal from the transmission means in accordance with a judgment result by the signal collision judgment means.

Also in the program of the present invention, an embodiment (one example, however) corresponding to each step is similar to the communication method of the present invention.

Embodiments of the present invention will be described with reference to the accompanying drawings. First, with reference to FIGS. 1 to 33, description will be made on a communication system as an example of a communication system adopting the present invention, the communication system realizing communications only by a communication signal transmission path without a necessity of a physical reference point route and without restrictions of use environments.

Figure 1:
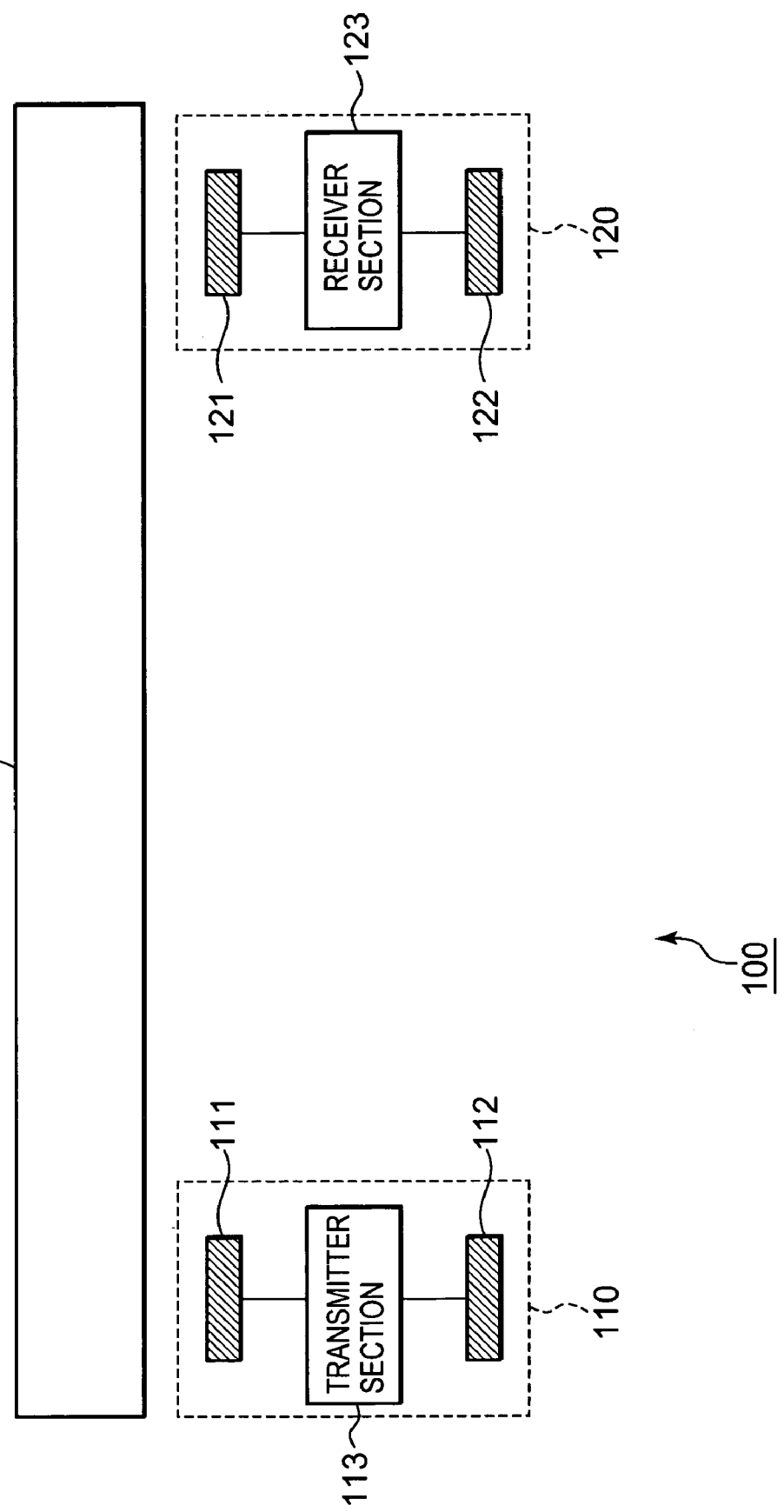
FIG. 1 is a block diagram showing a construction example of one embodiment of a communication system which underlies the present invention.

FIG. 1 is a diagram showing an example of the structure of a communication system realizing communications only by a communication signal transmission path without a necessity of a physical reference point route Referring to FIG. 1, a communication system 100 is a system which includes a transmitter 110, a receiver 120, and a communication medium 130, and causes the transmitter 110 and the receiver 120 to transmit and receive signals therebetween via the communication medium 130. Namely, in the communication system 100, a signal transmitted from the transmitter 110 is transmitted via the communication medium 130 and is received by the receiver 120.

The transmitter 110 has a transmission signal electrode 111, a transmission reference electrode 112, and a transmitter section 113. The transmission signal electrode 111 is an electrode for transmitting a signal to be transmitted via the communication medium 130, and is provided to have a stronger capacitive coupling to the communication medium 130 than to the transmission reference electrode 112 which is an electrode for obtaining a reference point for making a decision as to the difference in level between signals. The transmitter section 113 is provided between the transmission signal electrode 111 and the transmission reference electrode 112, and applies an electrical signal (potential difference) to be transmitted to the receiver 120, between the transmission signal electrode 111 and the transmission reference electrode 112.

The receiver 120 has a reception signal electrode 121, a reception reference electrode 122, and a receiver section 123. The reception signal electrode 121 is an electrode for receiving a signal transmitted via the communication medium 130, and is provided to have a stronger capacitive coupling to the communication medium 130 than to the reception reference electrode 122 which is an electrode for obtaining a reference point for making a decision as to the difference in level between signals. The receiver section 123 is provided between the reception signal electrode 121 and the reception reference electrode 122, and converts an electrical signal (potential difference) produced between the reception signal electrode 121 and the reception reference electrode 122 into a desired electrical signal to restore the electrical signal generated by the transmitter section 113 of the transmitter 110.

The communication medium 130 is made of a substance having a physical characteristic capable of transmitting electrical signals, for example, an electrically conductive material or a dielectric material. The communication medium 130 is made of, for example, an electrically conductive material (such as copper, iron or aluminum). Otherwise, the communication medium 130 is made of pure water, rubber, glass or an electrolytic solution such as a saline solution, or a dielectric material such as a human body which is a complex of these materials. The communication medium 130 may have any shape, for example, a linear shape, a planar shape, a spherical shape, a prismatic shape, a cylindrical shape or another arbitrary shape.

First of all, the relationship between each of the electrodes and spaces neighboring the communication medium or the devices in the communication system 100 will be described below. In the following description, for convenience of explanation, it is assumed that the communication medium 130 is a perfect conductor. In addition, it is assumed that spaces exist between the transmission signal electrode 111 and the communication medium 130 and between the reception signal electrode 121 and the communication medium 130, respectively, so that there is no electrical coupling between the transmission signal electrode 111 and the communication medium 130 nor between the reception signal electrode 121 and the communication medium 130. Namely, a capacitance is formed between the communication medium 130 and each of the transmission signal electrode 111 and the reception signal electrode 121.

The transmission reference electrode 112 is provided to face a space neighboring the transmitter 110, while the reception reference electrode 122 is provided to face a space neighboring the receiver 120. In general, if a conductor exists in a space, a capacitance is formed in a space neighboring the surface of the conductor. For example, if the shape of the conductor is a sphere of radius r [m], a capacitance C is found from the following formula (1):

[Formula 1]

$$C = 4 \times \pi \times \in \times r \quad (1)$$

In formula (1), π denotes the circular constant of the conductor and ∈ denotes the dielectric constant of the space surrounding the conductor. The dielectric constant ∈ is found from the following formula (2):

[Formula 2]

$$\in = \in_r \times \in_0 \quad (2)$$

In formula (2), ∈0 denotes a vacuum dielectric constant which is $8.854 \times 10^{-12}$ [F/m], and ∈r denotes a specific dielectric constant which represents the ratio of the dielectric constant ∈ to the vacuum dielectric constant ∈0.

As shown by the above-mentioned formula (1), the larger the radius r, the larger the capacitance C. In addition, the magnitude of the capacitance C of a conductor having a complex shape other than a sphere may not be easily expressed in a simple form such as the above-mentioned formula (1), but it is apparent that the magnitude of the capacitance C varies according to the magnitude of the surface area of the conductor.

As mentioned above, the transmission reference electrode 112 forms the capacitance with respect to the space neighboring the transmitter 110, while the reception reference electrode 122 forms the capacitance with respect to the space neighboring the receiver 120. Namely, as viewed from an imaginary infinity point outside each of the transmitter 110 and the receiver 120, the potential at the corresponding one of the transmission reference electrode 112 and the reception reference electrode 122 is fixed and does not easily vary.

The principle of communication in the communication system 100 will be described below. In the following description, for convenience of explanation, the term "capacitor" will be expressed simply as "capacitance" according to context, but these terms have the same meaning.

In the following description, it is assumed that the transmitter 110 and the receiver 120 shown in FIG. 1 are arranged to maintain a sufficient distance therebetween so that their mutual influence can be neglected. In the transmitter 110, it is assumed that the transmission signal electrode 111 is capacitively coupled to only the communication medium 130 and the transmission reference electrode 112 is spaced a sufficient distance apart from the transmission signal electrode 111 so that their mutual influence can be neglected (the electrodes 112 and 111 are not capacitively coupled). Similarly, in the receiver 120, it is assumed that the reception signal electrode 121 is capacitively coupled to only the communication medium 130 and the reception reference electrode 122 is spaced a sufficient distance apart from the reception signal electrode 121 so that their mutual influence can be neglected (the electrodes 122 and 121 are not capacitively coupled). Furthermore, since the transmission signal electrode 111, the reception signal electrode 121 and the communication medium 130 are actually arranged in a space, each of them has a capacitance relative to the space, but the capacitance is assumed to be herein negligible for convenience of explanation.

Figure 2:
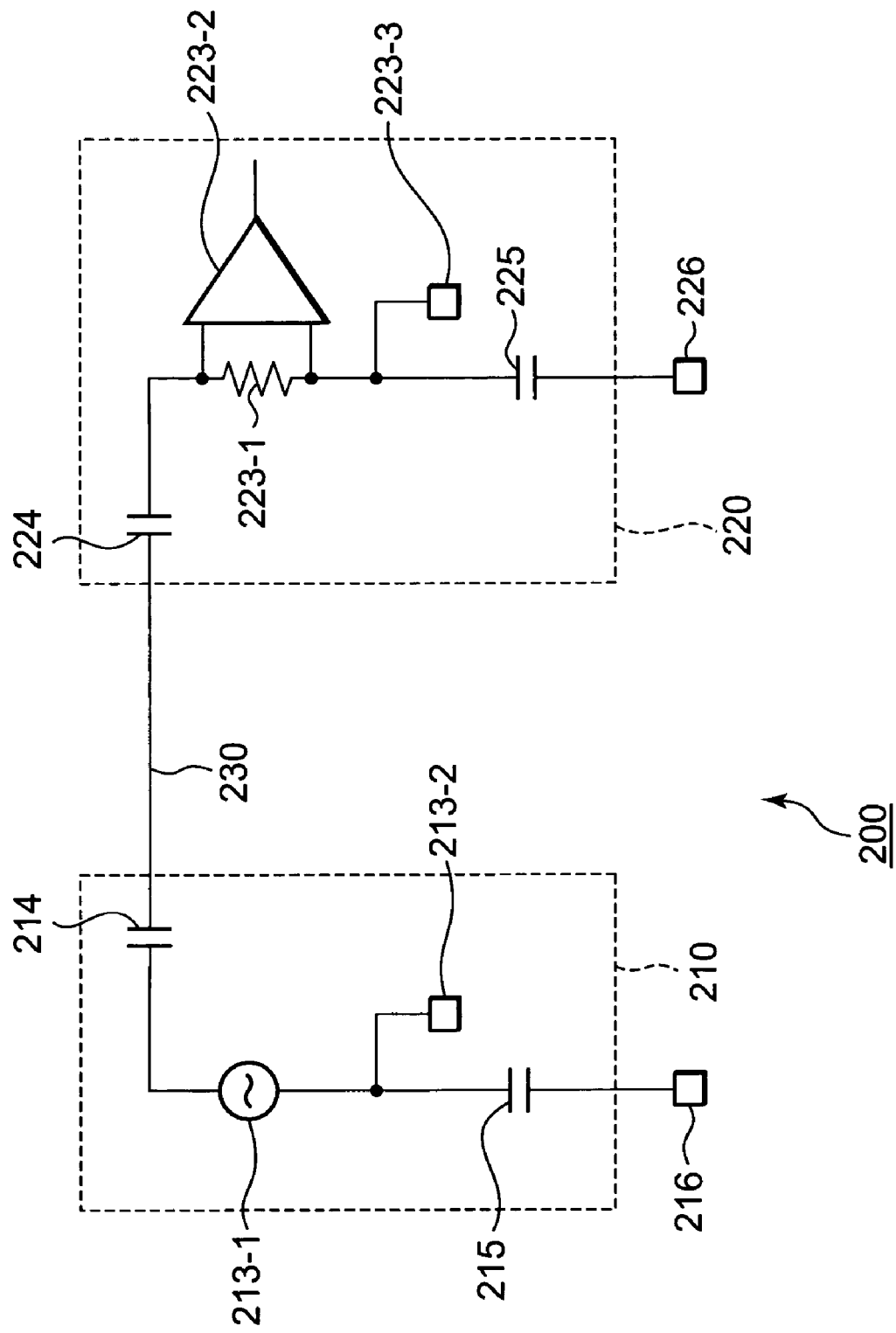
FIG. 2 is a diagram showing an example of an equivalent circuit of the communication system shown in FIG. 1.

FIG. 2 is a diagram showing an equivalent circuit of the communication system 100 shown in FIG. 1. A communication system 200 is the equivalent circuit of the communication system 100 and is substantially equivalent to the communication system 100.

Namely, the communication system 200 has a transmitter 210, a receiver 220, and a connection line 230, and the transmitter 210 corresponds to the transmitter 110 of the communication system 100 shown in FIG. 1, the receiver 220 corresponds to the receiver 120 of the communication system 100 shown in FIG. 1, and the connection line 230 corresponds to the communication medium 130 of the communication system 100 shown in FIG. 1.

In the transmitter 210 shown in FIG. 2, a signal source 213-1 and a ground point 213-2 correspond to the transmitter section 113 shown in FIG. 1. The signal source 213-1 generates a sine wave of particular frequency ωxt [rad] as a transmit signal. If t [s] denotes time and ω [rad/s] denotes angular frequency, formula (3) can be expressed as follows:

[Formula 3]

$$\omega = 2 \times \pi \times f \quad (3)$$

In formula (3), π denotes a circular constant and f [Hz] denotes the frequency of the signal generated by the signal source 213-1. The ground point 213-2 is a point connected to the ground of the circuit inside the transmitter 210. Namely, one of the terminals of the signal source 213-1 is connected to a predetermined reference potential of the circuit inside the transmitter 210.

Cte 214 is a capacitor, and denotes the capacitance between the transmission signal electrode 111 and the communication medium 130 shown in FIG. 1. Namely, Cte 214 is provided between the terminal of the signal source 213-1 opposite to the ground point 213-2 and the connection line 230. Ctg 215 is a capacitor, and denotes the capacitance of the transmission signal electrode 112 shown in FIG. 1 with respect to the space. Namely, Ctg 215 is provided between the terminal of the signal source 213-1 on the side of the ground point 213-2 and a ground point 216 indicative of the infinity point (imaginary point) based on the transmitter 110 in the space.

In the receiver 220 shown in FIG. 2, Rr 223-1, a detector 223-2, and a ground point 223-3 correspond to the receiver section 123 shown in FIG. 1. Rr 223-1 is a load resistor (receive load) for extracting a received signal, and the detector 223-2 made of an amplifier detects and amplifies the potential difference between the opposite terminals of this Rr 223-1. The ground point 223-3 is a point connected to the ground of the circuit inside the receiver 220. Namely, one of the terminals of Rr 223-1 (one of the input terminals of the detector 223-2) is set to a predetermined reference potential of the circuit inside the receiver 220.

The detector 223-2 may also be adapted to be further provided with other functions, for example, the function of demodulating a detected modulated signal or decoding encoded information contained in the detected signal.

Cre 224 is a capacitor, and denotes the capacitance between the reception signal electrode 121 and the communication medium 130 shown in FIG. 1. Namely, Cre 224 is provided between the terminal of Rr 223-1 opposite to the ground point 223-3 and the connection line 230. Crg 225 is a capacitor, and denotes the capacitance of the reception reference electrode 122 shown in FIG. 1 with respect to the space. Namely, Crg 225 is provided between the terminal of Rr 223-1 on the side of the ground point 223-3 and a ground point 226 indicative of the infinity point (imaginary point) based on the receiver 120 in the space.

The connection line 230 denotes the communication medium 130 which is a perfect conductor. In the receiver 220 shown in FIG. 2, Ctg 215 and Crg 225 are shown to be electrically connected to each other via the ground point 216 and the ground point 226 on the equivalent circuit, but in practice, Ctg 215 and Crg 225 need not be electrically connected to each other and each of Ctg 215 and Crg 225 may form a capacitance with respect to the space neighboring the corresponding one of the transmitter 210 and the receiver 220. Namely, the ground point 216 and the ground point 226 need not be electrically connected and may also be independent of each other.

Incidentally, if a conductor exists in a space, a capacitance proportional to the surface area of the conductor is necessarily formed. Namely, for example, the transmitter 210 and the receiver 220 may be spaced as far apart as desired from each other. For example, if the communication medium 130 shown in FIG. 1 is a perfect conductor, the conductivity of the connection line 230 can be regarded as infinite, so that the length of the connection line 230 does not influence communication. In addition, if the communication medium 130 is a conductor of sufficient conductivity, the distance between the transmitter 210 and the receiver 220 does not influence the stability of communication in practical terms.

In the communication system 200, a circuit is formed by the signal source 213-1, Rr 223-1, Cte 214, Ctg 215, Cre 224 and Crg 225. The combined capacitance Cx of the four series-connected capacitors (Cte 214, Ctg 215, Cre 224 and Crg 225) can be expressed by the following formula (4):

[Formula 4]

$$C_x = \frac{1}{\frac{1}{Cte} + \frac{1}{Ctg} + \frac{1}{Cre} + \frac{1}{Crg}} [F] \quad (4)$$

The sine wave vf(t) generated by the signal source 213-1 can be expressed by the following formula (5):

[Formula 5]

$$V_t(t) = V_m \times \sin(\omega t + \theta) [V] \quad (5)$$

In formula (5), Vm [V] denotes the maximum amplitude voltage of the signal source voltage and θ [rad] denotes the initial phase angle of the same. Namely, the effective value Vtrms [V] of the voltage generated by the signal source 213-1 can be found from the following formula (6):

[Formula 6]

$$V_{trms} = \frac{V_m}{\sqrt{2}} [V] \quad (6)$$

The complex impedance Z of the entire circuit can be found from the following formula (7):

[Formula 7]

$$Z = \sqrt{Rr^2 + \frac{1}{(\omega C_x)^2}}$$
$$= \sqrt{Rr^2 + \frac{1}{(2\pi f C_x)^2}} [\Omega] \quad (7)$$

Namely, the effective value Vrrms of the voltage provided across both ends of Rr 223-1 can be found from the following formula (8):

[Formula 8]

$$V_{rrms} = \frac{Rr}{Z} \times V_{trms}$$
$$= \frac{Rr}{\sqrt{Rr^2 + \frac{1}{(2\pi f C_x)^2}}} \times V_{trms} [V] \quad (8)$$

Accordingly, as shown in formula (8), the larger the resistance value of Rr 223-1, the larger the capacitance Cx, and the higher the frequency f [Hz] of the signal source 213-1, the smaller the term of $1/((2 \times \pi \times f \times Cx)2)$, so that a larger signal can be generated across Rr 223-1.

When it is assumed, for example, that: the effective value Vtrms of the voltage generated by the signal source 213-1 of the transmitter 210 is fixed to 2 [V]; the frequency f of the signal generated by the signal source 213-1 is set to 1 [MHz], 10 [MHz] or 100 [MHz]; the resistance value of Rr 223-1 is set to 10K [Ω], 100K [Ω] or 1M [Ω]; and the capacitance Cx of the entire circuit is set to 0.1 [pF], 1 [pF] or 10 [pF], the calculated result of the effective value Vrrms of the voltage generated across Rr 223-1 is as listed in Table 250 shown in FIG. 3.

As shown in Table 250, the calculated result of the effective value Vrrms takes on a larger value when the frequency f is 10 [MHz] than when the frequency f is 1 [MHz], when the resistance value of the receive load Rr 223-1 is 1M [Ω] than when the resistance value is 10K [Ω], or when the capacitance Cx is 10 [pF] than when the capacitance Cx is 0.1 [pF], as long as the other conditions are the same. Namely, as the value of the frequency f, the resistance value of Rr 223-1 or the capacitance Cx is made larger, a larger effective value Vrrms can be obtained.

It can also be seen from Table 250 that an electrical signal is generated across Rr 223-1 even in the case of a capacitance of a picofarad or less. Namely, even if the signal level of a signal to be transmitted is small, it is possible to effect communication as by amplifying a signal detected by the detector 223-2 of the receiver 220.

Figure 4:
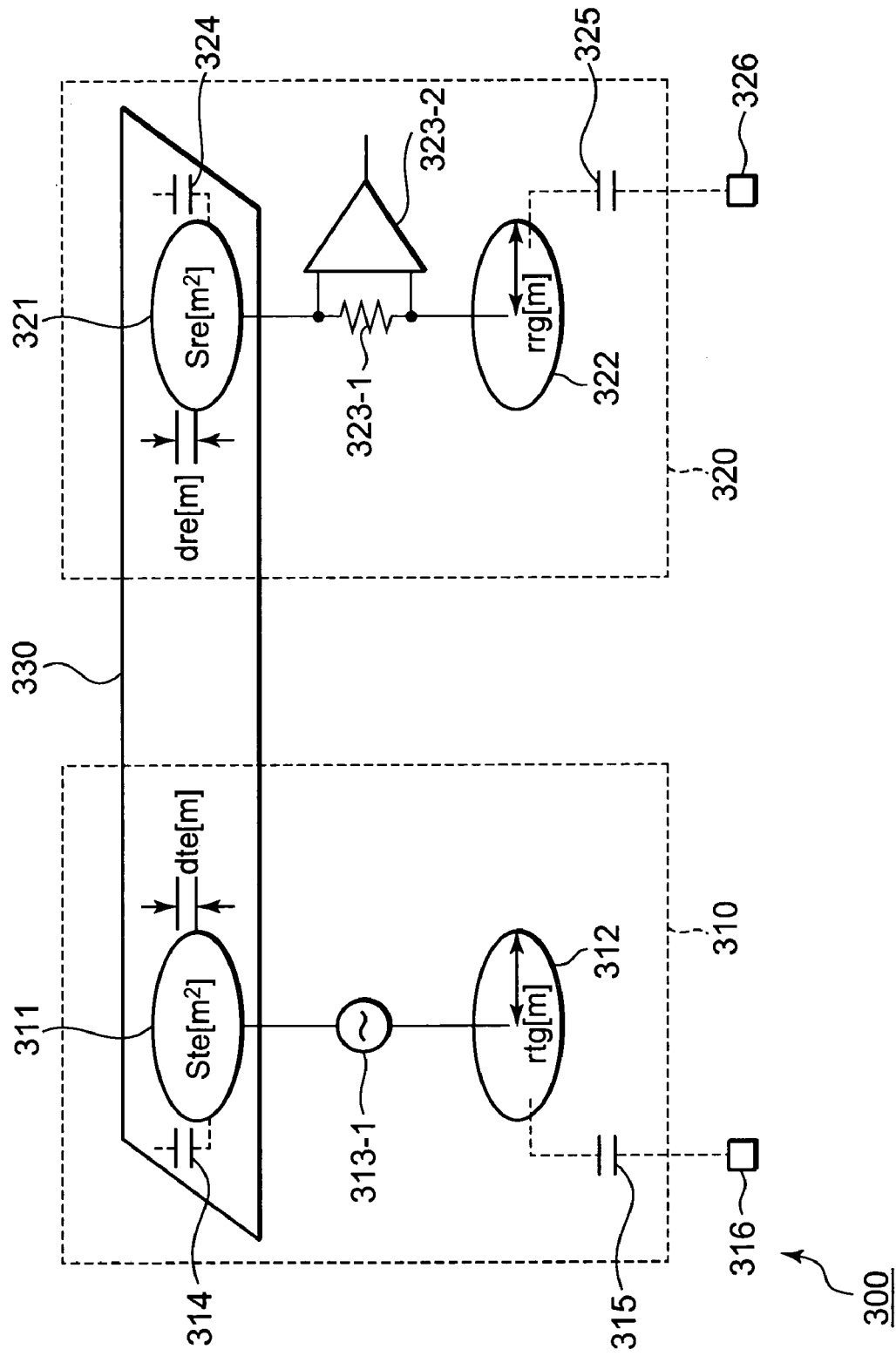
FIG. 4 is a diagram showing an example of a model of a physical construction of the communication system shown in FIG. 1.

A calculation example of each parameter of the communication system 200 which has been mentioned above as an equivalent circuit will be specifically described below with reference to FIG. 4. FIG. 4 is a diagram aiding in explaining calculation examples inclusive of the influence of the physical construction of the communication system 100.

A communication system 300 shown in FIG. 4 is a system corresponding to the communication system 100 shown in FIG. 1, and information about the physical construction of the communication system 100 is added to the communication system 200 shown in FIG. 2. Namely, the communication system 300 has a transmitter 310, a receiver 320, and a communication medium 330. As compared with the communication system 100 shown in FIG. 1, the transmitter 310 corresponds to the transmitter 110, the receiver 320 corresponds to the receiver 120, and the communication medium 330 corresponds to the communication medium 130.

The transmitter 310 has a transmission signal electrode 311 corresponding to the transmission signal electrode 111, a transmission reference electrode 312 corresponding to the transmission reference electrode 112, and a signal source 313-1 corresponding to the transmitter section 113. Namely, the transmission signal electrode 311 is connected to one of both terminals of the signal source 313-1, and the transmission reference electrode 312 is connected to the other. The transmission signal electrode 311 is provided in close proximity to the communication medium 330. The transmission reference electrode 312 is provided to be spaced from the communication medium 330 to such an extent that the transmission reference electrode 312 is not influenced by the communication medium 330, and is constructed to have a capacitance with respect to a space outside the transmitter 310. Although the signal source 213-1 and the ground point 213-2 have been described as corresponding to the transmitter section 113 with reference to FIG. 2, such ground point is omitted in FIG. 4 for convenience of explanation.

Similarly to the transmitter 310, the receiver 320 has a reception signal electrode 321 corresponding to the reception signal electrode 121, a reception reference electrode 322 corresponding to the reception reference electrode 122, and Rr 323-1 and a detector 323-2 corresponding to the receiver section 123. Namely, the reception signal electrode 321 is connected to one of both terminals of Rr 323-1, and the reception reference electrode 322 is connected to the other. The reception signal electrode 321 is provided in close proximity to the communication medium 330. The reception reference electrode 322 is provided to be spaced from the communication medium 330 to such an extent that the transmission reference electrode 312 is not influenced by the communication medium 330, and is constructed to have a capacitance with respect to a space outside the receiver 320. Although Rr 223-1, the detector 223-2 and the ground point 223-3 have been described as corresponding to the receiver section 123 with reference to FIG. 2, such ground point is omitted in FIG. 4 for convenience of explanation.

In addition, it is assumed that the communication medium 330 is a perfect conductor as in the cases shown in FIGS. 1 and 2. It is also assumed that the transmitter 310 and the receiver 320 are arranged to maintain a sufficient distance therebetween so that their mutual influence can be neglected. It is further assumed that the transmission signal electrode 311 is capacitively coupled to only the communication medium 330 and the transmission reference electrode 312 is spaced a sufficient distance apart from the transmission signal electrode 311 so that their mutual influence can be neglected. Similarly, it is assumed that the reception signal electrode 321 is capacitively coupled to only the communication medium 330 and the reception reference electrode 322 is spaced a sufficient distance apart from the reception signal electrode 321 so that their mutual influence can be neglected. Strictly, each of the transmission signal electrode 311, the reception signal electrode 321 and the communication medium 330 has a capacitance relative to the space, but the capacitance is assumed to be herein negligible for convenience of explanation.

As shown in FIG. 4, in the communication system 300, the transmitter 310 is arranged at one end of the communication medium 330, and the receiver 320 is arranged at the other end.

It is assumed that a space of distance dte [m] is formed between the transmission signal electrode 311 and the communication medium 330. If the transmission signal electrode 311 is assumed to be a conductive disk having a surface area Ste [m2] on one side, a capacitance Cte 314 formed between the transmission signal electrode 311 and the communication medium 330 can be found from the following formula (9):

[Formula 9]

$$Cte = \varepsilon \times \frac{Ste}{dte} [F] \qquad (9)$$

Formula (9) is a generally known mathematical formula for the capacitance of a parallel plate. Formula (9) is a mathematical formula to be applied to the case where parallel plates have the same area, but since formula (9) does not provide a seriously impaired result even when applied to the case where parallel plates have different areas, formula (9) is used herein. In formula (9), $\in$ denotes a dielectric constant, and if the communication system 300 is assumed to be placed in the air, the specific dielectric constant $\in r$ can be regarded as approximately 1, so that the dielectric constant $\in$ can be regarded as equivalent to the vacuum dielectric constant $\in 0$. If it is assumed that the surface area Ste of the transmission signal electrode 311 is $2\times10^{-3}$ [m2] (approximately 5 [cm] in diameter) and the distance dte is $5\times10^{-3}$ [m] (5 [mm]), the capacitance Cte 314 can be found from the following formula (10):

[Formula 10]

$$Cte = (8.854 \times 10^{-12}) \times \frac{2 \times 10^{-3}}{5 \times 10^{-3}} \qquad (10)$$
$$\approx 3.5 [pF]$$

Incidentally, in terms of physical phenomena, the above-mentioned formula (9) is strictly applicable to the case where the relationship of Ste>>dte is satisfied, but it is assumed herein that the capacitance Cte 314 can be approximated by formula (9).

A capacitance Cte 315 formed by the transmission reference electrode 312 and a space will be described below. In general, if a disk of radius r [m] is placed in a space, a capacitance C [F] which is formed between the disk and the space can be found from the following formula (11):

[Formula 11]

$$C = 8 \times \in \times r [F] \qquad (11)$$

If the transmission reference electrode 312 is a conductive disk of radius rtg=$2.5\times10^{-2}$ [m] (radius of 2.5 [cm]), the capacitance Cte 315 formed by the transmission reference electrode 312 and the space can be found by using the above-mentioned formula (11), as shown in the following formula (12). It is assumed here that the communication system 300 is placed in the air, the dielectric constant of the space can be approximated by the vacuum dielectric constant $\in 0$.

[Formula 12]

$$Ctg = 8 \times 8.854 \times 10^{-12} \times 2.5 \times 10^{-2} \approx 1.8 [pF] \qquad (12)$$

If the reception signal electrode 321 is the same in size as the transmission signal electrode 311 and the space between the reception signal electrode 321 and the communication medium 330 is the same as the space between the transmission signal electrode 311 and the communication medium 330, a capacitance Cre 324 which is formed by the reception signal electrode 321 and the communication medium 330 is 3.5 [pF] as in the case of the transmission side. If the reception reference electrode 322 is the same in size as the transmission reference electrode 312, a capacitance Crg 325 which is formed by the reception reference electrode 322 and a space is 1.8 [pF] as in the case of the transmission side. Accordingly, the combined capacitance Cx of the four electrostatic capacities Cte 314, Ctg 315, Cre 324 and Crg 325 can be expressed by using the above-mentioned formula (4), as shown in the following formula (13):

[Formula 13]

$$C_x = \frac{1}{\frac{1}{Cte} + \frac{1}{Ctg} + \frac{1}{Cre} + \frac{1}{Crg}} \quad (13)$$

$$= \frac{1}{\frac{1}{3.5 \times 10^{-12}} + \frac{1}{1.8 \times 10^{-12}} + \frac{1}{3.5 \times 10^{-12}} + \frac{1}{1.8 \times 10^{-12}}}$$

$$\approx 0.6 [pF]$$

If it is assumed that: the frequency f of the signal source 313-1 is 1 [MHz]; the effective value Vtrms of the voltage generated by the signal source 313-1 is 2 [V]; and the resistance value of Rr 323-1 is set to 100K [Ω], the voltage Vrrms generated across Rr 323-1 can be found from the following formula (14):

[Formula 14]

$$V_{rrms} = \frac{Rr}{\sqrt{Rr^2 + \frac{1}{(2\pi f C_x)^2}}} \times V_{trms} \quad (14)$$

$$= \frac{1 \times 10^5}{\sqrt{(1 \times 10^5)^2 + \frac{1}{(2 \times \pi \times (1 \times 10^6) \times (0.6 \times 10^{-12}))^2}}} \times 2$$

$$\approx 0.71 [V]$$

As is apparent from the above-mentioned result, it is possible to transmit signals from a transmitter to a receiver as a basic principle by using electrostatic capacities formed by spaces.

The above-mentioned electrostatic capacities of the transmission reference electrode and the reception reference electrode with respect to the respective spaces can be formed only if a space exits at the location of each of the electrodes. Accordingly, only if the transmission signal electrode and the reception signal electrode are coupled via the communication medium, the transmitter and the receiver can achieve stability of communication irrespective of their mutual distance.

Figure 5:
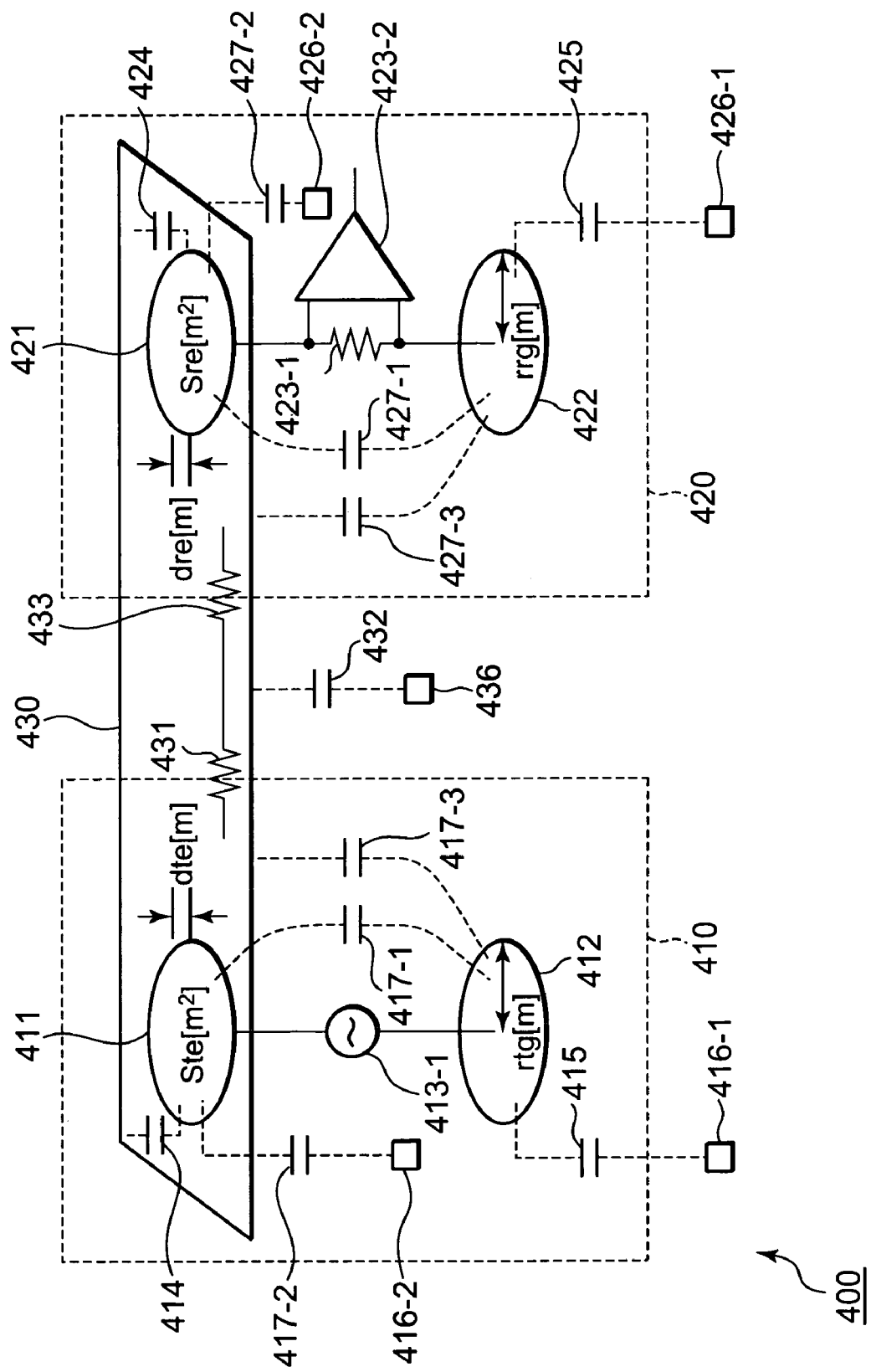
FIG. 5 is a diagram showing an example of a calculation model of each parameter generated in the model shown in FIG. 4.

The case where the present inventive communication system is actually physically constructed will be described below. FIG. 5 is a diagram showing an example of a calculation model for parameters generated in a case where any of the above-mentioned communication systems is actually physically constructed.

Namely, a communication system 400 has a transmitter 410, a receiver 420, and a communication medium 430, and is a system which corresponds to the above-mentioned communication system 100 (the communication system 200 or the communication system 300) and is basically the same in construction as any of the communication systems 100 to 300 except that parameters to be evaluated differ.

As compared with the communication system 300, the transmitter 410 corresponds to the transmitter 310, a transmission signal electrode 411 of the transmitter 410 corresponds to the transmission signal electrode 311, a transmission reference electrode 412 corresponds to the transmission reference electrode 312, and a signal source 413-1 corresponds to the signal source 313-1. The receiver 420 corresponding to the receiver 320, a reception signal electrode 421 of the receiver 420 corresponds to the reception signal electrode 321, a reception reference electrode 422 corresponds to the reception reference electrode 322, Rr423-1 corresponds to Rr323-1, and a detector 423-2 corresponds to the detector 323-2. In addition, the communication medium 430 corresponds to the communication medium 330.

Referring to the parameters, a capacitance Cte 414 between the transmission signal electrode 411 and the communication medium 430 corresponds to Cte 314 of the communication system 300, a capacitance Ctg 415 of the transmission reference electrode 412 with respect to a space corresponds to Ctg 315 of the communication system 300, and a ground point 416-1 indicative of an imaginary infinity point in a space outside the transmitter 410 corresponds to the ground point 316 of the communication system 300. The transmission signal electrode 411 is a disk-shaped electrode of area Ste [m2] and is provided at a location away from the communication medium 430 by a small distance dte [m]. The transmission reference electrode 412 is also a disk-shaped electrode and has a radius rtg [m].

In the receiver 420, a capacitance Cre 424 between the reception signal electrode 421 and the communication medium 430 corresponds to Cre 324 of the communication system 300, a capacitance Crg 425 of the reception reference electrode 422 with respect to a space corresponds to Crg 325 of the communication system 300, and a ground point 426-1 indicative of an imaginary infinity point in a space outside the receiver 420 corresponds to the ground point 326 of the communication system 300. The reception signal electrode 421 is a disk-shaped electrode of area Sre [m2] and is provided at a location away from the communication medium 430 by a small distance dre [m]. The reception reference electrode 422 is also a disk-shaped electrode and has a radius rrg [m].

The communication system 400 shown in FIG. 5 is a model in which the following new parameters are added to the above-mentioned parameters.

For example, regarding the transmitter 410, the following parameters are added as new parameters: a capacitance Ctb 417-1 formed between the transmission signal electrode 411 and the transmission reference electrode 412, a capacitance Cth 417-2 formed between the transmission signal electrode 411 and a space, and a capacitance Cti 417-3 formed between the transmission reference electrode 412 and the communication medium 430.

Regarding the receiver 420, the following parameters are added as new parameters: a capacitance Crb 427-1 formed between the reception signal electrode 421 and the reception reference electrode 422, a capacitance Crh 427-2 formed between the reception signal electrode reception signal electrode 421 and a space, and a capacitance Cri 427-3 formed between the reception reference electrode 422 and the communication medium 430.

Furthermore, regarding the communication medium 430, a capacitance Cm 432 formed between the communication medium 430 and a space is added as a new parameter. In addition, since the communication medium 430 actually has an electrical resistance based on its size, its material and the like, resistance values Rm 431 and Rm 433 are added as new parameters corresponding to the resistance component.

Although illustration is omitted in the communication system 400 shown in FIG. 5, if the communication medium 430 has not only conductivity but also dielectricity, a capacitance according to the dielectric constant is also formed. In addition, if the communication medium 430 does not have conductivity and a capacitance is formed by only dielectricity, the capacitance, which is determined by the dielectric constant, the distance, the size and the arrangement of the dielectric material of the communication medium 430, is formed between the transmission signal electrode 411 and the reception signal electrode 421.

In addition, in the communication system 400 shown in FIG. 5, it is assumed that the distance between the transmitter 410 and the receiver 420 is apart to such an extent that a factor such as their mutual capacitive coupling can be neglected (the influence of the capacitive coupling between the transmitter 410 and the receiver 420 can be neglected). If the distance is short, there may be a need for taking account of a capacitance between the electrodes in the transmitter 410 and a capacitance between the electrodes in the receiver 420 in accordance with the above-mentioned approach, depending on the positional relationship between the electrodes in the transmitter 410 and that between the electrodes in the receiver 420.

Figure 6:
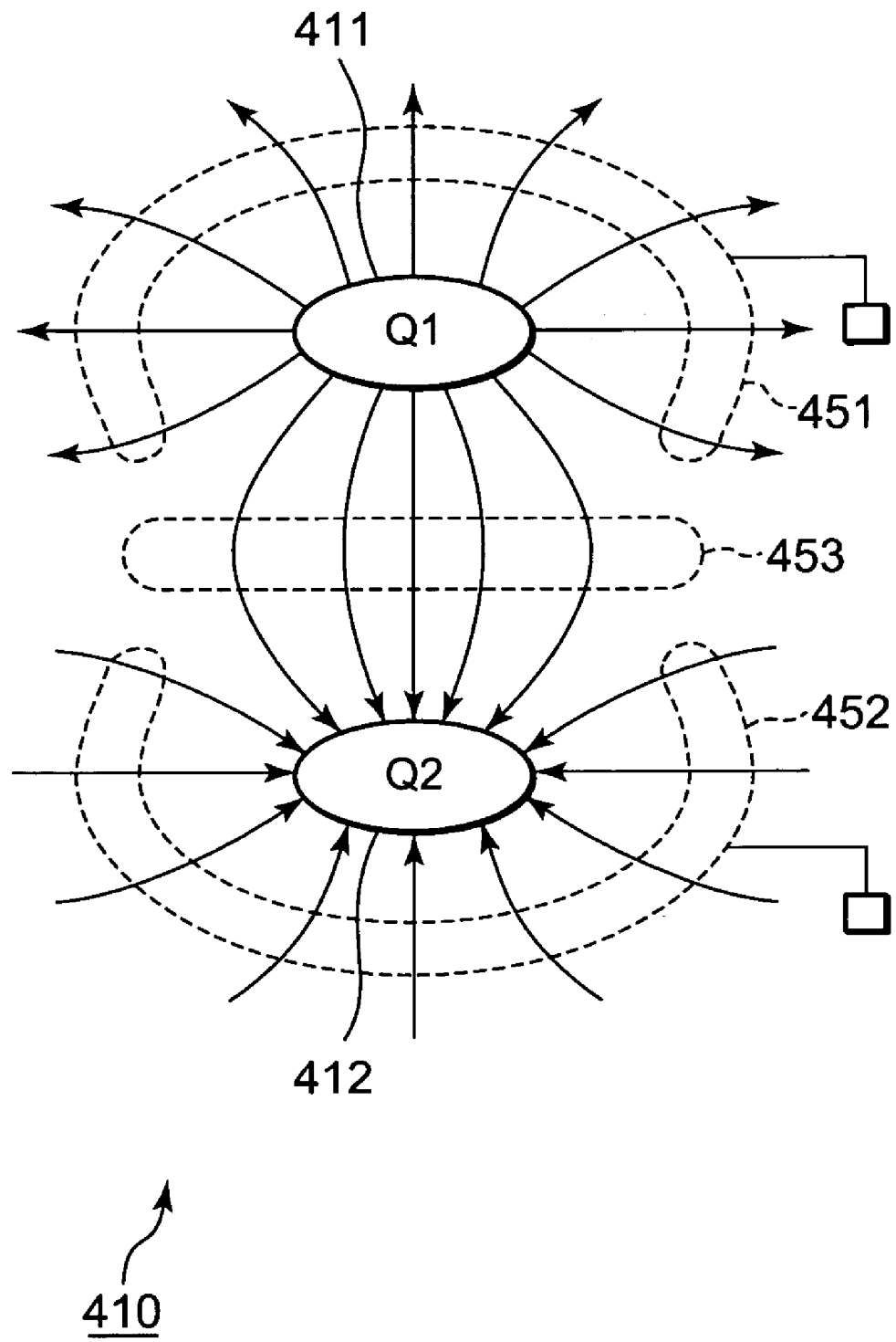
FIG. 6 is a schematic view showing an example of distribution of electric lines of force with respect to electrodes.

The operation of the communication system 400 shown in FIG. 5 will be described below by using electric lines of force. FIG. 6 is a schematic view in which the relationship between the electrodes in the transmitter 410 of the communication system 400 is represented by electric lines of force, and FIG. 7 is a schematic view in which the relationship between the electrodes in the transmitter 410 of the communication system 400 and the communication medium 430 is represented by electric lines of force.

FIG. 6 is a schematic view showing an example of distribution of electric lines of force in a case where the communication medium 430 does not exist. It is assumed that the transmission signal electrode 411 has positive charge (positively charged) and the transmission reference electrode 412 has negative charge (negatively charged). The arrows shown in FIG. 6 denote the electric lines of force, and the directions of the respective arrows are from positive charge to negative charge. The electric lines of force do not suddenly disappear halfway and have the nature of arriving at either an object having charge of a different sign or the imaginary infinity point.

In FIG. 6, from among the electric lines of force emitted from the transmission signal electrode 411, electric lines of force 451 denote electric lines of force arriving at the infinity point, while from among the electric lines of force turning toward the transmission reference electrode 412, electric lines of force 452 denote electric lines of force arriving from the imaginary infinity point. Electric lines of force 453 denote electric lines of force produced between the transmission signal electrode 411 and the transmission reference electrode 412. As shown in FIG. 6, electric lines of force move from the positively charged electrode 411 of the transmitter 410, while electric lines of force move toward the negatively charged transmission reference electrode 412 of the transmitter 410. The distribution of the electric lines of force is influenced by the size of each of the electrodes and the positional relationship therebetween.

Figure 7:
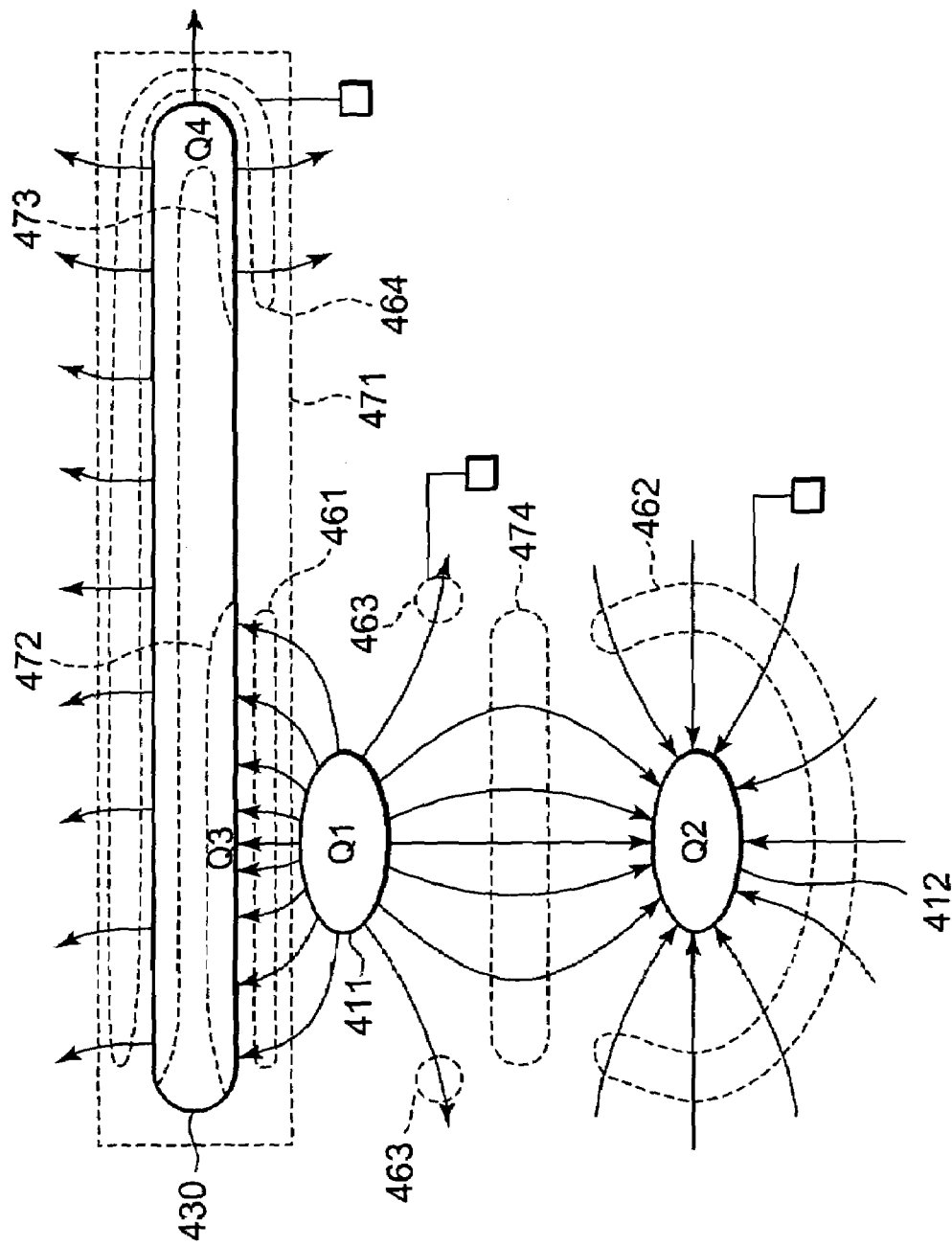
FIG. 7 is a schematic view showing another example of distribution of electric lines of force with respect to the electrodes.

FIG. 7 is a schematic view showing an example of electric lines of force in a case where the communication medium 430 is brought closer to the transmitter 410. As the communication medium 430 is brought closer to the transmission signal electrode 411, the coupling therebetween becomes stronger and most of the electric lines of force 451 arriving at the infinity point in FIG. 6 become electric lines of force 461 arriving at the communication medium 430, so that the number of electric lines of force 463 moving toward the infinity point (the electric lines of force 451 shown in FIG. 6) is decreased. Accordingly, the capacitance relative to the infinity point as viewed from the transmission signal electrode 411 (Cth 417-2 in FIG. 5) decreases, and the capacitance between the transmission signal electrode 411 and the communication medium 430 (Cth 417-2 in FIG. 5) increases. A capacitance (Cti 417-3 in FIG. 5) between the transmission reference electrode 412 and the communication medium 430 actually exists as well, but in FIG. 7, it is assumed that the capacitance is negligible.

According to Gauss's law, the number N of electric lines of force moving through an arbitrary closed surface S is equal to the charge enclosed in the closed surface S which is divided by the dielectric constant ∈, and is not influenced by charge outside the closed surface S. When it is assumed that n-number of charges exist in the closed surface S, the following formula is obtained:

[Formula 15]

$$N = \frac{1}{\varepsilon} \times \sum_{i=1}^{n} q_i \text{ pieces} \tag{15}$$

In formula (15), i denotes an integer, and a variable qi denotes the amount of charge accumulated in each of the electrodes. Formula (15) represents that electric lines of force emerging from the closed surface S of the transmission signal electrode 411 are determined by only electric lines of force emanated from the charges existing in the closed surface S, and all electric lines of force entering from the outside of the transmission reference electrode 412 leave from other locations.

According to this law, in FIG. 7, if it is assumed that the communication medium 430 is not grounded, a generation source of charge does not exist in a closed surface 471 near the communication medium 430, charge Q3 is induced by electrostatic induction in an area 472 of the communication medium 430 near the electric lines of force 461. Since the communication medium 430 is not grounded and the total amount of charge of the communication medium 430 does not change, charge Q4 which is equivalent in amount to but different in sign from the charge Q3 is induced in an area 743 outside the area 472 in which the charge Q3 is induced, so that electric lines of force 464 produced by the charge Q4 move out of the closed surface 471. The larger the size of the communication medium 430 becomes, the more the charge Q4 diffuses and the lower the charge density becomes, so that the number of electric lines of force per section area decreases.

If the communication medium 430 is a perfect conductor, the communication medium 430 has the nature of becoming approximately equal in charge density irrespective of its sites, because the communication medium 430 has the characteristic that its potential becomes the same irrespective of the sites as the result of the nature of the perfect conductor. If the communication medium 430 is a conductor having a resistance component, the number of electric lines of force decreases according to the distance between the communication medium 430 and the transmission signal electrode 411 in accordance with the resistance component. If the communication medium 430 is a dielectric having no conductivity, electric lines of force are diffused and propagated by its polarization action. If n-number of conductors exist in a space, the charge Qi of each of the conductors can be found from the following formula:

[Formula 16]

$$Q_i = \sum_{j=1}^{n} C_{ij} \times V_j \tag{16}$$

In formula (16), i and j denote integers, and Cij denotes a capacitance coefficient formed by the conductor i and the conductor j and may be considered to have the same nature as capacitance. The capacitance coefficient is determined by only the shapes of the respective conductors and the positional relationship therebetween. The capacitance coefficient Cii becomes a capacitance that the conductor i itself forms with respect to a space. In addition, Cij=Cii. Formula (16) represents that a system formed by a plurality of conductors operates on the basis of the superposition theorem and that the charge of each of the conductors is determined by the sum of the products of the capacitance between the conductors and the potentials of the respective conductors.

It is assumed here that the mutually associated parameters shown in FIG. 7 and formula (16) are determined as follows. For example, Q1 denotes charge induced in the transmission signal electrode 411, Q2 denotes charge induced in the transmission reference electrode 412, Q3 denotes charge in the communication medium 430 by the transmission signal electrode 411, and Q4 denotes charge equivalent in amount to and different in sign to the charge Q3 in the communication medium 430.

V1 denotes the potential of the transmission signal electrode 411 with respect to the infinity point, V2 denotes the potential of the transmission reference electrode 412 with respect to the infinity point, V3 denotes the potential of the communication medium 430 with respect to the infinity point, C12 denotes the capacitance coefficient between the transmission signal electrode 411 and the transmission reference electrode 412, C13 denotes the capacitance coefficient between the transmission signal electrode 411 and the communication medium 430, C15 denotes the capacitance coefficient between the transmission signal electrode 411 and the space, C25 denotes the capacitance coefficient between the transmission reference electrode 412 and the space, and C35 denotes the capacitance coefficient between the communication medium 430 and the space.

At this time, the charge Q3 can be found from the following formula:

[Formula 17]

$$Q_3 = C13 \times V1 \quad (17)$$

If far more electric fields are to be injected into the communication medium 430, the charge Q3 may be increased. For this purpose, the capacitance coefficient C13 between the transmission signal electrode 411 and the communication medium 430 may be increased and a sufficient voltage V1 may be applied. The capacitance coefficient C13 is determined by only the shapes of the shapes of the transmission signal electrode 411 and the communication medium 430 and the positional relationship therebetween, and the closer the distance therebetween and the larger the areas of facing surfaces, the higher the capacitance therebetween. As to the potential V1, a sufficient voltage need be produced as viewed from the infinity point. In the transmitter 410, a potential difference is applied between the transmission signal electrode 411 and the transmission reference electrode 412 by the signal source 413-1, and the behavior of the transmission reference electrode 412 is important so that the potential can be produced as a sufficient potential as viewed from the infinity point as well.

If the transmission reference electrode 412 is small in size and the transmission signal electrode 411 has a sufficiently large size, the capacitance coefficients C12 and C25 become small, whereas the capacitance coefficients C13, C15 and C45 become electrically less variable because each of them has a large capacitance. Accordingly, most of the potential differences generated by the signal source appear as the potential V2 of the transmission reference electrode 412, so that the potential V1 of the transmission signal electrode 411 becomes small.

Figure 8:
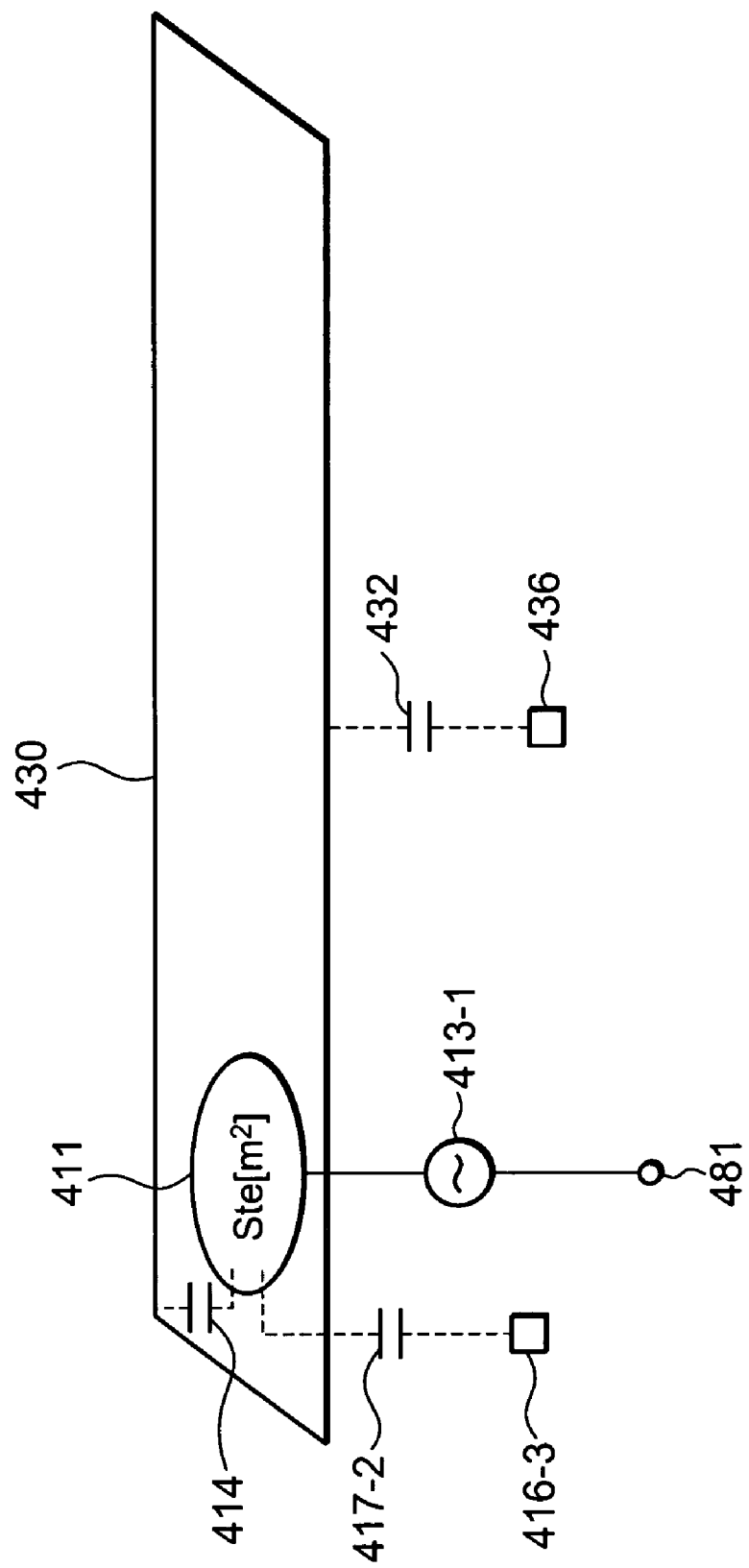
FIG. 8 is a diagram aiding in explaining another example of the model of electrodes in a transmitter.

FIG. 8 shows the above-mentioned status. A transmission reference electrode 481 is small in size and is not coupled to any of the conductors or the infinity point. The transmission signal electrode 411 forms the capacitance Cte 414 between itself and the communication medium 430, and forms the capacitance Cth 417-2 with respect to the space. The communication medium 430 forms a capacitance Cm 432 with respect to the space. Even if potentials are produced at the transmission signal electrode 411 and the transmission reference electrode 412, large energy is needed to vary these potentials, because the electrostatic capacities Cte 414, Cth 417-2 and Cm 432 associated with the transmission signal electrode 411 are overwhelmingly large. However, since the capacitance of the transmission reference electrode 481 on the opposite side of the signal source 413-1 is small, the potential of the transmission signal electrode 411 hardly varies, and most potential variations in the signal source 413-1 appear at the transmission reference electrode 481.

Contrarily, if the transmission signal electrode 411 is small in size and the transmission reference electrode 481 has a sufficiently large size, the capacitance of the transmission reference electrode 481 relative to the space increases and becomes to produce electrically less variation. Although a sufficient voltage V1 is produced at the transmission signal electrode 411, the capacitive coupling between the transmission signal electrode 411 and the communication medium 430 is decreased so that sufficient electric fields may not be injected.

Accordingly, on the basis of the balance of the entire system, it is necessary to provide a transmission reference electrode capable of giving a sufficient potential while enabling the electric fields necessary for communication to be injected from a transmission signal electrode to a communication medium. Although the above description has referred to only the transmission side, the relationship between the electrodes of the receiver 420 and the communication medium 430 can also be considered in the same manner.

The infinity point need not be at a physically long distance, and may be set in a space neighboring the device in practical terms. More ideally, it is desirable that the infinity point is more stable and does not show large potential variations in the entire system. In actual use environments, there is noise which is generated from AC power lines, illuminators and other electrical appliances, but such noise may be neglected if the noise does not overlap a frequency bandwidth to be used by at least a signal source or is of negligible level.

Figure 9:
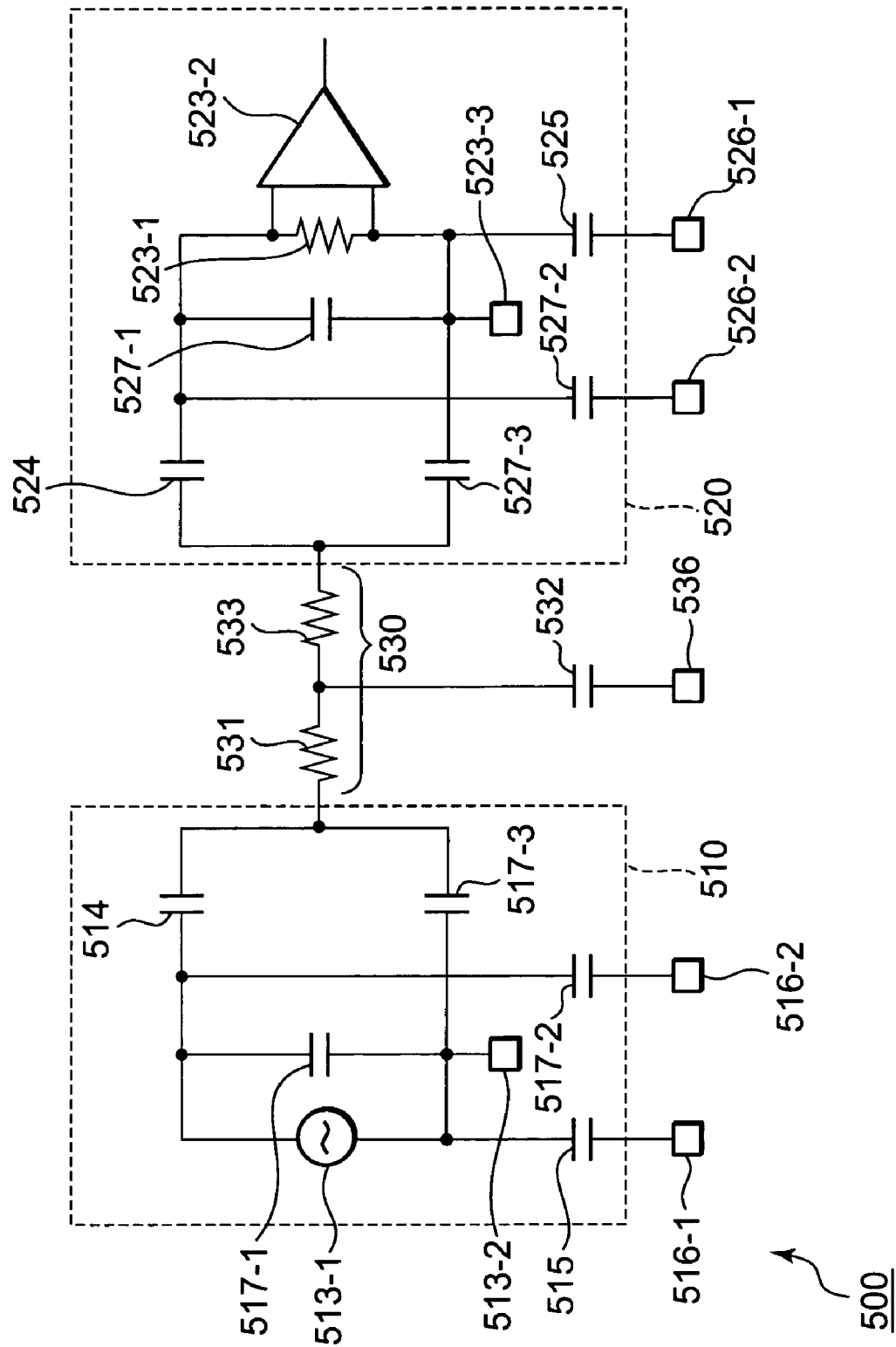
FIG. 9 is a diagram showing an example of an equivalent circuit of the model shown in FIG. 5.

FIG. 9 is a diagram showing an equivalent circuit of the model (the communication system 400) shown in FIG. 5.

As in the relationship between FIGS. 2 and 4, a communication system 500 shown in FIG. 9 corresponds to the communication system 400 shown in FIG. 5, a transmitter 510 of the communication system 500 corresponds to the transmitter 410 of the communication system 400, a receiver 520 of the communication system 500 corresponds to the receiver 420 of the communication system 400, and a connection line 530 of the communication system 500 corresponds to the communication medium 430 of the communication system 400.

Similarly, in the transmitter 510 shown in FIG. 9, a signal source 513-1 corresponds to the signal source 413-1. In the transmitter 510 shown in FIG. 9, there is shown a ground point 513-2 which is omitted in FIG. 5, corresponds to the ground point 213-2 in FIG. 2, and indicates ground in the circuit inside the transmitter section 113 shown in FIG. 1.

Cte 514 in FIG. 9 is a capacitance corresponding to Cte 414 in FIG. 5, Ctg 515 is a capacitance corresponding to Ctg 415 in FIG. 5, and ground points 516-1 and 516-2 respectively correspond to the ground points 416-1 and 416-2. In addition, Ctb 517-1, Cth 517-2 and Cti 517-3 are capacitances corresponding to Ctb 417-1, Cth 417-2 and Cti 417-3, respectively.

Similarly, in the receiver 520, Rr 523-1 and a detector 523-2 respectively correspond to Rr 423-1 and the detector 423-2 shown in FIG. 5. In addition, in the receiver 520 shown in FIG. 9, there is shown a ground point 523-3 which is omitted in FIG. 5, corresponds to the ground point 223-2 in FIG. 2, and indicates ground in the circuit inside the receiver section 123 shown in FIG. 1.

Cre 524 in FIG. 9 is a capacitance corresponding to Cre 424 in FIG. 5, Crg 525 is a capacitance corresponding to Crg 425 in FIG. 5, and ground points 526-1 and 526-2 respectively correspond to the ground points 426-1 and 426-2. In addition, Crb 527-1, Crh 527-2 and Cri 527-3 are capacitances corresponding to Crb 427-1, Crh 427-2 and Cri 427-3, respectively.

Similarly, as to elements connected to the connection line 530, Rm 531 and Rm 533 which are resistance components of the connection line 530 correspond to Rm 431 and Rm 433, respectively, Cm 532 corresponds to Cm 432, and a ground point 536 corresponds to the ground point 436.

The communication system 500 has the following nature.

For example, the larger the value of Cte 514 (the higher the capacitance), the larger signal the transmitter 510 can apply to the connection line 530 corresponding to the communication medium 430. In addition, the larger the value of Ctg 512 (the higher the capacitance), the larger signal the transmitter 510 can apply to the connection line 530. Furthermore, the smaller the value of Ctb 517-1 (the lower the capacitance), the larger signal the transmitter 510 can apply to the connection line 530. In addition, the smaller the value of Cth 512-2 (the lower the capacitance), the larger signal the transmitter 510 can apply to the connection line 530. Furthermore, the smaller the value of Cti 51-7-3 (the lower the capacitance), the larger signal the transmitter 510 can apply to the connection line 530.

The larger the value of Cre 524 (the higher the capacitance), the larger signal the receiver 520 can extract from the connection line 530 corresponding to the communication medium 430. In addition, the larger the value of Crg 525 (the higher the capacitance), the larger signal the receiver 520 can extract from the connection line 530. Furthermore, the smaller the value of Crb 527-1 (the lower the capacitance), the larger signal the receiver 520 can extract from the connection line 530. In addition, the smaller the value of Cth 527-2 (the lower the capacitance), the larger signal the transmitter 530 can extract from the connection line 530. Furthermore, the smaller the value of Cri 527-3 (the lower the capacitance), the larger signal the receiver 520 can extract from the connection line 530. In addition, the lower the value of Rr 523 (the lower the resistance), the larger signal the receiver 520 can extract from the connection line 530.

The lower the values of Rm 531 and Rm 533 which are the resistance components of the connection line 530 (the lower the resistances), the larger signal the transmitter 510 can apply to the connection line 530. The smaller the value of Cm 532 which is the capacitance of the connection line 530 with respect to the space (the lower the capacitance), the larger signal the transmitter 510 can apply to the connection line 530.

The capacitance of a capacitor is approximately proportional to the surface area of each of its electrodes, and in general, it is more desirable that each of the electrodes have a larger size. However, if the sizes of the respective electrodes are simply increased, there is a risk that the capacitance between the electrodes also increase. In addition, if the ratio of the sizes of the respective is extreme, there is a risk that the efficiency of the capacitor lowers. Accordingly, the sizes and the arrangement locations of the respective electrodes need be determined on the basis of the balance of the entire system.

In addition, the above-mentioned nature of the communication system 500 makes it possible to realize efficient communication in a high frequency bandwidth of the signal source 513-1 by determining the parameters of the present equivalent circuit by an impedance-matching approach. By increasing the frequency, it is possible to ensure reactance even with a small capacitance, so that it is possible to easily miniaturize each of the devices.

In general, the reactance of a capacitor increases with a decrease in frequency. On the other hand, since the communication system 500 operates on the basis of capacitive coupling, the lower limit of the frequency of a signal generated by the signal source 513-1 is determined by the capacitive coupling. In addition, since Rm 531, Rm 532 and Rm 533 form a low-pass filter through their arrangement, the upper limit of the frequency is determined by the characteristic of the low-pass filter.

Figure 10:
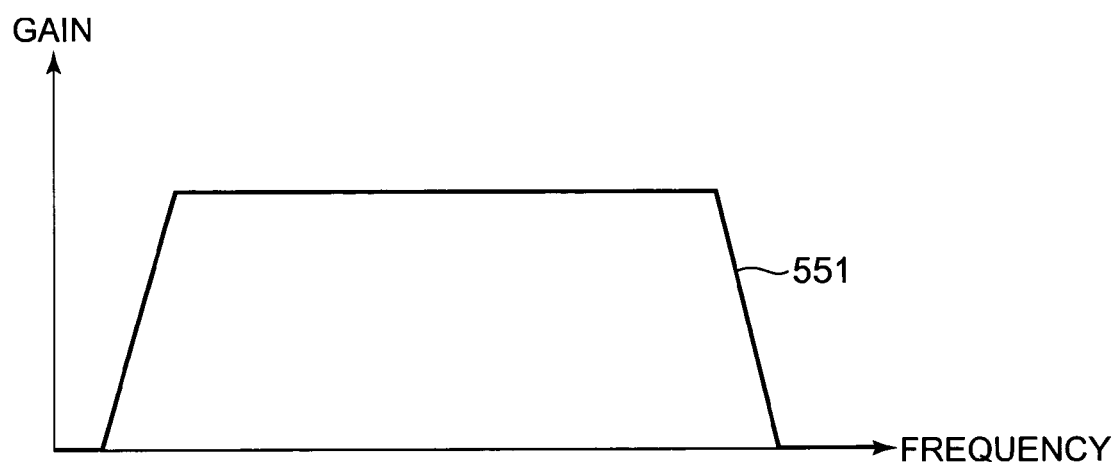
FIG. 10 is a graph showing an example of a frequency characteristic of the communication system shown in FIG. 9.

Specifically, the frequency characteristic of the communication system 500 is as indicated by a curve 551 in the graph shown in FIG. 10. In FIG. 10, the horizontal axis represents frequency, and the vertical axis represents the gain of the entire system.

Specific values of the respective parameters of each of the communication system 400 shown in FIG. 5 and the communication system 500 shown in FIG. 9 will be considered below. In the following description, for convenience of explanation, it is assumed that the communication system 400 (the communication system 500) is placed in the air. Each of the transmission signal electrode 411, the transmission reference electrode 412, the reception signal electrode 421 and the reception reference electrode 422 of the communication system 400 is assumed to be a conductive disk of diameter 5 cm.

In the communication system 400 shown in FIG. 5, if the distance d between the transmission signal electrode 411 and the communication medium 430 is 5 mm, the value of the capacitance Cte 414 formed by the transmission signal electrode 411 and the communication medium 430 can be found by using the above-mentioned formula (9), as shown in the following formula (18):

[Formula 18]

$$Cte = \frac{(8.854 \times 10^{-12}) \times (2 \times 10^{-3})}{5 \times 10^{-3}} \quad (18)$$
$$\approx 3.5 \text{ [pF]}$$

It is assumed herein that Formula (9) can be adapted to Ctb 417-1 which is the capacitance between the electrodes (Ctg 517-1 in FIG. 9). As mentioned above, formula (9) is to be originally applied to the case where the surface area of the electrodes is sufficiently large compared to the distance therebetween. However, in the case of the communication system 400, the value of Ctb 417-1 is assumed to be able to be found by using formula (9), because the value of the capacitance Ctb 417-1 between the transmission signal electrode 411 and the transmission reference electrode 412, which is found by using formula (9), sufficiently approximates its original correct value so that a problem does not arise in the explanation of principles. If the distance between the electrodes is assumed to be 5 cm, Ctb 417-1 (Ctb 517-1 in FIG. 9] is as expressed by the following formula (19):

[Formula 19]

$$Ctb = \frac{(8.854 \times 10^{-12}) \times (2 \times 10^{-3})}{5 \times 10^{-3}} \approx 0.35 \ [pF] \quad (19)$$

If it is assumed that the distance between the transmission signal electrode 411 and the communication medium 430 is narrow, the coupling of the transmission signal electrode 411 to the space is weak and the value of Cth 417-2 (Cth 517-2 in FIG. 9) is sufficiently smaller than the value of Cte 414 (Cte 514). Accordingly, the value of Cth 417-2 (Cth 517-2) is set to one-tenth of the value of Cte 414 (Cte 514) as expressed by formula (20):

[Formula 20]

$$Cth = \frac{Cte}{10} = 0.35 \ [pF] \quad (20)$$

Cteg 415 (Ctg 515 in FIG. 9) which denotes a capacitance formed by the transmission reference electrode 412 and the space can be found from the following formula (21), as in the case of FIG. 4 (formula (12)):

[Formula 21]

$$Ctg = 8 \times 8.854 \times 10^{-12} \times 2.5 \times 10^{-2} \approx 1.8 \ [pF] \quad (21)$$

The value of Cti 417-3 (the value of Cti 517-3 in FIG. 9) is considered equivalent to the value of Ctb 417-1 (Ctb 517-1 in FIG. 9) as follows:

$$Cti = Ctb = 0.35 \ [pF]$$

If the constructions of the respective electrodes (the sizes and the installation locations of the respective electrodes) are set as in the case of the transmitter 410, the parameters of the receiver 420 (the receiver 520 shown in FIG. 9) can be set similarly to the parameters of the transmitter 410 as follows:

$$Cre = Cte = 3.5 [pF]$$

$$Crb = Ctb = 0.35 [pF]$$

$$Crh = Cth = 0.35 [pF]$$

$$Crg = Ctg = 1.8 [pF]$$

$$Cri = Cti = 0.35 [pF]$$

In the following description, for convenience of explanation, it is assumed that the communication medium 430 (the connection line 530 shown in FIG. 9) is an object having characteristics close to a living body having approximately the same size as a human body. It is assumed that the electrical resistance from the location of the transmission signal electrode 411 of the communication medium 430 to the location of the reception signal electrode 421 (from the location of a transmission signal electrode 511 to the location of a reception signal electrode 521 in FIG. 9) is 1M [Ω], and that the value of each of Rm 431 and the Rm 433 (Rm 531 and Rm 533 in FIG. 9) is 500K [Ω]. In addition, it is assumed that the value of the capacitance Cm 432 (Cm 532 in FIG. 9] formed between the communication medium 430 and the space is 100 [pF].

Furthermore, it is assumed that the signal source 413-1 (the signal source 513-1 in FIG. 9) outputs a sine wave having a maximum value of 1 [V] and a frequency of 10M [Hz].

Figure 11:
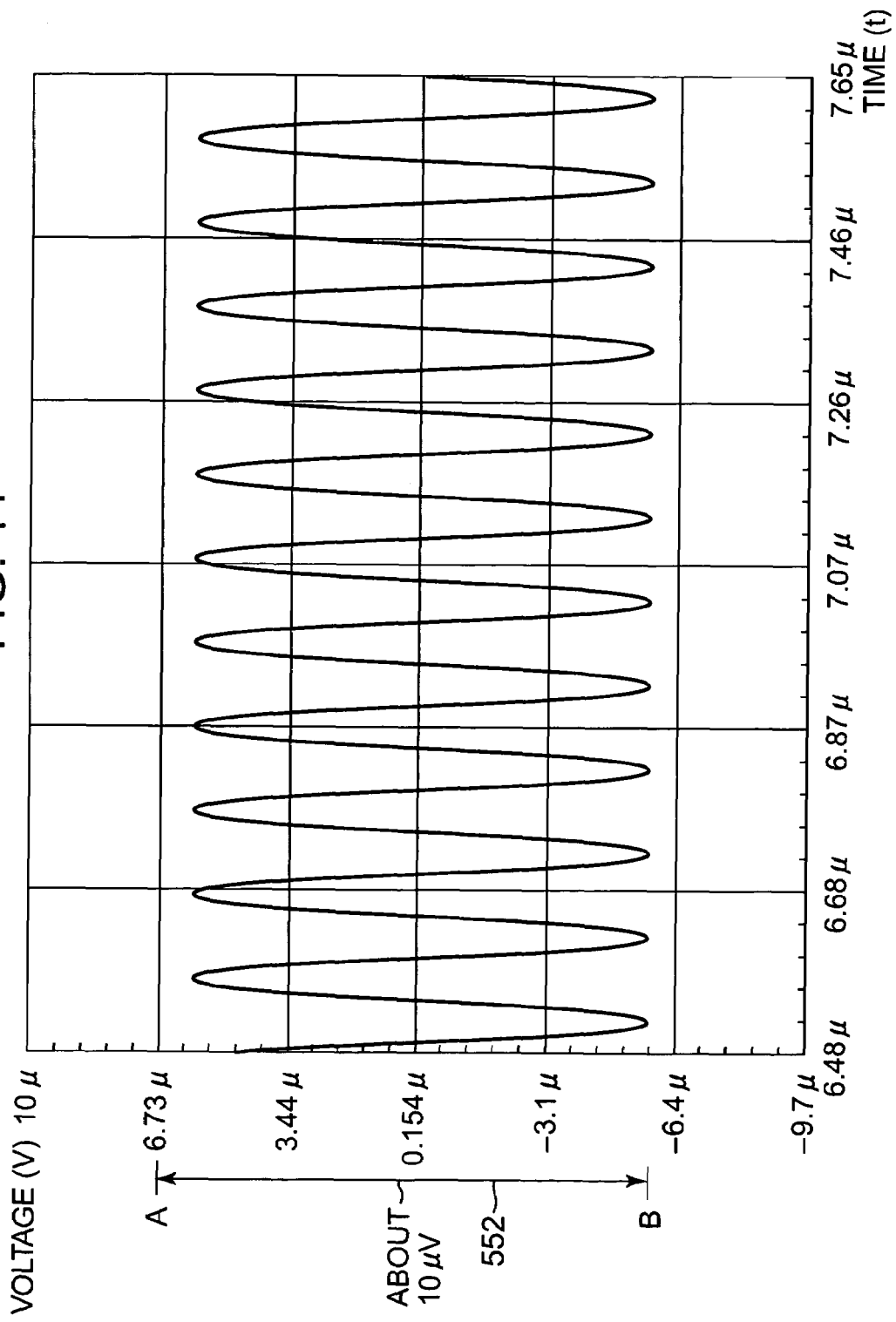
FIG. 11 is a graph showing an example of a signal received by a receiver.

When a simulation is performed by using the above-mentioned parameters, a received signal having the waveform shown in FIG. 11 is obtained as the result of the simulation. In the graph shown in FIG. 11, the vertical axis represents the voltage across Rr 423-1 (Rr 523-1) which is a reception load of the receiver 420 (the receiver 520 shown in FIG. 9), while the horizontal axis represents time. As indicated by an double-headed arrow 525 in FIG. 11, the difference between a maximum value A and a minimum value B (the difference between peak values) of the waveform of the received signal is observed as approximately 10 [μF]. Accordingly, since this difference is amplified by an amplifier having sufficient gain (the detector 423-2), the signal on the transmission side (the signal generated by the signal source 413-1) can be restored on the reception side.

Accordingly, the above-mentioned communication system does not need a physical reference point path and can realize communication based on only a communication signal transmission path, so that it is possible to easily provide communication environments not restricted by use environments.

The arrangement of the electrodes in each of the transmission and receivers will be described below. As mentioned above, the respective electrodes have mutually different functions, and form capacitances with respect to the communication medium, the spaces and the like. Namely, the respective electrodes are capacitively coupled to different objects, and operate by using different capacitive couplings. Accordingly, a method of arranging the electrodes is a very important factor in effectively capacitively coupling the respective electrodes to the desired objects.

For example, in the communication system 400 shown in FIG. 5, if communication is to be efficiently performed between the transmitter 410 and the receiver 420, the individual electrodes need be arranged on the following conditions; that is to say, the devices 410 and 420 need satisfy, for example, the conditions that both the capacitance between the transmission signal electrode 411 and the communication medium 430 and the capacitance between the reception signal electrode 421 and the communication medium 430 are sufficient, that both the capacitance between the transmission reference electrode 412 and the space and the capacitance between the reception reference electrode 422 and the space are sufficient, that the capacitance between the transmission signal electrode 411 and the transmission reference electrode 412 and the capacitance between the reception signal electrode 421 and the reception reference electrode 422 are respectively smaller than the capacitance between the transmission signal electrode 411 and the communication medium 430 and the capacitance between the reception signal electrode 421 and the communication medium 430, and that the capacitance between the transmission signal electrode 411 and the space and the capacitance between the reception signal electrode 421 and the space are respectively smaller than the capacitance between the transmission reference electrode 412 and the space and the capacitance between the reception reference electrode 422 and the space.

Arrangement examples of electrodes are shown in FIGS. 12 to 18. These examples described below can be applied either to a transmitter or a receiver. In the following description, reference will be made only to a transmitter, and that to a receiver is omitted. If the following examples are applied to a receiver, a transmission electrode should correspond to a reception electrode, and a transmission reference electrode to a reception reference electrode.

Figure 12:
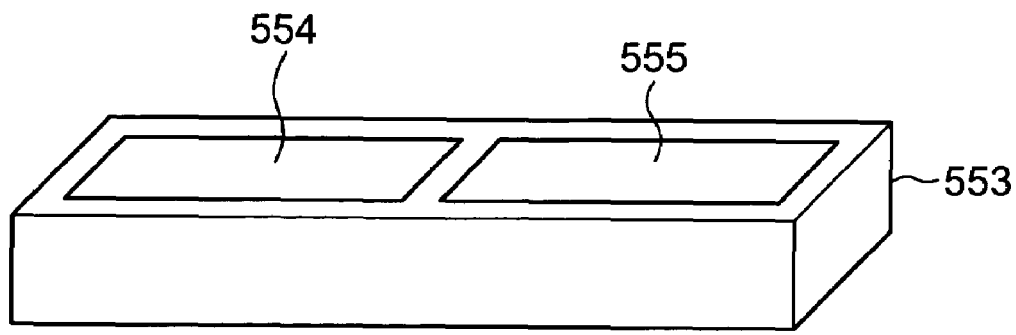
FIG. 12 is a schematic view showing an example of locations at which individual electrodes are disposed.

Referring to FIG. 12, two electrodes, i.e., a transmission signal electrode 554 and a transmission reference electrode 555, are arranged on the same plane of a casing 553. According to this construction, it is possible to decrease the capacitance between the two electrodes (the transmission signal electrode 554 and the transmission reference electrode 555), as compared with the case where the two electrodes are arranged to oppose each other. If the transmitter constructed in this manner is used, only one of the two electrodes is arranged close to a communication medium. For example, a folding mobile telephone has the casing 553 made of two units and a hinge section, and is constructed so that the two units are joined by the hinge section with the relative angle between the two units being variable and so that the casing 553 is foldable on the hinge section in the vicinity of its lengthwise center. If the electrode arrangement shown in FIG. 12 is applied to the folding mobile telephone, one of the electrodes can be arranged on the back side of a section provided with operating buttons, while the other electrode is arranged on the back side of a section provided with a display section. According to this arrangement, the electrode arranged in the section provided with operating buttons is covered with a hand of a user, and the electrode provided on the back side of the display section is arranged to face space; that is to say, it is possible to arrange the two electrodes so as to satisfy the above-mentioned conditions.

Figure 13:
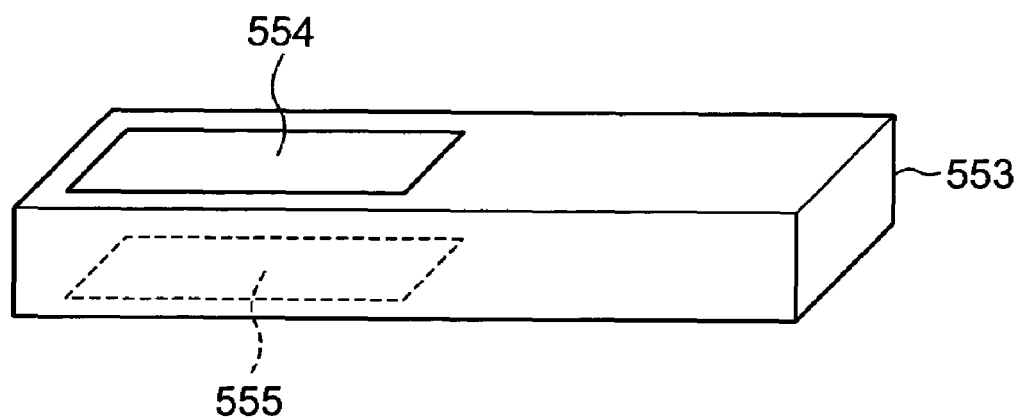
FIG. 13 is a schematic view showing another example of locations at which individual electrodes are disposed.

FIG. 13 is a schematic view showing the casing 553 in which the two electrodes (the transmission signal electrode 554 and the transmission reference electrode 555) are arranged to oppose each other. As compared with the arrangement shown in FIG. 12, the arrangement shown in FIG. 13 is suitable for the case where the casing 553 is comparatively small in size, although the capacitive coupling between the two electrodes is strong. In this case, it is desirable to arrange the respective two electrodes in directions spaced apart from each other by as much distance as possible in the casing 553.

Figure 14:
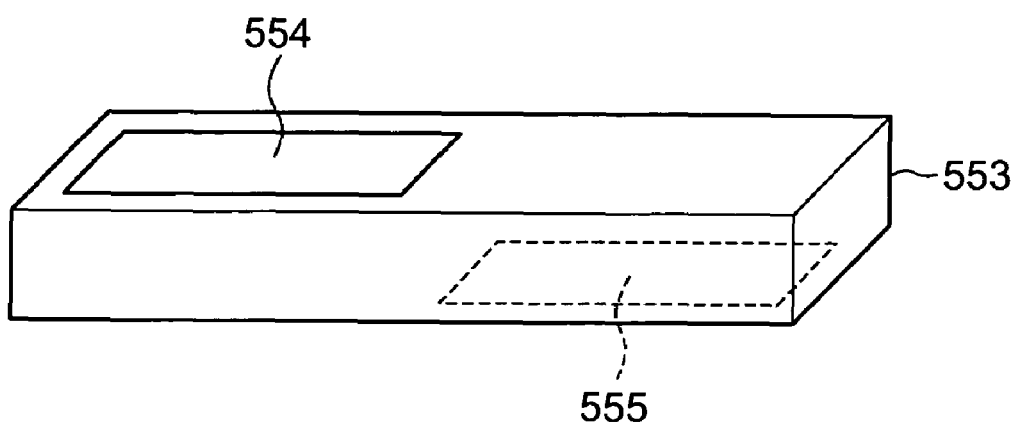
FIG. 14 is a schematic view showing another example of locations at which individual electrodes are disposed.

FIG. 14 is a schematic view showing the casing 553 in which the two electrodes (the transmission signal electrode 554 and the transmission reference electrode 555) are respectively arranged on mutually opposite faces so as not to directly oppose each other. In the case of this arrangement, the capacitive coupling between the two electrodes is smaller than that between the two electrodes shown in FIG. 13.

Figure 15:
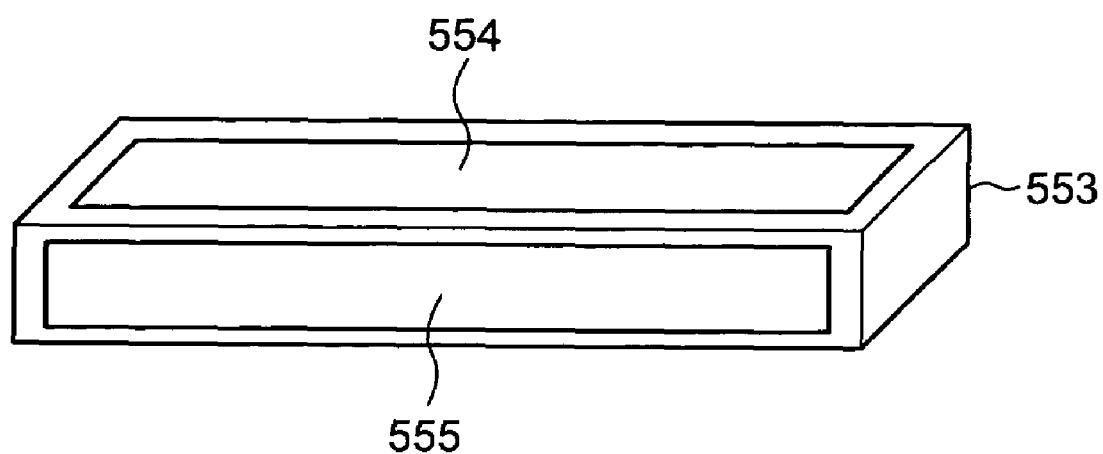
FIG. 15 is a schematic view showing another example of locations at which individual electrodes are disposed.

FIG. 15 is a schematic view showing the casing 553 in which the two electrodes (the transmission signal electrode 554 and the transmission reference electrode 555) are arranged perpendicular to each other. According to this arrangement, in uses where the transmission signal electrode 554 and the side of the casing 553 opposed thereto are placed near a communication medium, a lateral side of the casing 553 (a side on which the transmission reference electrode 555 is arranged) remains capacitively coupled to space, so that communication can be performed.

Figure 16B:
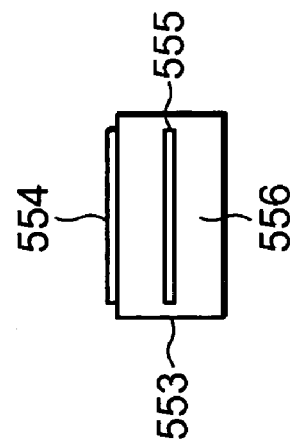
FIG. 16B is a schematic view showing another example of locations at which individual electrodes are disposed.
Figure 16A:
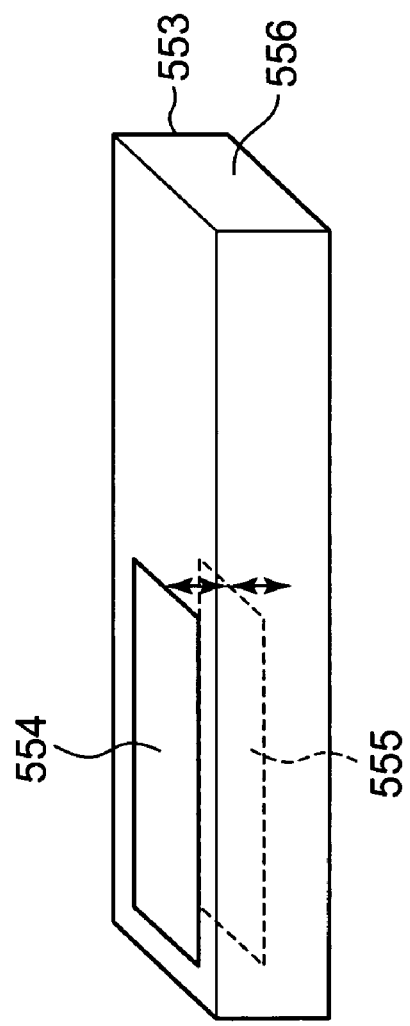
FIG. 16A is a schematic view showing another example of locations at which individual electrodes are disposed.

FIGS. 16A and 16B are schematic views showing that the transmission reference electrode 555 which is either one of the two electrodes in the arrangement shown in FIG. 13 is arranged inside the casing 553. Specifically, as shown in FIG. 16A, only the transmission reference electrode 555 is provided inside the casing 553. FIG. 16B is a schematic view showing an example of an electrode position as viewed from a side 556 of FIG. 16A. As shown in FIG. 16B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because the space inside the casing 553 exists around either one of the electrodes.

FIGS. 17A and 17B are schematic views showing that the transmission reference electrode 555 which is either one of the two electrodes in the arrangement shown in each of FIGS. 12 and 14 is arranged inside the casing 553. Specifically, as shown in FIG. 17A, only the transmission reference electrode 555 is provided inside the casing 553. FIG. 17B is a schematic view showing an example of an electrode position as viewed from the side 556 of FIG. 17A. As shown in FIG. 17B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

Figure 18B:
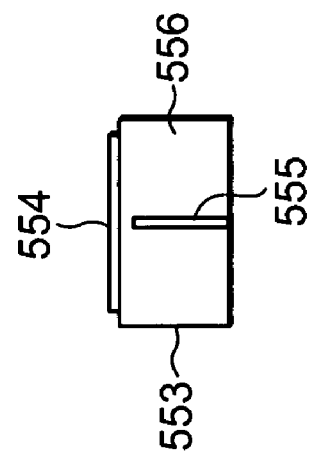
FIG. 18B is a schematic view showing another example of locations at which individual electrodes are disposed.
Figure 18A:
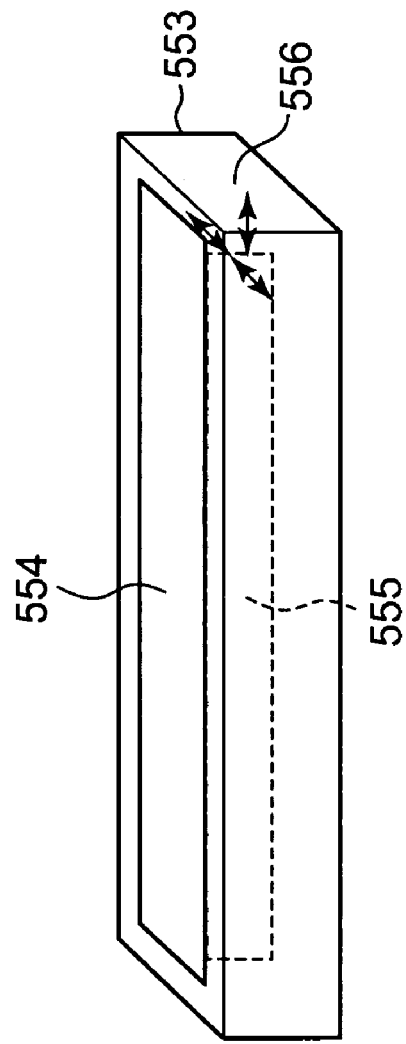
FIG. 18A is a schematic view showing another example of locations at which individual electrodes are disposed.

FIGS. 18A and 18B are schematic views showing that either one of the two electrodes in the arrangement shown in FIG. 15 is arranged inside the casing. Specifically, as shown in FIG. 18A, only the transmission reference electrode 555 is provided inside the casing 553. FIG. 18B is a schematic view showing an example of an electrode position as viewed from the side 556 of FIG. 18A. As shown in FIG. 18B, the transmission signal electrode 554 is arranged on a surface of the casing 553, and only the transmission reference electrode 555 is arranged inside the casing 553. According to this arrangement, even if the casing 553 is widely covered with a communication medium, communication can be performed, because a space margin inside the casing 553 exists around either one of the electrodes.

In any of the above-mentioned electrode arrangements, one of the two electrodes is arranged closer to a communication medium than the other is, and the one is arranged to have a stronger capacitive coupling to space. In addition, in each of the electrode arrangements, the two electrodes are desirably arranged so that the capacitive coupling therebetween is weaker than the other capacitive couplings.

Figure 19A:
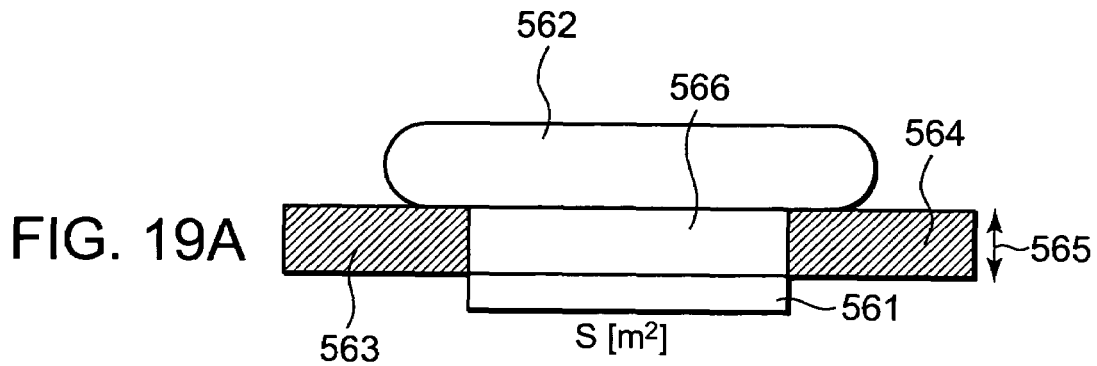
FIG. 19A is a schematic view showing a first example of locations at which individual electrodes are disposed.
Figure 19B:
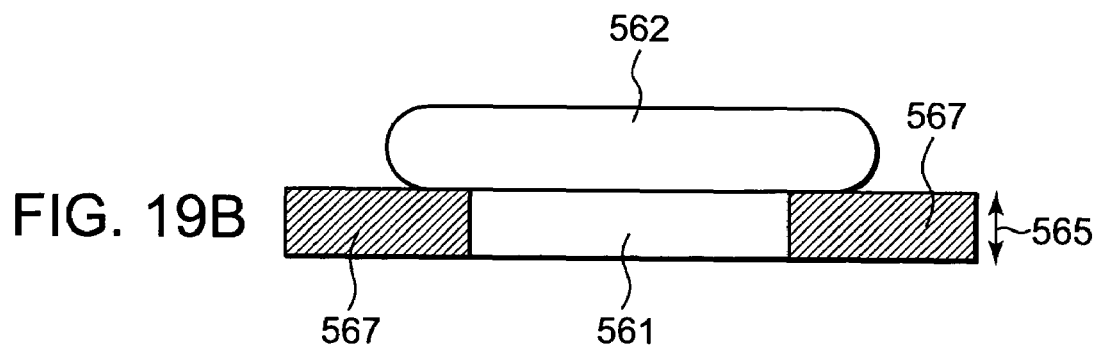
FIG. 19B is a schematic view showing a second example of locations at which individual electrodes are disposed.

The transmitter or the receiver may also be incorporated in an arbitrary casing. In each of the devices according to the embodiment of the present invention, there are at least two electrodes which are electrically isolated from each other, so that a casing in which to incorporate the electrodes is also made of an insulator having a certain thickness. FIGS. 19A to 19B are cross-sectional views of a transmission signal electrode and neighboring sections. A transmission reference electrode, a reception signal electrode and a reception reference electrode have a similar construction to the transmission signal electrode, and the above description can be applied to any of those electrodes. Accordingly, the description of those electrodes is omitted herein.

FIG. 19A shows a cross-sectional view around the electrodes. As casings 563 and 564 have a physical thickness d [m] as indicated by a double-headed arrow 565, a space equal to the thickness is at least maintained between the electrodes and the communication medium (for example, between the transmission signal electrode 561 and the communication medium 562) or between the electrodes and the space. As is clear from the above-described, it is generally preferable to increase the capacitance between the electrodes and the communication medium, or between the electrodes and the space.

An example is considered in which the casings 563 and 564 are brought into contact with the communication medium 562. The capacitive coupling C between the transmission signal electrode 561 and the communication medium 562 in this case can be found from formula (9), and can therefore be expressed by the following formula (22).

[Formula 22]

$$C = (\varepsilon_r \times \varepsilon_0) \times \frac{S}{d} \; [F] \qquad (22)$$

In formula (22), $\varepsilon_0$ denotes a vacuum dielectric constant having a fixed value of $8.854 \times 10^{-12}$ [F/m], $\varepsilon_r$ denotes a specific dielectric constant at that location, and S denotes a surface area of the transmission signal electrode 561. If a dielectric having a high specific dielectric constant is arranged in the space 566 formed above the transmission signal electrode 561, the capacitive coupling C can be increased to improve the performance of the device.

In a similar manner, it is possible to increase the capacitance between the transmission signal electrode 561 and the neighboring space. In the example of FIG. 19A, dielectric materials are inserted into the portion corresponding to the thickness of the casing (the double-headed arrow 565). However, the dielectric materials may be positioned any portion, not restricted to that portion.

FIG. 19B shows an example in which the electrode is embedded in a casing. In FIG. 19B, the transmission signal electrode 561 is configured to be embedded in the casing 567 (as is made a portion of the casing 567). Thus, the communication medium 562 is brought into contact with the casing 567, and simultaneously with the transmission signal electrode 561. In addition, an insulation layer may also be formed on the surface of the transmission signal electrode 561 so that the communication medium 562 and the transmission signal electrode 561 can be held in non-contact with each other.

Figure 19C:
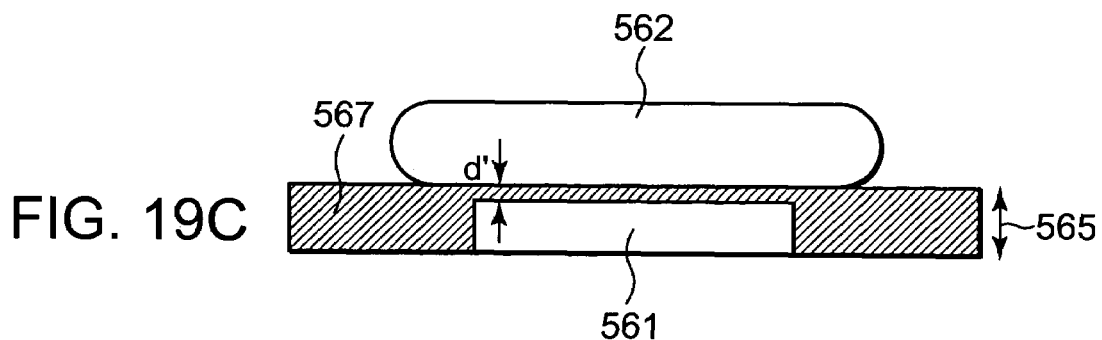
FIG. 19C is a schematic view showing a third example of locations at which individual Electrodes are disposed.

FIG. 19C is similar to FIG. 19B but shows an example in which a hollow having an opening area equivalent to the surface area of the transmission signal electrode 561 is formed in the casing 567 with a thickness d' being left, and the transmission signal electrode 561 is embedded in the hollow. If the casing 567 is formed by solid casting, manufacturing costs and component costs can be reduced and capacitive coupling can be easily increased by the present method.

According to the above-described explanation, when a plurality of electrodes is arrange in the same plane as shown FIG. 12, it is possible to make a communication by inserting dielectric materials at the side of the transmission signal electrode 554 (or inserting much higher dielectric materials at the side of transmission signal electrode 554 than that at the side of the transmission reference electrode 555) so that the transmission signal electrode 554 has a stronger capacitive coupling with the communication medium to have a potential difference between the electrodes, even if both of the transmission signal electrode 554 and the transmission reference electrode 555 couple with the communication medium.

The sizes of individual electrodes will be described below. At least a transmission reference electrode and a reception reference electrode need to form a capacitance relative to a sufficient space so that a communication medium can obtained a sufficient potential, but a transmission signal electrode and a reception signal electrode may be designed to have optimum sizes on the basis of a capacitance relative to the communication medium and the nature of signals to flow in the communication medium. Accordingly, generally, the transmission reference electrode is made larger in size than the transmission signal electrode, and the reception reference electrode is made larger in size than the reception signal electrode. However, it is of course possible to adopt other relationships as long as sufficient signals for communication can be obtained.

Specifically, if the size of the transmission reference electrode is made coincident with the size of the transmission signal electrode and the size of the reception reference electrode is made coincident with the size of the reception signal electrode, these electrodes appear to have mutually equivalent characteristics, as viewed from a reference point which is an infinite point. Accordingly, there is the advantage that whichever electrode may be used as a reference electrode (or a signal electrode) (even if a reference electrode and a signal electrode are arranged to be able to be switched therebetween), it is possible to obtain equivalent communication performance.

In other words, there is the advantage that if the signal electrode and the reference electrode are designed to have mutually different sizes, communication can be performed only when one of the electrodes (an electrode which is set as a signal electrode) is moved close to the communication medium.

Shields of circuits will be described below. In the above description, a transmitter section and a receiver section other than electrodes have been regarded as transparent in the consideration of the physical construction of a communication system, but it is actually general that the communication system is constructed by using electronic parts and the like. Electronic parts are made of materials having some electrical nature such as conductivity or dielectricity, and such electronic parts exist near the electrodes and influence the operation of the electrodes. In the embodiment of the present invention, since capacitive couplings and the like in space have various influences, an electronic circuit itself mounted on a circuit board is exposed to such influences. Accordingly, if a far more stable operation is needed, it is desirable to shield the entire circuit with a conductor.

A shielding conductor is generally considered to be connected to a transmission reference electrode or a reception reference electrode which also serves as a reference potential for a transmission or receiver, but if there is no problem in operation, the shielded conductor may be connected to a transmission signal electrode or a reception signal electrode. Since the shielding conductor itself has a physical size, it is necessary to take account of the fact that the shielding conductor operates in mutual relationships to other electrodes, communication media and spaces in accordance with the above-mentioned principles.

Figure 20:
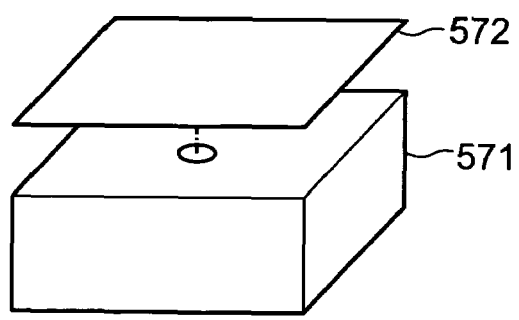
FIG. 20 is a schematic view showing another construction example of an electrode.

FIG. 20 shows an embodiment of a shielding construction. In this embodiment, the device is assumed to operate on a battery, and electronic parts inclusive of the battery are housed in a shield case 571 which also serves as a reference electrode. An electrode 572 is a signal electrode.

Transmission media will be described below. In the above description of the embodiments, reference has been made to conductors as a main example of a communication medium, but a dielectric having no conductivity also enables communication. This is because electric fields injected into the communication medium from a transmission signal electrode are propagated by the polarizing action of the dielectric.

Specifically, a metal such as electric wire is available as a conductor and pure water or the like is available as a dielectric, but a living body, a physiological saline solution or the like having both natures also enable communication. In addition, vacuum and air also have dielectricity and are communicable to serve as a communication medium.

Noise will be described below. In space, potential varies due to various factors such as noise from an AC power source, noise from a fluorescent lamp, various consumer electrical appliances and electrical equipment, and the influence of charged corpuscles in the air. In the above description, potential variations have been neglected, but these noises penetrate each section of the transmitter, the communication medium and the receiver.

Figure 21:
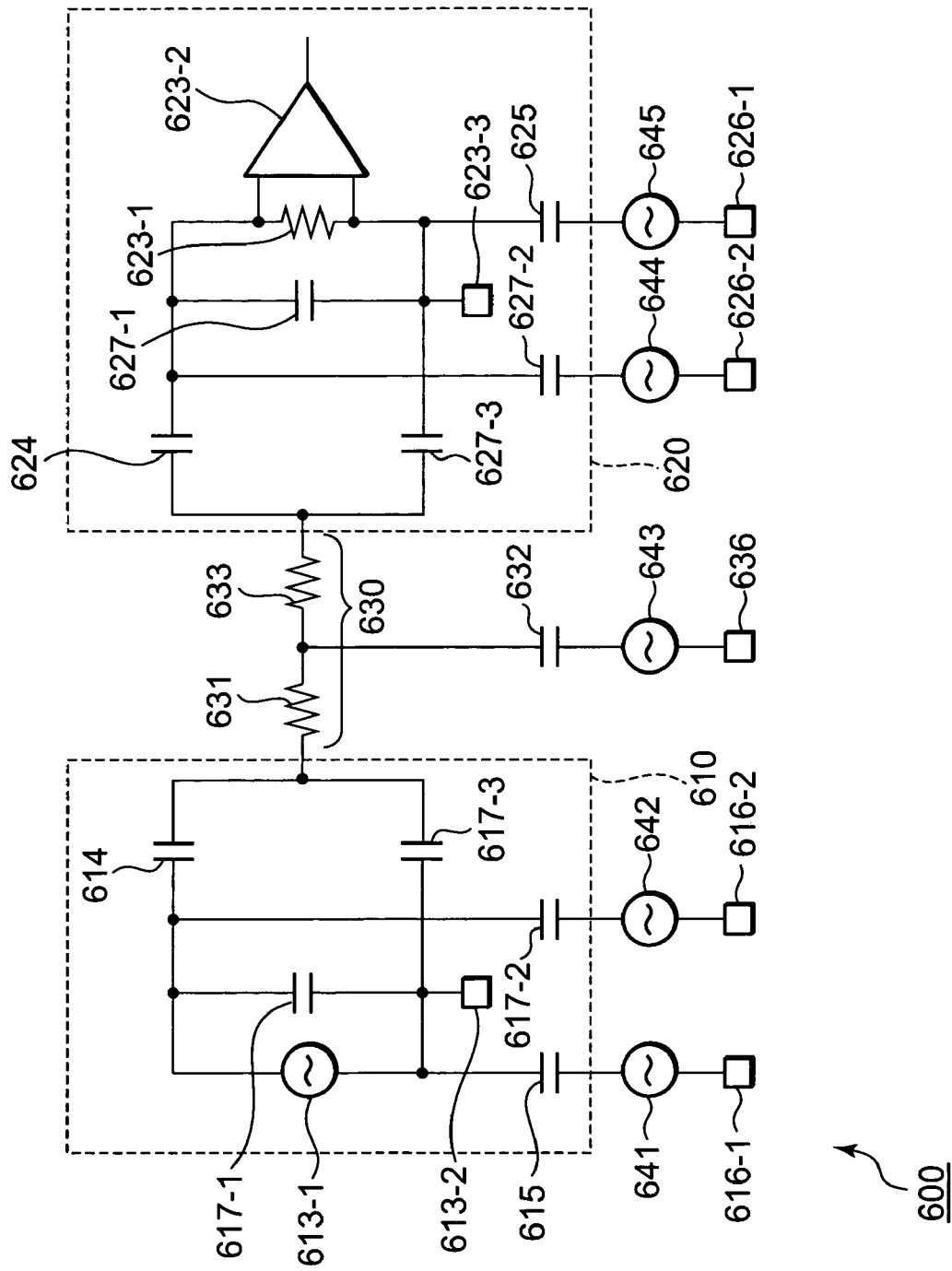
FIG. 21 is a diagram showing another example of an equivalent circuit of the model shown in FIG. 5.

FIG. 21 is a diagram showing an equivalent circuit of the communication system 100 shown in FIG. 1, inclusive of noise components. A communication system 600 shown in FIG. 21 corresponds to the communication system 500 shown in FIG. 9, a transmitter 610 of the communication system 600 corresponds to the transmitter 510 of the communication system 500, a receiver 620 corresponds to the receiver 520, and a connection line 630 corresponds to the connection line 530.

In the transmitter 610, a signal source 613-1, a ground point 613-2, Cte 614, Ctg 615, a ground point 616-1, a ground point 616-2, Ctb 617-1, Cth 617-2 and Cti 617-3 respectively correspond to the signal source 513-1, the ground point 513-2, Cte 514, Ctg 515, the ground point 516-1, the ground point 516-2, Ctb 517-1, Cth 517-2, and Cti 517-3 in the transmitter 510. Unlike the case shown in FIG. 9, in the transmitter 610, two signal sources, i.e., a noise 641 and a noise 642, are respectively provided between Ctg 615 and a ground point 616-1 and between Cth 617-2 and a ground point 616-2.

In the receiver 620, Rr 623-1, a detector 623-2, a ground point 623-3, Cre 624, Crg 625, a ground point 626-1, a ground point 626-2, Crb 627-1, Crh 627-2 and Cri 627-3 respectively correspond to Rr 523-1, the detector 523-2, the ground point 523-3, Cre 524, Crg 525, the ground point 526-1, the ground point 526-2, Crb 527-1, Crh 527-2, and Cri 527-3 in the receiver 520. Unlike the case shown in FIG. 9, in the receiver 620, two signal sources, i.e., a noise 644 and a noise 645, are respectively provided between Crh 627-2 and a ground point 626-2 and between Crg 625 and a ground point 626-1.

Rm 631, Cm 632, Rm 633 and a ground point 636 in the connection line 630 respectively correspond to Rm 531, Cm 532, Rm 533 and the ground point 536 in the connection line 530. Unlike the case shown in FIG. 9, in the connection line 630, a signal source which serves as a noise 643 is provided between Cm 632 and the ground point 636.

Each of the devices operates on the basis of the ground point 613-2 or 623-3 which is the ground potential of itself, so that if noises penetrating the devices have relatively the same components relative to the transmitter, the communication medium and the receiver, such noises have no influence in operation. On the other hand, particularly in a case where the distance between the devices is apart or in an environment where there is an amount of noise, there is a high possibility that a relative difference in noise occurs between the devices; that is to say, the motions of the noises 641 to 645 differ from one another. This difference has no problem if it is not accompanied by a temporal variation, because the relative difference between signal levels to be used need only be transmitted. However, in a case where the variation cycles of the respective noises overlap a frequency band to be used, a frequency and signal levels to be used need be determined to take the characteristics of the noises into account. In other words, if a frequency and signal levels to be used are only determined while taking noise characteristics into account, the communication system 600 can realize communication which has resistance to noise components and is based on only a communication signal transmission path without the need for a physical reference point path. Accordingly, it is possible to provide a communication environment which is not easily restricted by use environments.

The influence of the magnitude of distance between the transmitter and the receiver on communication will be described below. As mentioned previously, according to the principles of the present invention, if a sufficient capacitance is formed in the space between the transmission reference electrode and the reception reference electrode, communication does not need a path due to the ground near the transmission and receivers or other electrical paths, and does not depend on the distance between the transmission signal electrode and the reception signal electrode. Accordingly, for example, in a communication system 700 shown in FIG. 22, if a transmitter 710 and a receiver 720 are spaced a long distance apart from each other, it is possible to perform communication by capacitively coupling a transmission signal electrode 711 and a reception signal electrode 721 by a communication medium 730 having a sufficient conductivity or dielectricity. At this time, a transmission reference electrode 712 is capacitively coupled to a space outside the transmitter 710, and a reception reference electrode 722 is capacitively coupled to a space outside the receiver 720. Accordingly, the transmission reference electrode 712 and the reception reference electrode 722 need not be capacitively coupled to each other. However, as the communication medium 730 becomes longer or larger, the capacitance of the communication medium 730 to space increases, so that it is necessary to take the capacitance into account when each parameter is to be determined.

Figure 22:
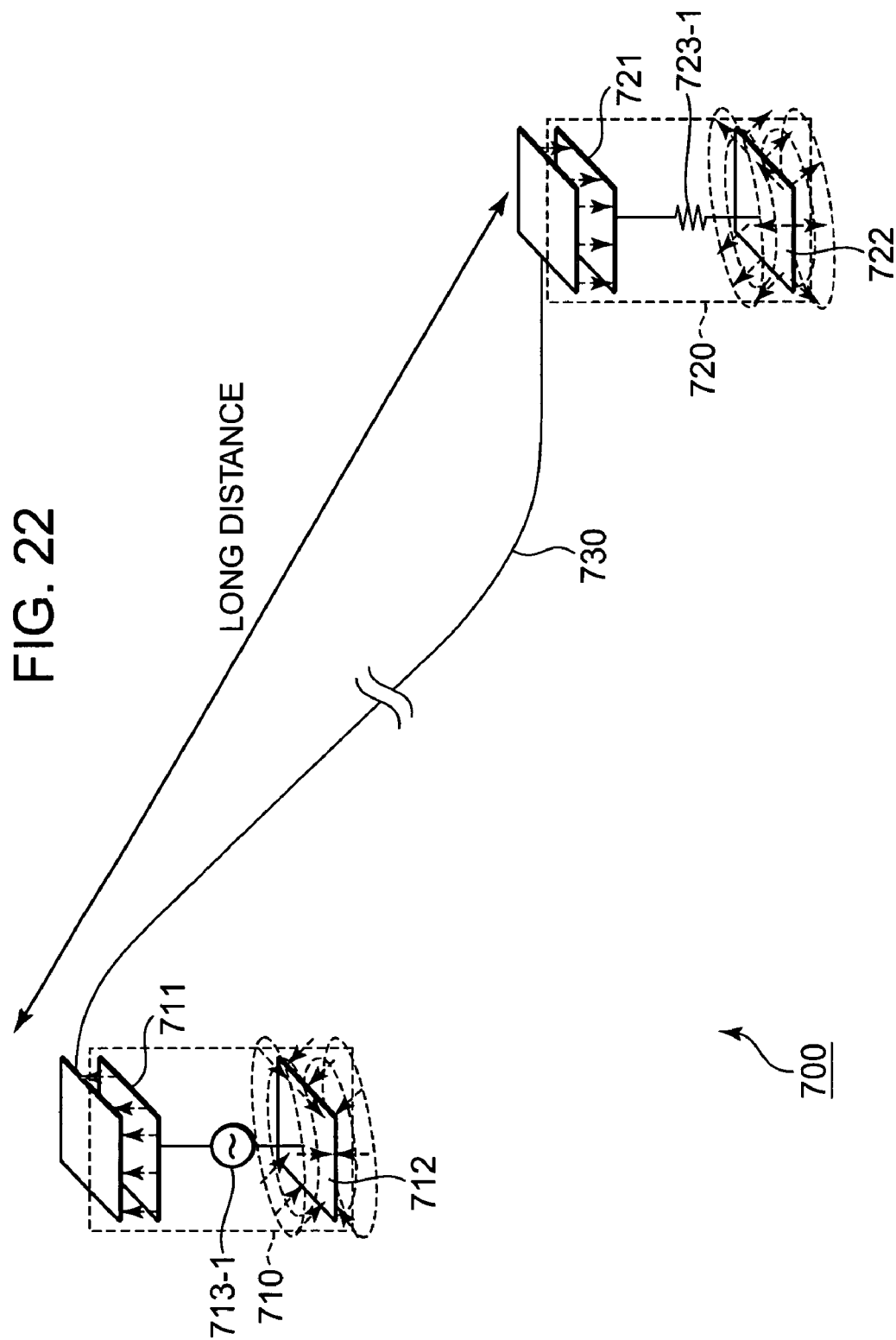
FIG. 22 is a diagram showing an arrangement example of the communication system shown in FIG. 1.

The communication system 700 shown in FIG. 22 is a system corresponding to the communication system 100 shown in FIG. 1, and the transmitter 710 corresponds to the transmitter 110, the receiver 720 corresponds to the receiver 120, and the communication medium 730 corresponds to the communication medium 130.

In the transmitter 710, the transmission signal electrode 711, the transmission reference electrode 712 and a signal source 713-1 respectively correspond to the transmission signal electrode 111, the transmission reference electrode 112 and (part of) the transmitter section 113. Similarly, in the transmission reference electrode 712, the reception signal electrode 721, the reception reference electrode 722 and the Rr 723-1 respectively correspond to the reception signal electrode 121, the reception reference electrode 122 and (part of) the receiver section 123.

The description of each of the above-mentioned sections is, therefore, omitted herein.

As mentioned above, the communication system 700 can realize communication which has resistance to noise components and is based on only a communication signal transmission path without the need for a physical reference point path. Accordingly, it is possible to provide a communication environment not restricted by use environments.

In the above description, the transmission signal electrode and the reception signal electrode have been mentioned as being in non-contact with the communication medium, but this construction is not limitative, and as long as a sufficient capacitance can be obtained between each of the transmission reference electrode and the reception reference electrode and the space neighboring the corresponding one of the transmission and receivers, the transmission signal electrode and the reception signal electrode may also be connected to each other by a communication medium having conductivity.

Figure 23:
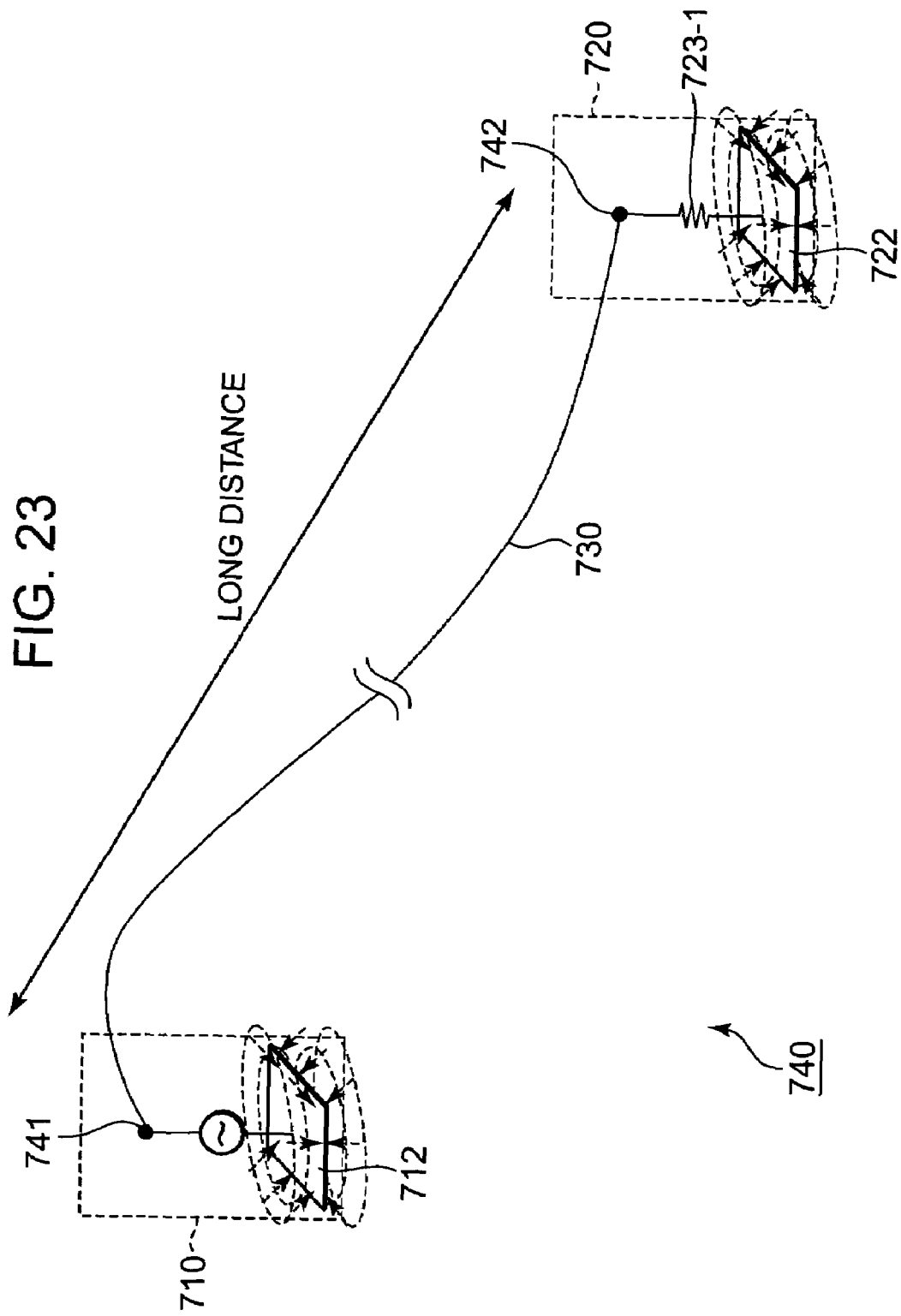
FIG. 23 is a diagram showing another construction example of the communication system which underlies the present invention.

FIG. 23 is a diagram aiding in explaining an example of a communication system in which a transmission reference electrode and a reception reference electrode are connected to each other via a communication medium.

In FIG. 23, a communication system 740 is a system corresponding to the communication system 700 shown in FIG.

22. In the case of the communication system 740, the transmission signal electrode 711 does not exist in the transmitter 710, and the transmitter 710 and the communication medium 730 are connected to each other at a contact 741. Similarly, in the receiver 720 in the communication system 740, the reception signal electrode 721 does not exist, and the receiver 720 and the communication medium 730 are connected to each other at a contact 742.

A general wired communication system includes at least two signal lines and is constructed to perform communication by using the relative difference in level between the signals. On the other hand, in accordance with the present invention, communication can be performed through one signal line.

Namely, the communication system 740 can also realize communication which is based on only a communication signal transmission path without the need for a physical reference point path. Accordingly, it is possible to provide a communication environment which is free from possible limitations of use environments.

Figure 24:
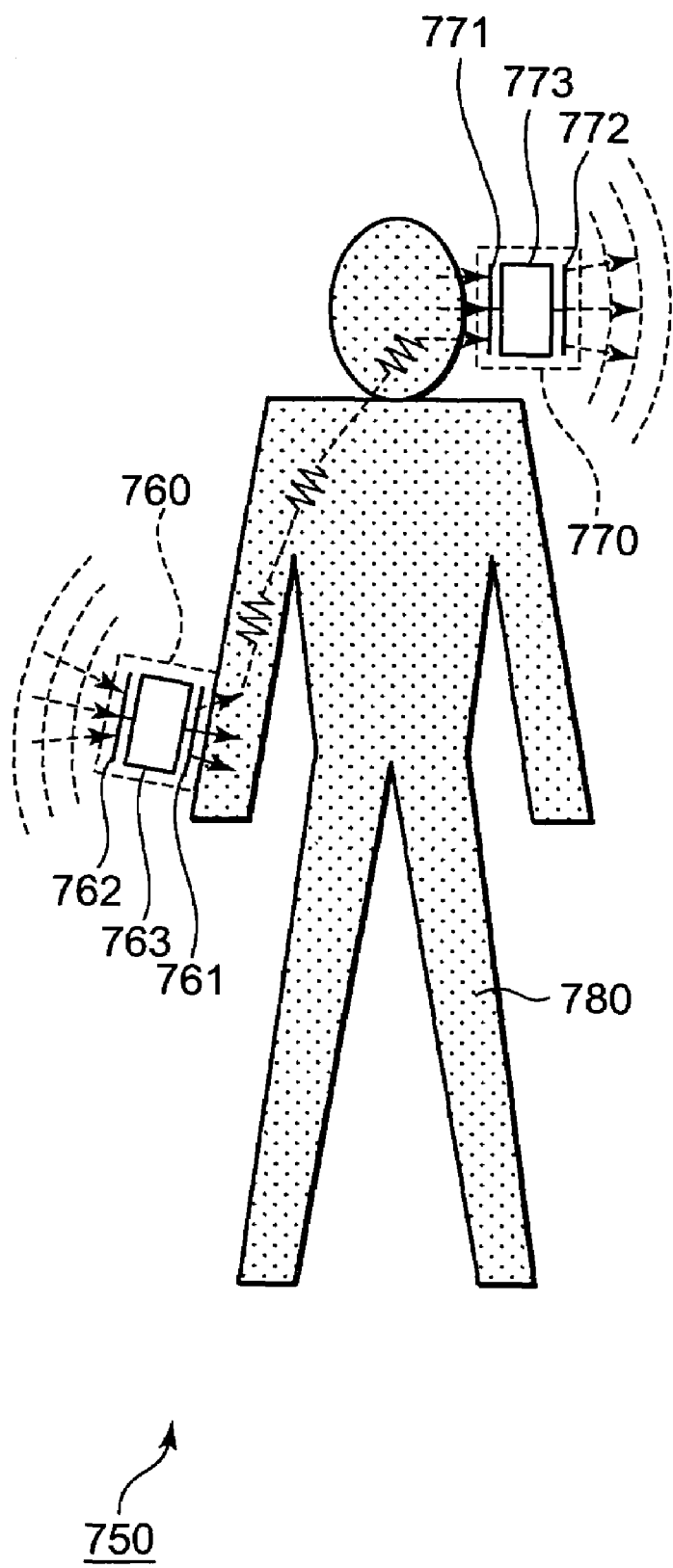
FIG. 24 is a schematic view showing an actual use example of the embodiment of the communication system which underlies the present invention.

Specific applied examples of the above-mentioned communication system will be described below. The communication system can use, for example, a living body as a communication medium. FIG. 24 is a schematic view showing an example of a communication system which performs communication via a living body. In FIG. 24, a communication system 750 is a system in which music data is transmitted from a transmitter 760 fitted to an arm of the body of a user and the music data is received and converted into sound by a receiver 770 fitted to the head of the body, and the sound is outputted so that the user can listen to the sound. The communication system 750 is a system corresponding to any of the above-mentioned communication systems (for example, the communication system 100), and the transmitter 760 and the receiver 770 correspond to the transmitter 110 and the receiver 120, respectively. In the communication system 750, a body 780 is a communication medium corresponding to the communication medium 130 shown in FIG. 1.

Namely, the transmitter 760 has a transmission signal electrode 761, a transmission reference electrode 762, and a transmitter section 763 which respectively correspond to the transmission signal electrode 111, the transmission reference electrode 112 and the transmitter section 113 shown in FIG. 1. The receiver 770 has a reception signal electrode 771, a reception reference electrode 772, and a receiver section 773 which respectively correspond to the reception signal electrode 121, the reception reference electrode 122 and the receiver section 123 shown in FIG. 1.

Accordingly, the transmitter 760 and the receiver 770 are arranged so that the transmission signal electrode 761 and the reception signal electrode 771 are brought into contact with or into close proximity to the body 780 which is a communication medium. Since the transmission reference electrode 762 and the reception reference electrode 772 may be in contact with space, there is no need for coupling to the ground around the devices nor for mutual coupling of the transmission and receivers (or electrodes).

Figure 25:
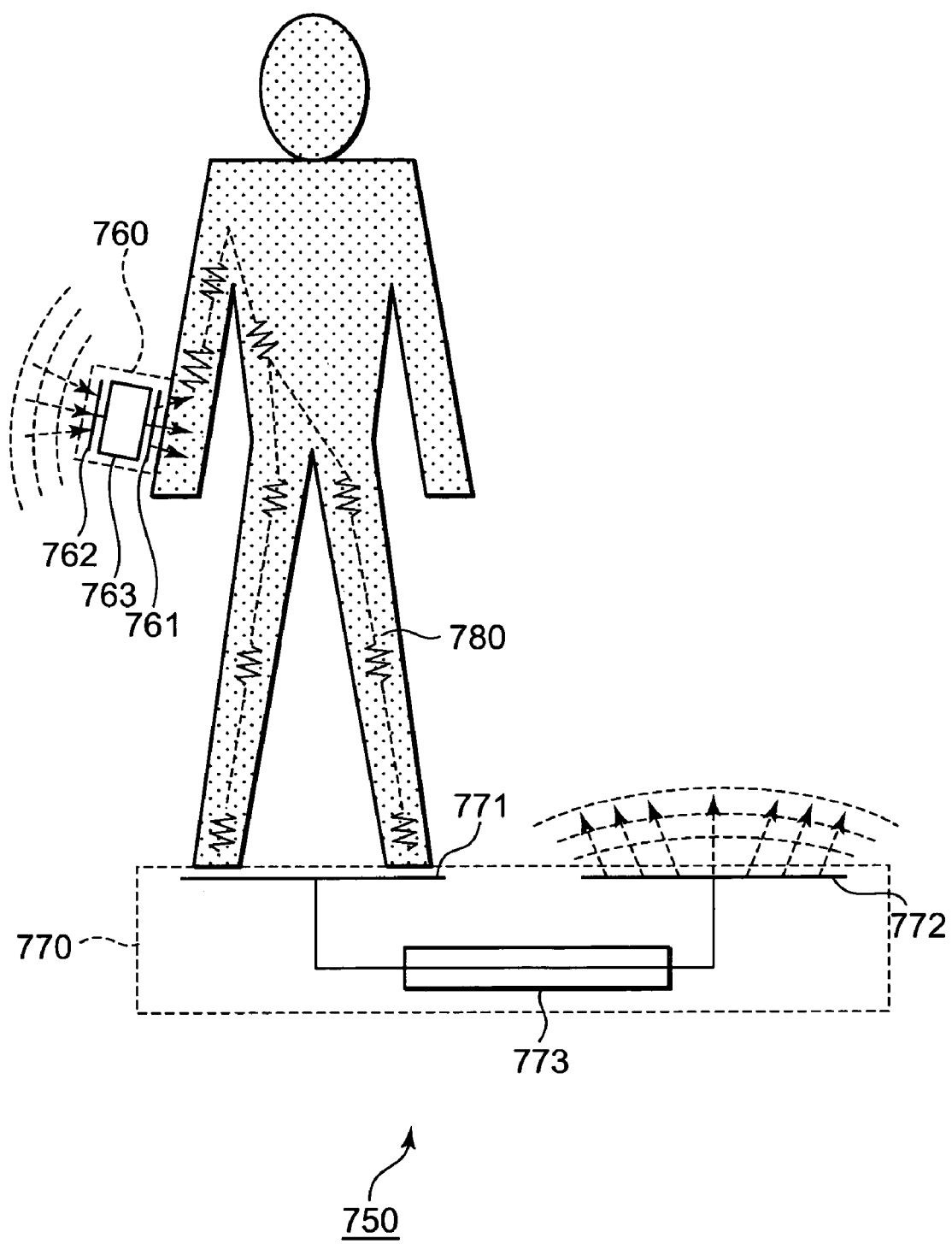
FIG. 25 is a schematic view showing another use example of the embodiment of the communication system which underlies the present invention.

FIG. 25 is a schematic view aiding in explaining another example which realizes the communication system 750. In FIG. 25, the receiver 770 is brought into contact with (or close proximity to) the soles of the body 780 and performs communication with the transmitter 760 fitted to an arm of the body 780. In this case well, the transmission signal electrode 761 and the reception signal electrode 771 are provided so as to be brought into contact with (or into close proximity to) the body 780 which is a communication medium, and the transmission reference electrode 762 and the reception reference electrode 772 are provided to face space. The example shown in FIG. 25 is particularly an applied example which could not have been realized by a prior art using the ground as one of communication media.

Namely, the above-mentioned communication system 750 can realize communication which is based on only a communication signal transmission path without the need for a physical reference point path. Accordingly, it is possible to provide a communication environment which is not restricted by use environments.

In each of the above-mentioned communication systems, the method of modulating signals to be transmitted through the communication medium is not limited to a particular method, and it is possible to select any optimum method on the basis of the characteristics of the entire communication system as long as the method can cope with both the transmitter section and the receiver. Specifically, as a modulation method, it is possible use any one of a baseband analog signal, an amplitude-modulated analog signal, a frequency-modulated analog signal and a baseband digital signal, or any one of an amplitude-modulated digital signal, a frequency-modulated digital sound and a phase-modulated digital signal, or a combination of a plurality of signals selected from among those signals.

In addition, each of the above-mentioned communication systems may be constructed to use one communication medium to establish a plurality of communications so that the communication system can execute communications such as full-duplex communication and communication between a plurality of devices through a single communication medium.

Examples of techniques for realizing such multiplex communications will be described below. The first technique is a technique using spread spectrum communication. In this case, a frequency bandwidth and a particular time series code are decided on between a transmitter and a receiver in advance. The transmitter varies the frequency of an original signal and spreads the original signal within the frequency bandwidth on the basis of the time series code, and transmits spread components. After having received the spread components, the receiver decodes the received signal by integrating the received signal.

Advantages obtainable by frequency spread will be described below. According to the Shannon-Hartley channel capacity theorem, the following formula is established:

[Formula 23]

$$C = B \times \log_2\left(1 + \frac{S}{N}\right) \text{ [bps]} \tag{23}$$

In formula (23), C [bps] denotes a channel capacity which indicates a theoretically maximum data rate which can be transmitted in a communication path. B [Hz] denotes a channel bandwidth. S/N denotes a signal-to-noise-power ratio (SN ratio). In addition, if the above formula (23) is Maclaurin-expanded to decrease the S/N ratio, the above formula (23) can be approximated by the following formula (24):

[Formula 24]

$$C \approx \frac{S}{N} \times B \text{ [bps]} \tag{24}$$

Accordingly, if S/N is not higher than, for example, a noise floor level, S/N<<1 is obtained, but the channel capacity C can be raised to a desired level by widening the channel bandwidth B.

If different time series codes are prepared for different communication paths so that frequency spreading is performed on the communication paths in different manners, their frequencies are spread without mutual interference, so that mutual interference can be suppressed to effect a plurality of communications at the same time.

Figure 26:
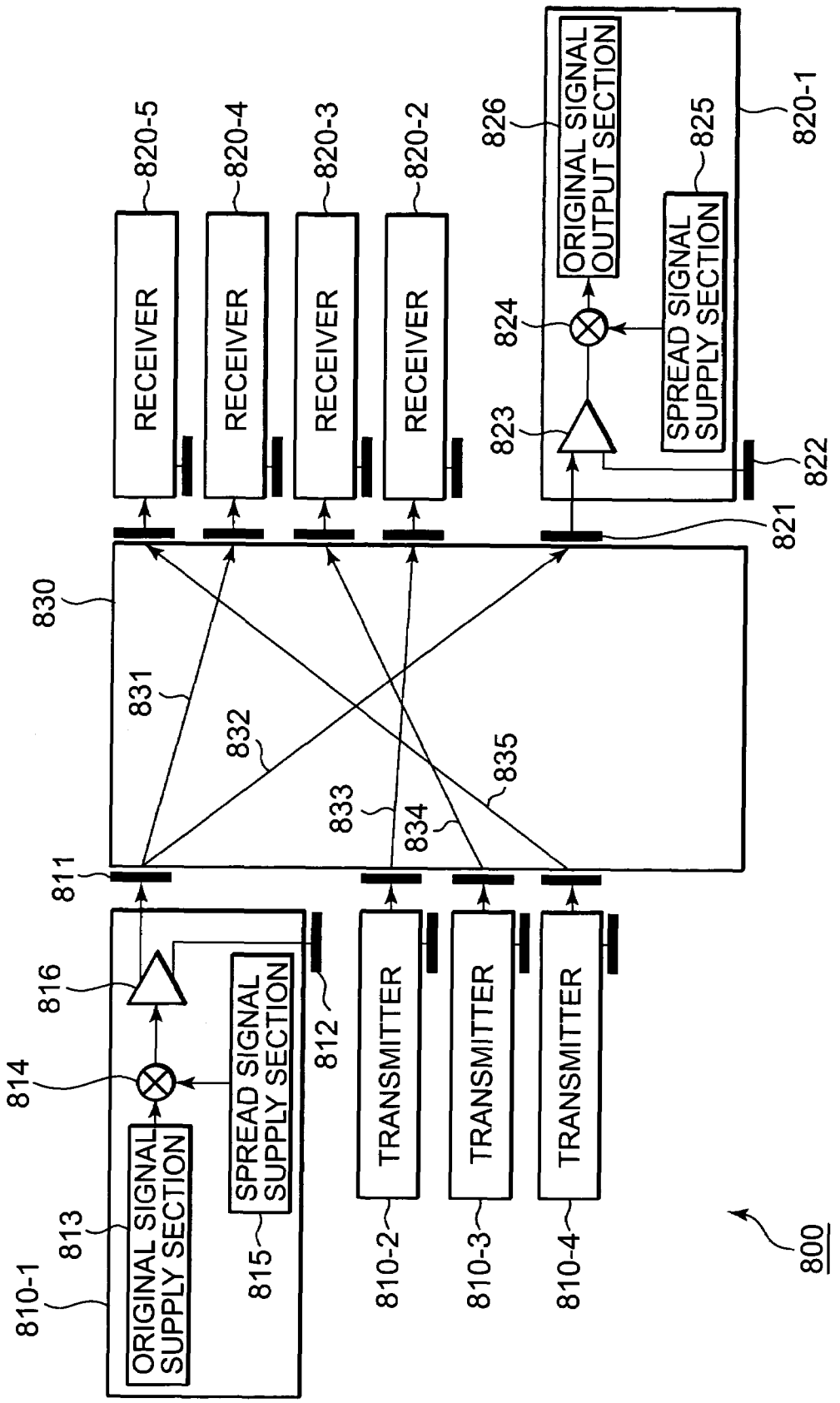
FIG. 26 is a schematic view showing another construction example of the communication system which underlies the present invention.

FIG. 26 is a diagram showing another construction example of the communication system which underlies the present invention. In a communication system 800 shown in FIG. 26, four transmitters 810-1 to 810-4 and five receivers 820-1 to 820-5 perform multiplex communications via a communication medium 830 by using a spread spectrum technique.

The transmitter 810-1 corresponds to the transmitter 110 shown in FIG. 1 and has a transmission signal electrode 811 and a transmission reference electrode 812, and further has, as a construction corresponding to the transmitter section 113, an original signal supply section 813, a multiplier 814, a spread signal supply section 815, and an amplifier 816.

The original signal supply section 813 generates an original signal which is a signal before the frequencies are spread, and supplies the signal to the multiplier 814. The spread signal supply section 815 generates a spread signal which spreads the frequencies, and supplies the spread signal to the multiplier 814. There are two representative spread techniques using spread signals, a direct sequence technique (hereinafter referred to as the DS technique) and a frequency hopping technique (hereinafter referred to as the FH technique). The DS technique is a technique which causes the multiplier 814 to perform multiplication on the time series code having a frequency component higher than at least the original signal. The result of the multiplication is carried on a predetermined carrier, and is outputted from the amplifier 816 after having been amplified by the same.

The FH technique is a technique which varies the frequency of a carrier by the time series code and generates a spread signal. The spread signal is multiplied by an original signal by the multiplier 814, and the multiplication result is outputted from the amplifier 816 after having been amplified by the same. One of the outputs of the amplifier 816 is connected to the transmission signal electrode 811, while the other is connected to the transmission reference electrode 812.

Each of the transmitters 810-2 to 810-4 is similar in construction to the transmitter 810-1, and since the description of the transmitter 810-1 is applicable, the repetition of the same description will be omitted.

The receiver 820-1 corresponds to the receiver 120 shown in FIG. 1, and has a reception signal electrode 821 and a reception reference electrode 822 and further has, as a construction corresponding to the receiver section 123, an amplifier 823, a multiplier 824, a spread signal supply section 825 and an original signal output section 826.

After the receiver 820-1 has first restored an electrical signal on the basis of the method according to the present invention, the receiver 820-1 restores the original signal (a signal supplied from the original signal supply section 813) by the signal processing opposite to that of the transmitter 810-1.

Figure 27:
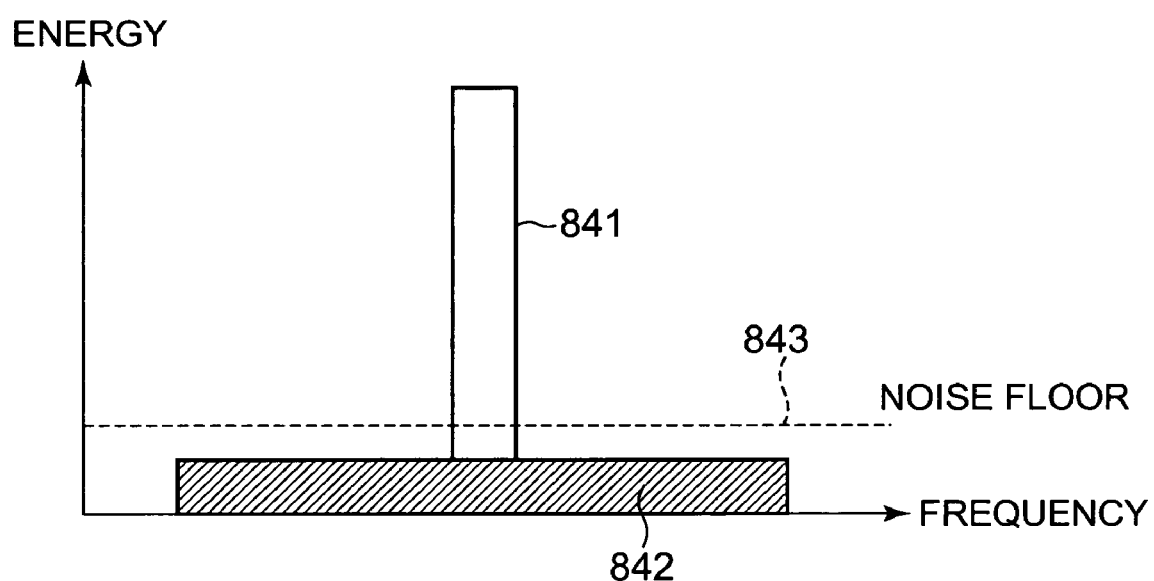
FIG. 27 is a graph showing an example of distribution of a frequency spectrum.

FIG. 27 shows a frequency spectrum due to such technique. The horizontal axis represents frequency, while the vertical axis represents energy. A spectrum 841 is a spectrum due to a technique based on a fixed frequency, and energy is concentrated at a particular frequency. This technique may not restore the signal if energy falls below a noise floor 843. On the other hand, a spectrum 842 is a spectrum based on a spread spectrum technique, wherein energy is spread over a wide frequency bandwidth. Since the area of the shown rectangle of the spectrum 842 can be regarded as denoting the total energy, the signal of the spectrum 842, although each frequency component thereof is below the noise floor 843, can be restored into the original signal by energy being integrated over the entire frequency bandwidth, so that communication can be performed.

By performing communication using the above-mentioned spread spectrum technique, the communication system 800 can perform simultaneous communications by using the same communication medium 830, as shown in FIG. 26. In FIG. 26, paths 831 to 835 denote communication paths on the communication medium 830. In addition, the communication system 800 can perform multiple-to-one communication as shown by the paths 831 and 832 as well as multiple-to-multiple communication by using the spread spectrum technique.

The second technique is a technique which causes a transmitter and a receiver to mutually decide on a frequency bandwidth and applies a frequency division technique for dividing the frequency bandwidth into a plurality of bands. In this case, the transmitter (or the receiver) performs allocation of a frequency band in accordance with particular rules of frequency allocation, or detects an idle frequency band at the time of start of communication and performs allocation of a frequency band on the basis of the detection result.

Figure 28:
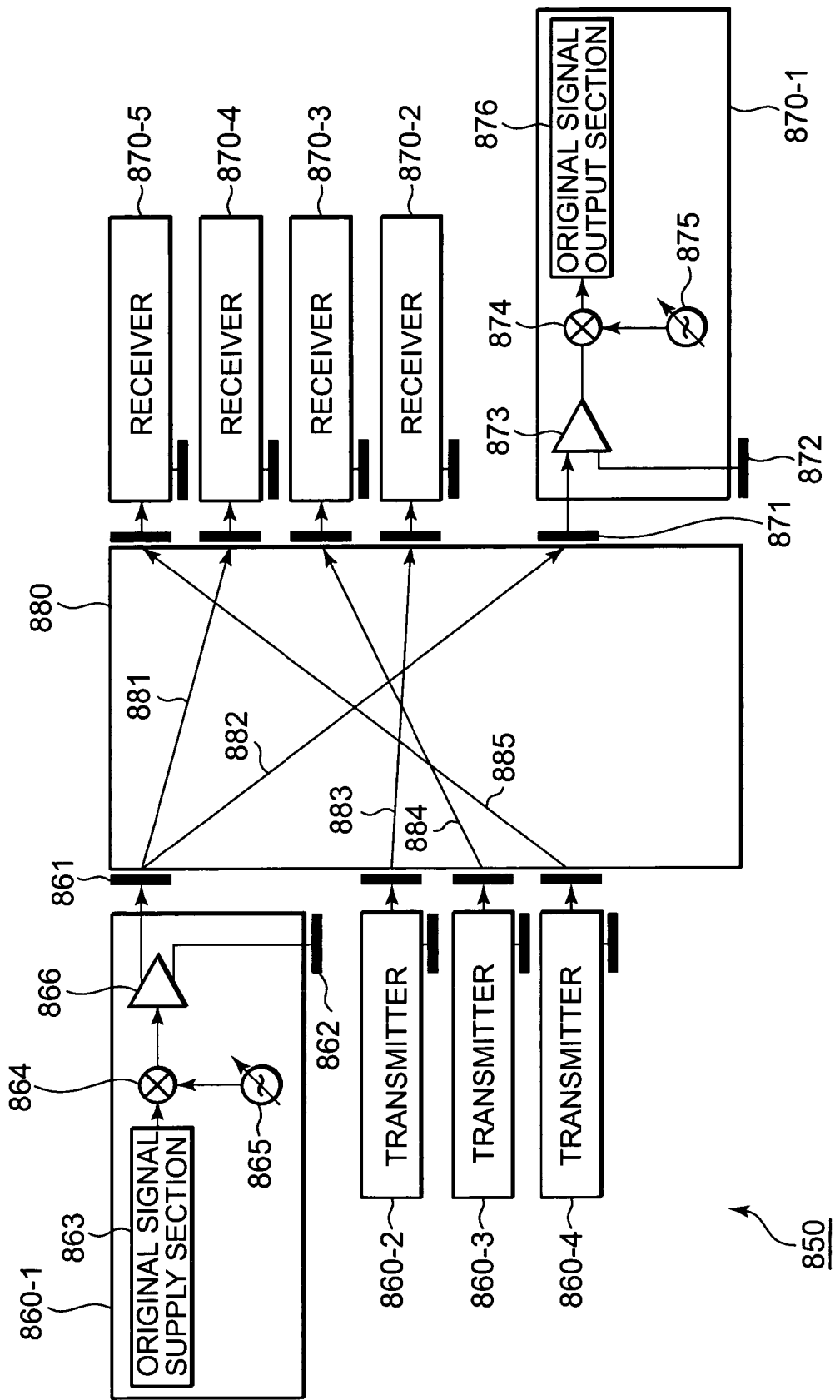
FIG. 28 is a schematic view showing another construction example of the communication system which underlies the present invention.

FIG. 28 is a diagram showing another construction example of the communication system which underlies the present invention. In a communication system 850 shown in FIG. 28, four transmitters 860-1 to 860-4 and five receivers 870-1 to 870-5 perform multiplex communications via a communication medium 880 by using a frequency division technique.

The transmitter 860-1 corresponds to the transmitter 110 shown in FIG. 1 and has a transmission signal electrode 861 and a transmission reference electrode 862, and further has, as a construction corresponding to the transmitter section 113, an original signal supply section 863, a multiplier 864, a frequency variable type oscillation source 865, and an amplifier 866.

An oscillation signal having a particular frequency component generated by the frequency variable type oscillation source 865 is multiplied by an original signal supplied from the original signal supply section 863, in the multiplier 864, and is outputted from the amplifier 866 after having been amplified in the same (it is assumed that filtering is appropriately performed). One of the outputs of the amplifier 866 is connected to the transmission signal electrode 861, while the other is connected to the transmission reference electrode 862.

Each of the transmitters 860-2 to 860-4 is similar in construction to the transmitter 860-1, and since the description of the transmitter 860-1 is applicable, the repetition of the same description will be omitted.

The receiver 870-1 corresponds to the receiver 120 shown in FIG. 1, and has a reception signal electrode 871 and a reception reference electrode 872 and further has, as a construction corresponding to the receiver section 123, an amplifier 873, a multiplier 874, a frequency variable type oscillation source 875 and an original signal output section 876.

After the receiver 870-1 has first restored an electrical signal on the basis of the method according to the present invention, the receiver 870-1 restores the original signal (a signal supplied from the original signal supply section 863) by the signal processing opposite to that of the transmitter 860-1.

Figure 29:
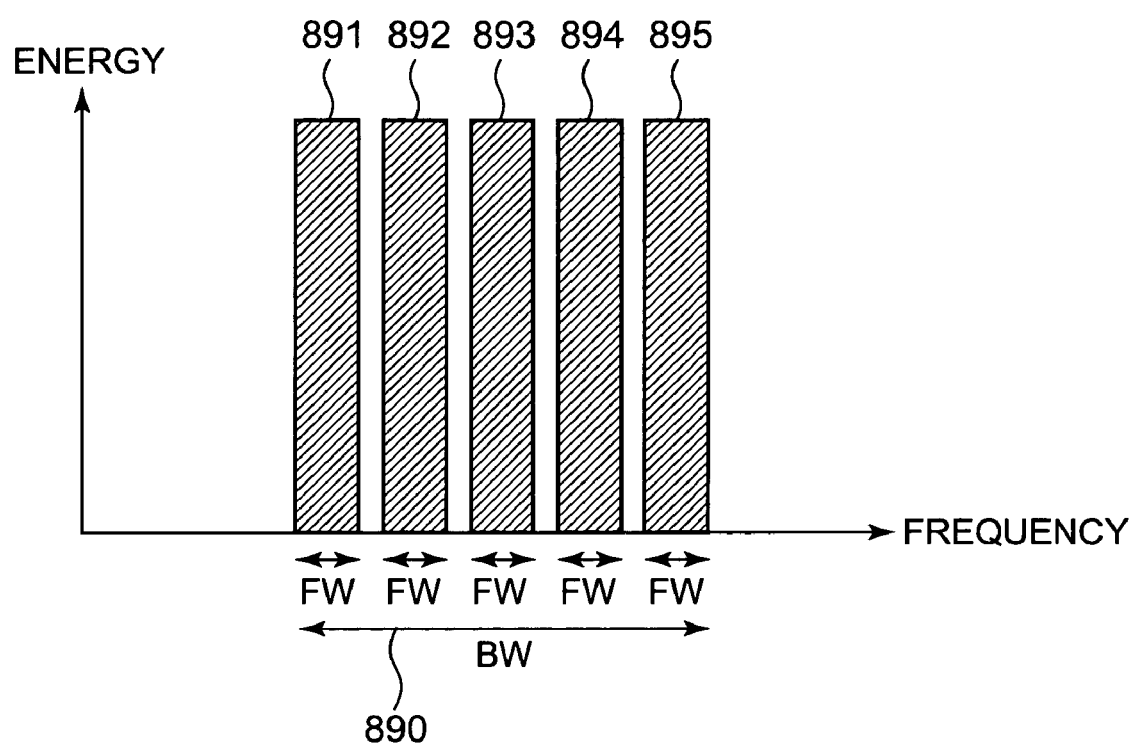
FIG. 29 is a graph showing an example of distribution of a frequency spectrum.

FIG. 29 shows an example of a frequency spectrum due to such technique. The horizontal axis represents frequency, while the vertical axis represents energy. For convenience of explanation, FIG. 29 shows an example in which an entire frequency bandwidth (BW) 890 is divided into five bandwidths (FW) 891 to 895. The divided frequency bandwidths are respectively used for communications on different communication paths. Namely, the transmitters 860-1 to 860-4 (the receivers 870-1 to 870-5) of the communication system 800 can perform a plurality of communications at the same time via the single communication medium 880 as shown in FIG. 28 while suppressing mutual interference by using the different frequency bands on the respective communication paths. In FIG. 28, paths 881 to 885 represent the respective communication paths on the communication medium 880. In addition, the communication system 850 can perform multiple-to-one communication as shown by the paths 881 and 882 as well as multiple-to-multiple communication by using the frequency division technique.

The communication system 850 (the transmitters 860-1 to 860-4 or the receivers 870-1 to 870-5) has been described above as being divided into the five bandwidths 891 to 895, but the number of division may be arbitrary and the sizes of the respective bandwidths may be made different from one another.

The third technique is a technique which applies a time division technique which causes a transmitter and receiver to mutually divide communication time therebetween. In this case, the transmitter (or the receiver) performs division of communication time in accordance with particular rules of time division, or detects an idle time zone at the time of start of communication and performs division of communication time on the basis of the detection result.

Figure 30:
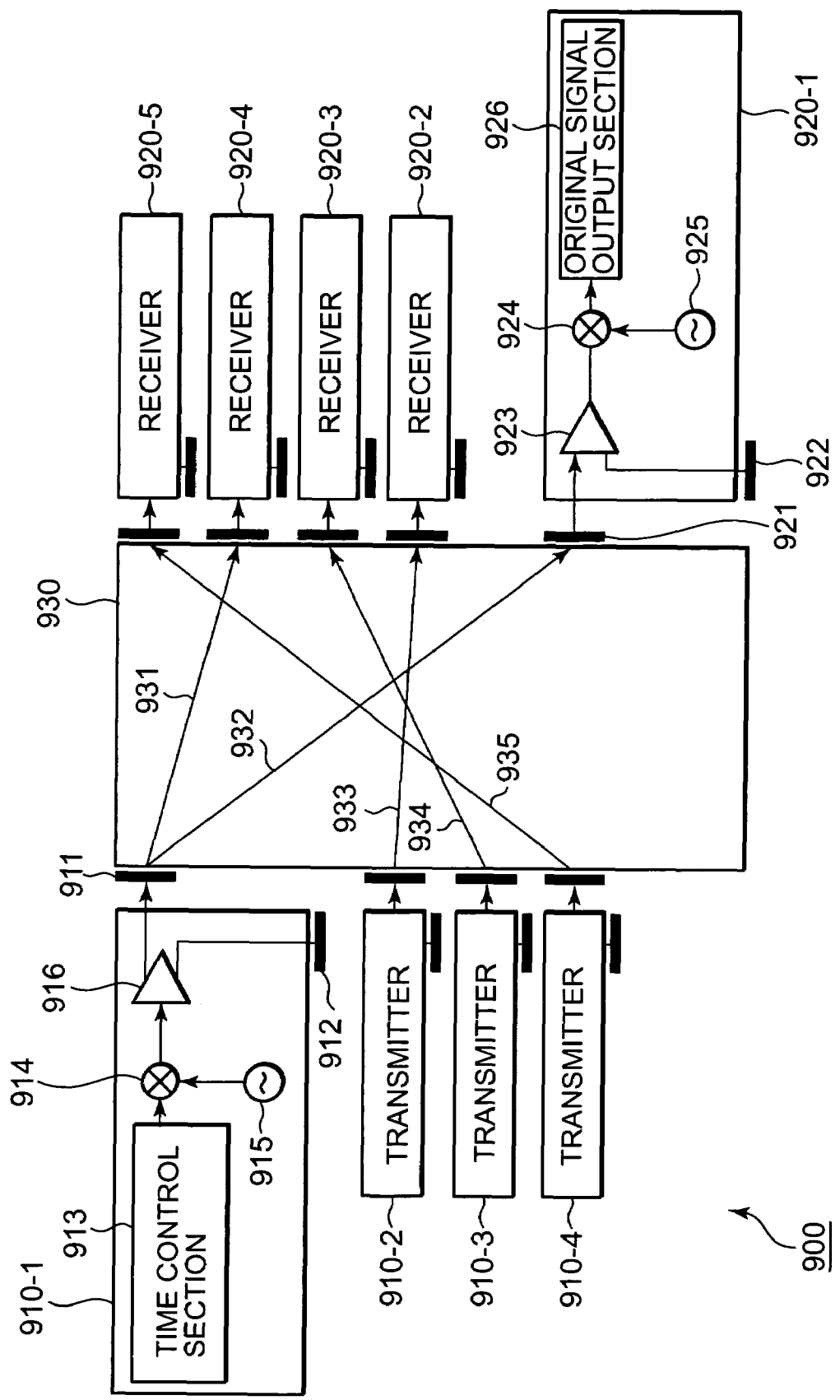
FIG. 30 is a diagram showing another construction example of the communication system which underlies the present invention.

FIG. 30 is a diagram showing another construction example of the communication system which underlies the present invention. In a communication system 900 shown in FIG. 30, four transmitters 910-1 to 910-4 and five receivers 920-1 to 920-5 perform multiplex communications via a communication medium 930 by using a time division technique.

The transmitter 910-1 corresponds to the transmitter 110 shown in FIG. 1 and has a transmission signal electrode 911 and a transmission reference electrode 912, and further has, as a construction corresponding to the transmitter section 113, a time control section 913, a multiplier 914, an oscillation source 915, and an amplifier 916.

An original signal is outputted by the time control section 913 at a predetermined time. The multiplier 914 multiplies the original signal by an oscillation signal supplied from the oscillation source 915, and the multiplication result is outputted from the amplifier 916 after having been amplified by the same (it is assumed that filtering is appropriately performed). One of the outputs of the amplifier 916 is connected to the transmission signal electrode 911, while the other is connected to the transmission reference electrode 912.

Each of the transmitters 910-2 to 910-4 is similar in construction to the transmitter 910-1, and since the description of the transmitter 910-1 is applicable, the repetition of the same description will be omitted.

The receiver 920-1 corresponds to the receiver 120 shown in FIG. 1, and has a reception signal electrode 921 and a reception reference electrode 922 and further has, as a construction corresponding to the receiver section 123, an amplifier 923, a multiplier 924, an oscillation source 925 and an original signal output section 926.

After the receiver 920-1 has first restored an electrical signal on the basis of the method according to the present invention, the receiver 920-1 restores the original signal (a signal supplied from the time control section 913) by the signal processing opposite to that of the transmitter 920-1.

Figure 31:
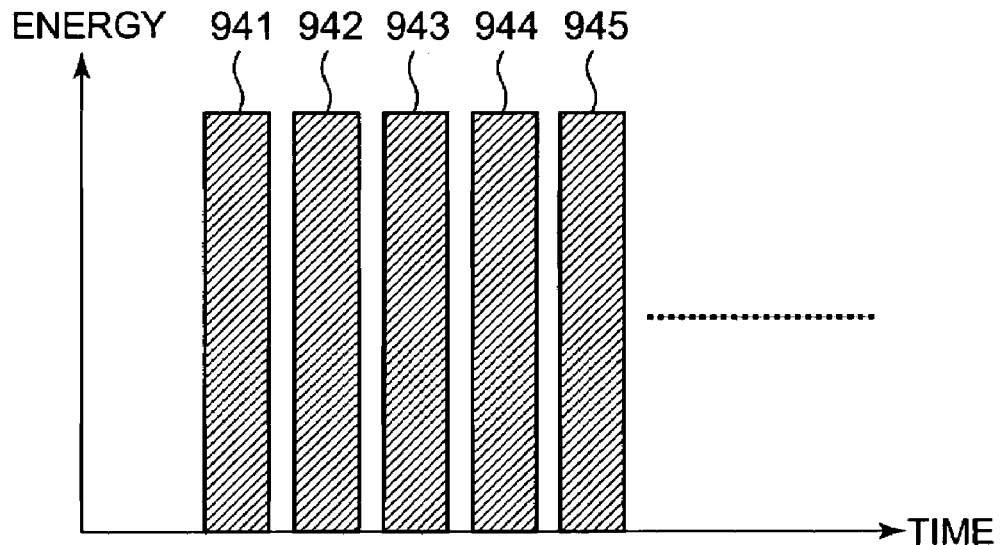
FIG. 31 is a graph showing an example of temporal distribution of a signal.

FIG. 31 shows an example of a frequency spectrum due to such technique, plotted along the time axis. The horizontal axis represents time, while the vertical axis represents energy. For convenience of explanation, FIG. 31 shows five time zones 941 to 945, but actually, time continues after the time zone 945 in a similar manner. The divided time zones are respectively used for communications on different communication paths. Namely, the transmitters 910-1 to 910-4 (the receivers 920-1 to 920-5) of the communication system 900 can perform a plurality of communications at the same time via the single communication medium 900 as shown in FIG. 30 while suppressing mutual interference by performing communications on the respective communication paths during different time zones. In FIG. 30, paths 931 to 935 represent the respective communication paths on the communication medium 930. In addition, the communication system 900 can perform multiple-to-one communication as shown by the paths 931 and 932 as well as multiple-to-multiple communication by using the time division technique.

In addition, the communication system 900 (the transmitter 910 or the receiver 920) may also be constructed so as to make the time widths of the respective time zones different from one another.

Furthermore, in addition to the above-mentioned methods, at least two of the first to third communication techniques may also be combined.

It is particularly important in particular applications that a transmitter and a receiver can perform a plurality of other devices at the same time. For example, on the assumption that this construction is applied to transportation tickets, it is possible to use the construction in useful applications in which when a user who possesses both a device A having information on a commutation ticket and a device B having an electronic money function passes through an automatic ticket gate, if, for example, a section through which the user has passed contains a section not covered by the commutation ticket, a deficiency is subtracted from the electronic money of the device B by the automatic ticket gate communicating with the device A and the device B at the same time by using any of the above-mentioned techniques.

Figure 32:
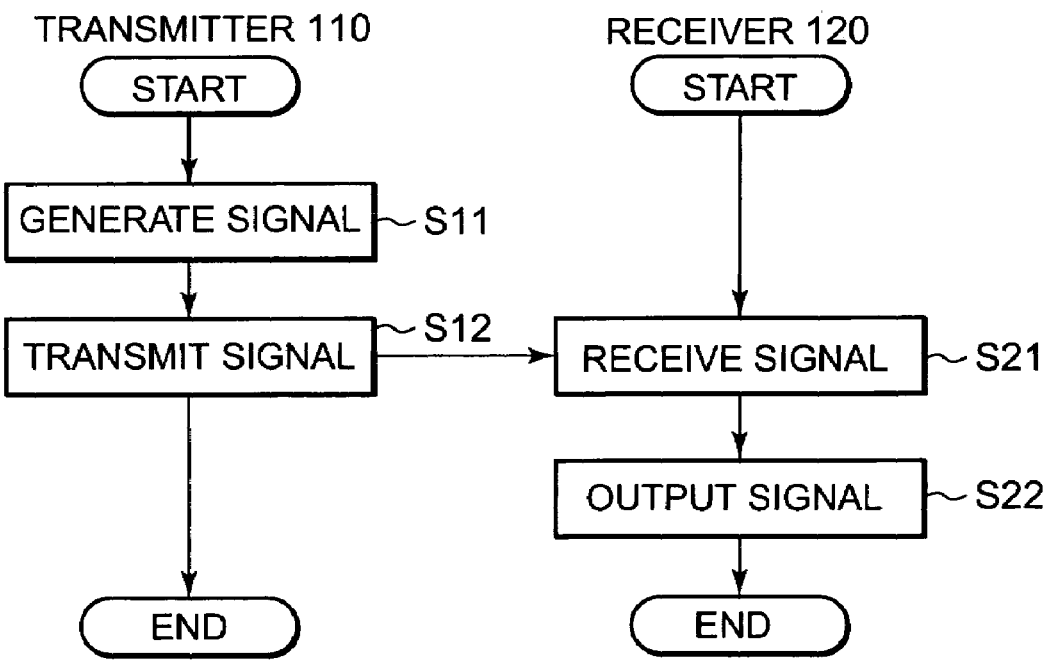
FIG. 32 is a flowchart showing an example of a flow of communication processing.

The flow of communication processing executed during the communication between the transmitter and the receiver will be described below on the basis of the flowchart shown in FIG. 32 with illustrative reference to the case of communication between the transmitter 110 and the receiver 120 of the communication system 100 shown in FIG. 1.

In step S11, the transmitter section 113 of the transmitter 110 generates a signal to be transmitted, in step S11, and in step S12, the transmitter 110 transmits the generated signal to the communication medium 130 via the transmission signal electrode 111. When the signal is transmitted, the transmitter section 113 of the transmitter 110 completes communication processing. The signal transmitted from the transmitter 110 is supplied to the receiver 120 via the communication medium 130. In step S21, the receiver section 123 of the receiver 120 receives the signal via the reception signal electrode 121, and in step S22 outputs the received signal. The receiver section 123 which has outputted the received signal completes communication processing.

As mentioned above, the transmitter 110 and the receiver 120 do not need a closed circuit using reference electrodes and can easily perform stable communication processing without being influenced by environments, merely by performing transmission and reception via the signal electrodes. In addition, since the structure of communication processing is simplified, the communication system 100 can use various communication techniques such as modulation, encoding, encryption and multiplexing at the same time.

In the description of each of the communication systems, the transmitter and the receiver have been described as being constructed as separated devices, but the present invention is not limited to this construction and a communication system may be constructed by using a transmitter/receiver having the functions of both the transmitter and the receiver.

Figure 33:
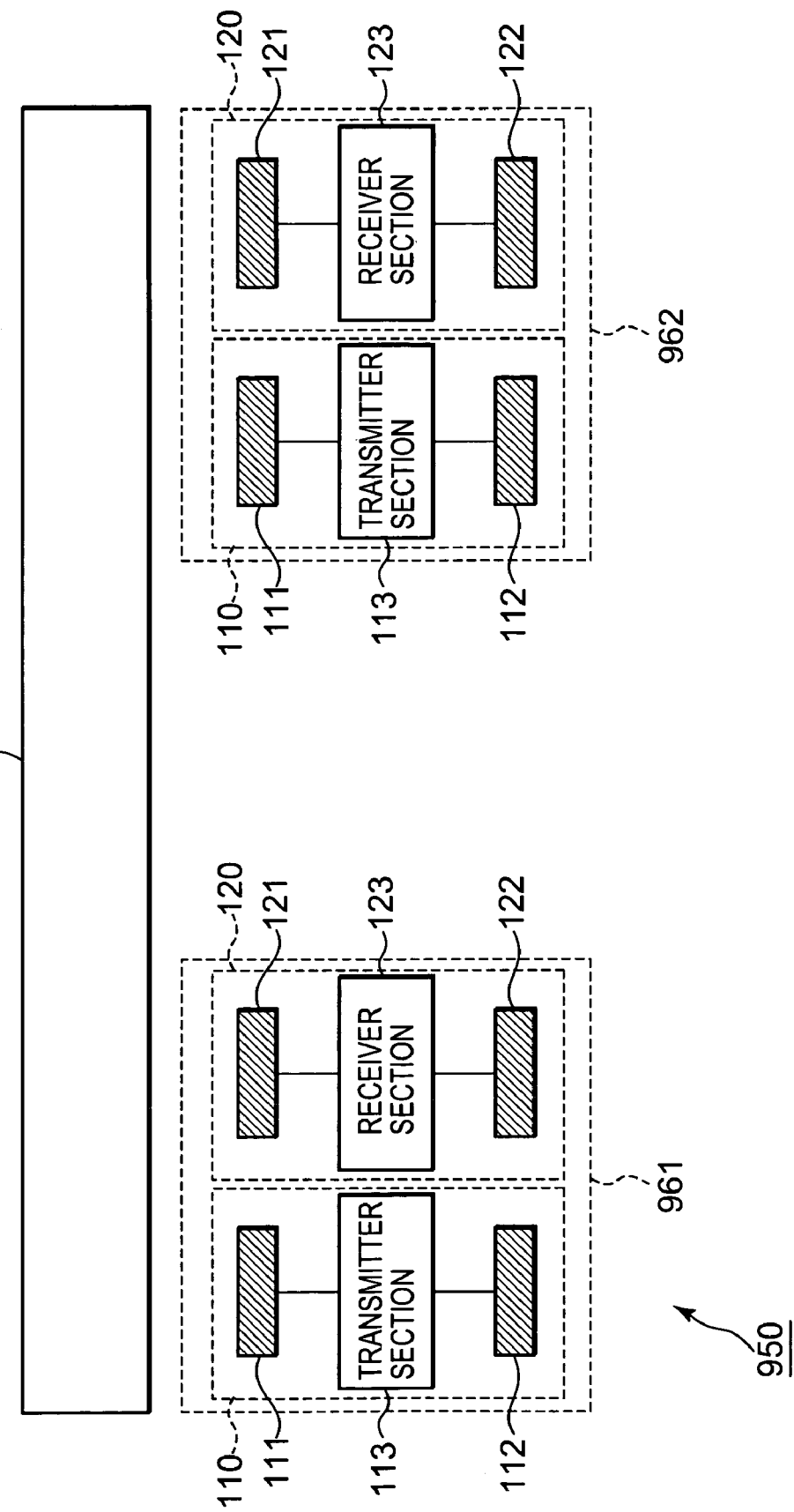
FIG. 33 is a diagram showing another construction example of the communication system which underlies the present invention.

FIG. 33 is a diagram showing another construction example of the communication system which underlies the present invention.

In FIG. 33, a communication system 950 has a transmitter/receiver 961, a transmitter/receiver 962, and the communication medium 130. The communication system 950 is a system which the transmitter/receiver 961 and the transmitter/receiver 962 perform bi-directional transmission and reception of signals via the communication medium 130.

The transmitter/receiver 961 has a transmitter section 110 having a construction similar to the transmitter 110 shown in FIG. 1, and a receiver section 120 having a construction similar to the receiver 120 shown in FIG. 1. Namely, the transmitter/receiver 961 has the transmission signal electrode 111, the transmission reference electrode 112, the transmitter section 113, the reception signal electrode 121, the reception reference electrode 122 and the receiver section 123.

Namely, the transmitter/receiver 961 transmits a signal via the communication medium 130 by using the transmitter section 110, and receives a signal supplied via the communication medium 130, by using the receiver section 120. As describe above, the communication system according to an example of the present invention, is able to perform multiplex communications. The transmitter/receiver 961 may be constructed so that the communication by the transmitter section 110 and the communication by the receiver section 120 are performed simultaneously (at the duplicated times).

Since the transmitter/receiver 962 has a construction similar to the transmitter/receiver 961 and operates in a similar manner, the description of the transmitter/receiver 962 will be omitted. The transmitter/receiver 961 and the transmitter/receiver 962 perform bi-directional communications via the communication medium 130 by the same method.

In this manner, the communication system 950 (the transmitter/receiver 961 and the transmitter/receiver 962) can easily realize bi-directional communications not restricted by use environments.

Similar to the transmission apparatus and reception apparatus described with reference to FIG. 23, the transmission signal electrode and reception signal electrode of the transmission/reception apparatus 961 and transmission/reception apparatus 962 may be electrically connected to the communication medium (provided as the contact 741 of 742). In the above description, although the transmission signal electrode 111, transmission reference electrode 112, reception signal electrode 121 and reception reference electrode 122 are structured separately, the embodiment is not limited to this structure. For example, the transmission signal electrode 111 and reception signal electrode 121 may be structured as one electrode, and the transmission reference electrode 112 and reception reference electrode 122 may be structured as one electrode (the transmission section 113 and reception section 123 share the signal electrode or reference electrode)

In the above description, in each apparatus (transmission apparatus, reception apparatus and communication apparatus) of the communication system of the present invention, although the reference, potential of each apparatus is connected to the reference electrode, the embodiment is not limited to this structure. For example, a differential circuit operating with two signals having different phases may be used. In this case, one signal of the differential circuit is connected to the signal electrode to transmit the signal to the communication medium, and the other signal of the differential circuit is connected to the reference electrode. Also, in this manner, information can be transmitted.

Next, a communication system adopting the present invention will be described. FIG. 34 is a diagram showing an example of the structure of a communication system according to an embodiment adopting the present invention.

A communication system 1000 shown in FIG. 34 is a communication system for performing communications via a human body, and is not necessary to configure the closed circuit by using the reference electrode. This communication system can execute a stable communication process easily without being influenced by environments, only by transmission/reception of a signal via the signal electrode.

The communication system 1000 shown in FIG. 34 has a reader/writer 1001 and user devices (hereinafter called UD) 1002 to 1004. The reader/writer 1001 communicates with UDs 1002 to 1004 via a communication medium made of a conductor or a dielectric such as a human body.

The reader/writer 1001 has a communication section 1011 for executing processes regarding communications, a reference electrode 1012 and a signal electrode 1013 for transmission/reception of a signal and a service provision section 1014 for executing processes regarding services to be provided to users having UDs. This communication system 1000 is a communication system for performing communications by a method similar to that of the communication system 100 shown in FIG. 1. The communication section 1011 corresponds, for example, to the transmission section 113 and reception section 123, the reference electrode 1012 corresponds, for example, to the transmission reference electrode 112 and reception reference electrode 122, and the signal electrode 1013 corresponds, for example, to the transmission signal electrode 111 and reception signal electrode 121. Namely, an electrostatic capacitance formed between the signal electrode 1013 and communication medium is larger than that formed between the reference electrode 1012 and communication medium.

In FIG. 34, UD 1002 is owned by a user 1021, UD 1003 is owned by a user 1022, and UD 1004 is owned by a user 1023. UDs 1002 to 1004 are devices for communicating with the reader/writer 1001 by a method similar to that of the communication system 100 shown in FIG. 1.

The communication section 1011 of the reader/writer 1001 communicates with UDs 1002 to 1004 via human bodies of the users 1021 to 1023 or the like positioned on the signal electrode 1013 installed on a floor. UDs 1002 to 1004 have identification information unique thereto, and the communication section 1011 identifies the communication partner (partner for signal transmission/reception) by using the identification information. In FIG. 34, the identification information is 4-bit binary information, UD 1002 has an identification information value "0001", UD 1003 has an identification information value "1111", and UD 1004 has an identification information value "1010". The identification information may have any contents so long as the identification information value is different for each device, and the number of bits is also arbitrary.

The service provision section 1014 controls the communication section 1011 to communicate with UDs 1002 to 1004 and provide predetermined services to users 1021 to 1023 on the signal electrode 1013.

In FIG. 34, although the system is configured by a single reader/writer and three UDs, the numbers of these devices are arbitrary. The numbers and sizes of the reference electrodes 1012 and signal electrodes 1013 are also arbitrary. In the communication system, one user may have a plurality of UDs or a plurality of users may share a single UD. However, for example, if the relation between the numbers and positions of UDs and users violates rules of the services provided by the service provision section 1014, the services may not be provided.

As described above, the reader/writer 1001 communicates independently with users by using the identification information of UDs 1002 to 1004 and provides services to users. However, to this end, it is necessary to identify UDs existing in a communicable range. Namely, for example, in the case shown in FIG. 34, in order to communicate with the reader/writer 1001, UD is required to be mounted on (contacted to or in proximity with) a user positioned on the signal electrode 1013. Since each user can move to any arbitrary position, UDs communicable with the reader/writer 1001 are not fixed. Therefore, in order to communicate with UDs, the communication section 1011 of the reader/writer 1001 searches UDs in a presently communicable state (acquires identification information of UDs).

Figure 35:
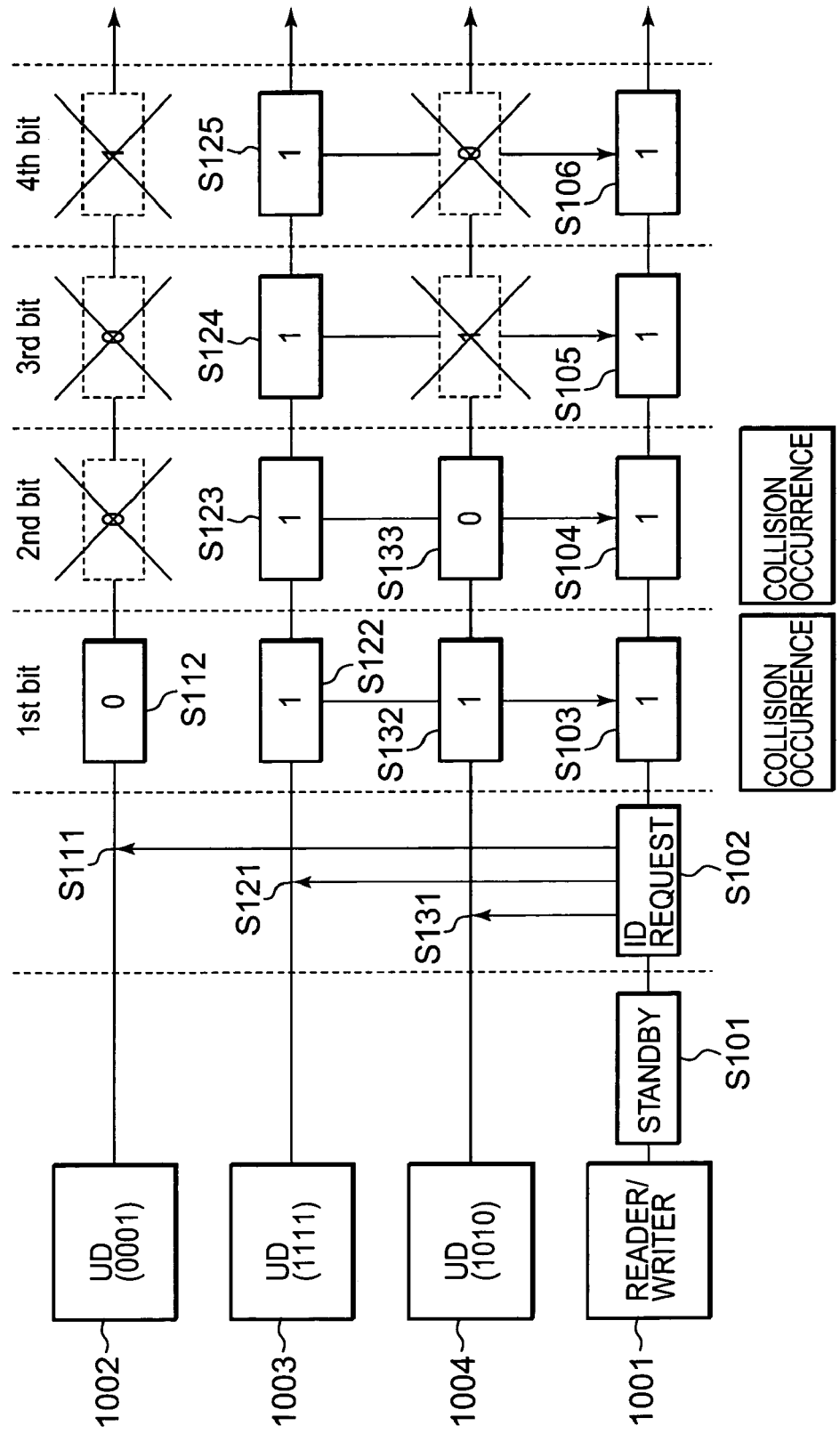
FIG. 35 is a timing chart illustrating an example of an identification information acquisition process.

FIG. 35 is a timing chart illustrating an example of the process flow to be executed by the reader/writer 1001 to acquire the identification information of UD. In the following, for the convenience of description, it is assumed that the user 1021 mounting UD 1002, user 1022 mounting UD 1003 and user 1023 mounting UD 1004 exist on the signal electrode 1013 of the reader/writer 1001.

As shown at Step S101 of FIG. 35, the reader/writer 1001 first stands by for a predetermined time in order to distinguish between the previous process and the present process. Thereafter, at Step S102, the reader/writer 1001 transmits an ID request for requesting identification ((ID) IDentification) information from UDs on the signal electrode 1013, through broadcasting (to many and unspecified UDs). As shown at Steps S111, S121 and S131, UDs 1002 to 1004 acquire the broadcast ID request.

Upon acquisition of the ID request, UDs 1002 to 1004 transmit ID of each UD one bit after another to the reader/writer 1001. Time slots are not provided to the ID transmission process, and the transmission timings of respective bits by UDs 1002 to 1004 are generally coincident as shown in FIG. 35. Namely, as shown at Steps S112, S122 and S132, UDs 1002 to 1004 transmit first bits of IDs to the reader/writer 1001 at generally equal timings.

In this case, as shown in FIG. 35, UD 1002 transmits a value "0", UDs 1003 and 1004 transmit a value "1". Since signals having different two values are supplied to the reader/writer 1001, a signal collision occurs.

UDs 1002 to 1004 each transmit one-bit information and detect a signal flowing through the communication medium (user) to thereby detect a collision occurrence based on the value of the detected signal. Although the details will be given later, if the value different from the value of the signal transmitted from each user is detected, each of UDs 1002 to 1004 judges that a collision occurred. For example, the device transmitted the value "0" at the time of a collision occurrence stops transmitting the next and following bits. In the example shown in FIG. 35, a collision occurs at the "1st bit", and UD 1002 transmitted the value "0" (Step S112) stops the transmission process for the "2nd bit" and following bits.

Similarly, the communication section 1011 of the reader/writer 1001 detects a signal flowing through the communication medium (user) to detect a collision occurrence based on the value of the detected signal. If it is judged that a collision occurred, it is assumed that the value "1" was received as shown at Step 103 of FIG. 35, irrespective of the value of the signal actually received.

As indicated at Steps S123 and S133 in FIG. 35, UDs 1003 and 1004 each transmit "2nd bit" of ID. Since different values are transmitted also in this case, a collision occurs. Therefor, UD 1004 transmitted the value "0" stops transmitting the "3rd bit" and following bit. Since a signal collision occurred, the reader/writer 1001 assumes that the value "1" was received as shown at Step S104 of FIG. 35, irrespective of the value of the signal actually received.

UD 1003 which does not stop transmission of ID as yet sequentially transmits the "3rd bit" and "4th bit" of ID as indicated at Steps S124 and S125 of FIG. 35. At this time, since the other devices do not transmit a signal, a collision will not occur. Therefore, the reader/writer 1001 receives the value transmitted from UD 1004 (Steps S105 and S106).

Namely, in the case of FIG. 35, the reader/writer 1001 can receive ID of UD 1003. Since it is possible to suppress generation of an unnecessary standby time to be generated when time slots are provided, the reader/writer 1001 can acquire ID of UD faster.

The reader/writer 1001 notifies UD 1003 of an ID acquisition to make UD 1003 not respond to an ID request. Thereafter, the above-described processes such as an ID request are repeated so that IDs of UD 1002 and UD 1004 can be acquired.

In the above description with reference to FIG. 35, UD output the value "0" at a collision occurrence stops an output of the following bits. Instead, it is obvious that UD output the value "1" at a collision occurrence may stop an output of the following bits. Further, while UD transmits one bit of ID, UD may detect at the same time a signal transmitting through the communication medium, or after one bit of ID is transmitted, UD may detect a signal transmitting through the communication medium.

A collision occurrence is judged from whether the received signal contains both a feature representative of the value "0" and a feature representative of the value "1" (whether the received signal contains a feature representative of a collision occurrence). These features change with a modulation method each device adopts. For example, if ID is transmitted by modulating ID by an FM modulation method, the reader/writer 1001 and UDs 1002 to 1004 judge a collision occurrence if the received signal contains frequency components representative of both the values "0" and "1".

In this case, for example, if all UDs 1002 to 1004 transmit "0", the received signal contains only the feature representative of the value "0". On the other hand, if all UDs 1002 to 1004 transmit "1", the received signal contains only the feature representative of the value "1". Namely, if all UDs transmit the same value, the reader/writer 1001 and UDs 1002 to 1004 do not judge that a collision occurred.

In this case, however, in other words, since all UDs transmit the same value in this case, the reader/writer 1001 can receive the value as the value of one bit of correct ID.

Next, a specific structure of each device will be described.

Figure 36:
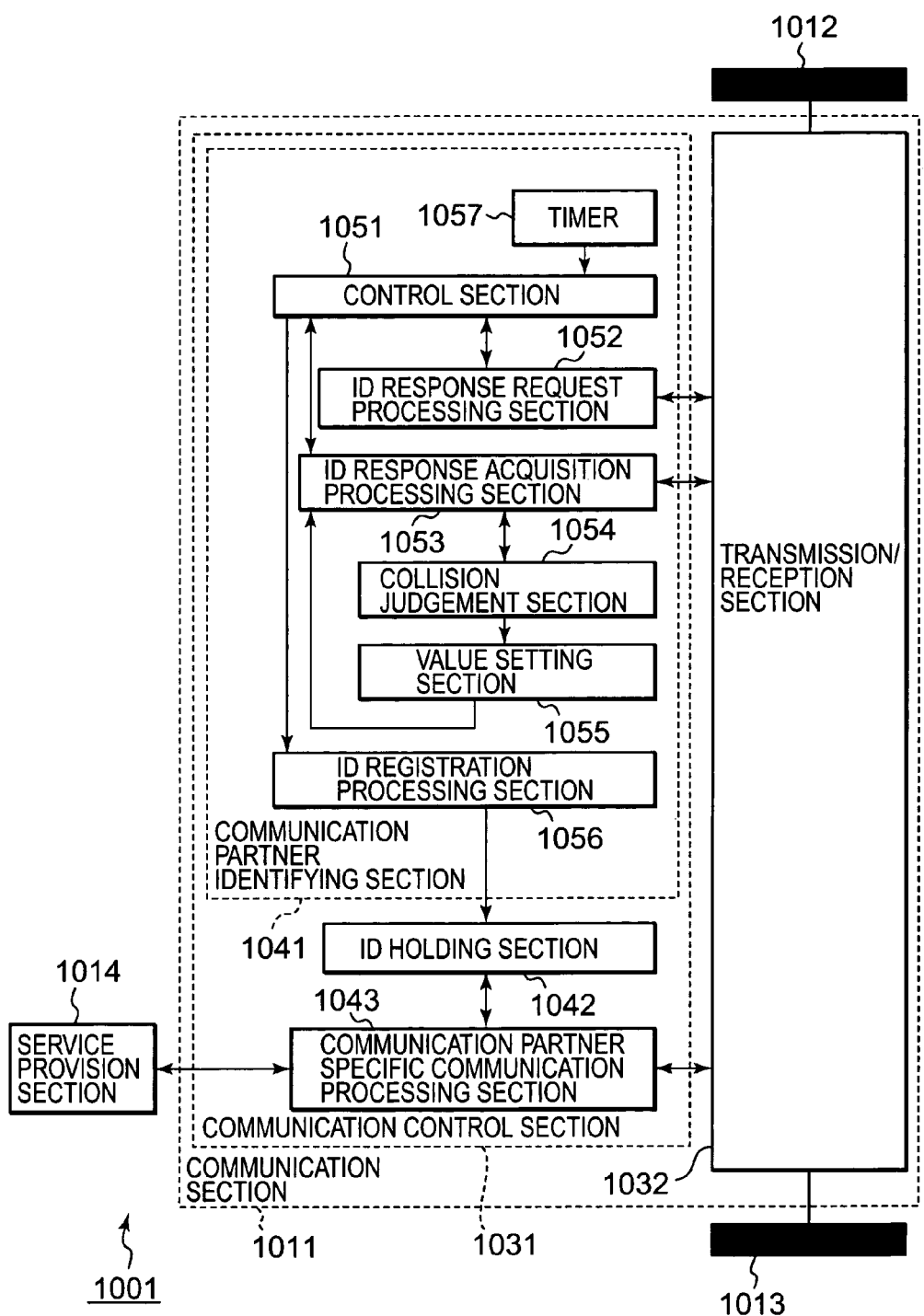
FIG. 36 is a block diagram showing an example of the structure of a reader/writer shown in FIG. 34.

FIG. 36 is a block diagram showing an example of the internal structure of the reader/writer 1001 shown in FIG. 34.

In FIG. 36, the communication section 1011 of the reader/writer 1001 has a communication control unit 1031 for executing a communication control process and a transmission/reception section 1032 connected to the reference electrode 1012 and signal electrode 1013 for transmission/reception of a signal via the signal electrode 1013. The communication control section 1031 controls transmission/reception of a signal by the transmission/reception section 1032 to effect communications with UDs 1002 to 1004.

The communication control section 1031 has a communication partner identifying section 1041, an ID holding section 1042 and a communication partner specific communication processing section 1043. The communication partner identifying section 1041 executes a process of identifying a communicable UD (acquiring identification information of UD). The ID holding section 1042 is made of a recording medium such as a Random Access Memory (RAM), a flash memory and a hard disc, and holds an ID acquired by the communication partner identifying section 1041. The communication partner specific communication processing section 1043 executes a communication control process for a specific UD, by using ID of UD held in the ID holding section 1042. For example, the communication partner specific communication processing sections 1043 is controlled by the service provision section 1014, and controls a process of communications with UD corresponding to the user to which the service provision section 1014 provides services.

The communication partner identifying section 1041 has a control section 1051, an ID response request processing section 1052, an ID response acquisition processing section 1053, a collision judgment section 1054, a value setting section 1055, an ID registration processing section 1056 and a timer 1057.

The control section 1051 executes a control process for a process of identifying a communication partner (acquiring identification information), in accordance with time information supplied from the timer 1057. The ID response request processing section 1052 controls the transmission/reception section 1032 to make the transmission/reception section 1032 transmit request information through broadcasting (to many and unspecified UDs), the request information requesting a communicable UD to transmit ID.

The ID response acquisition processing section 1053 controls the transmission/reception section 1032 to execute a process of acquiring an ID response which is information supplied in response to the request transmitted by a process of the ID response request processing section 1052. The ID response contains one bit of ID of a transmission source UD.

The collision judgment section 1054 judges a collision occurrence when the ID response is received by the control process of the ID response acquisition processing section 1053. When the collision judgment section 1054 judges that a collision occurred, the value setting section 1055 sets a specific value as a received value. For example, when the collision judgment section 1054 judges that a collision occurred, the value setting section 1055 sets the value received by the ID response acquisition processing section 1053 to "1", even if the value contained in the ID response received by the ID response acquisition processing section 1053 is either "0" or "1".

The ID registration processing section 1056 supplies ID acquired under the above-described control to the ID holding section 1042 to make the ID holding section hold the ID.

Figure 37:
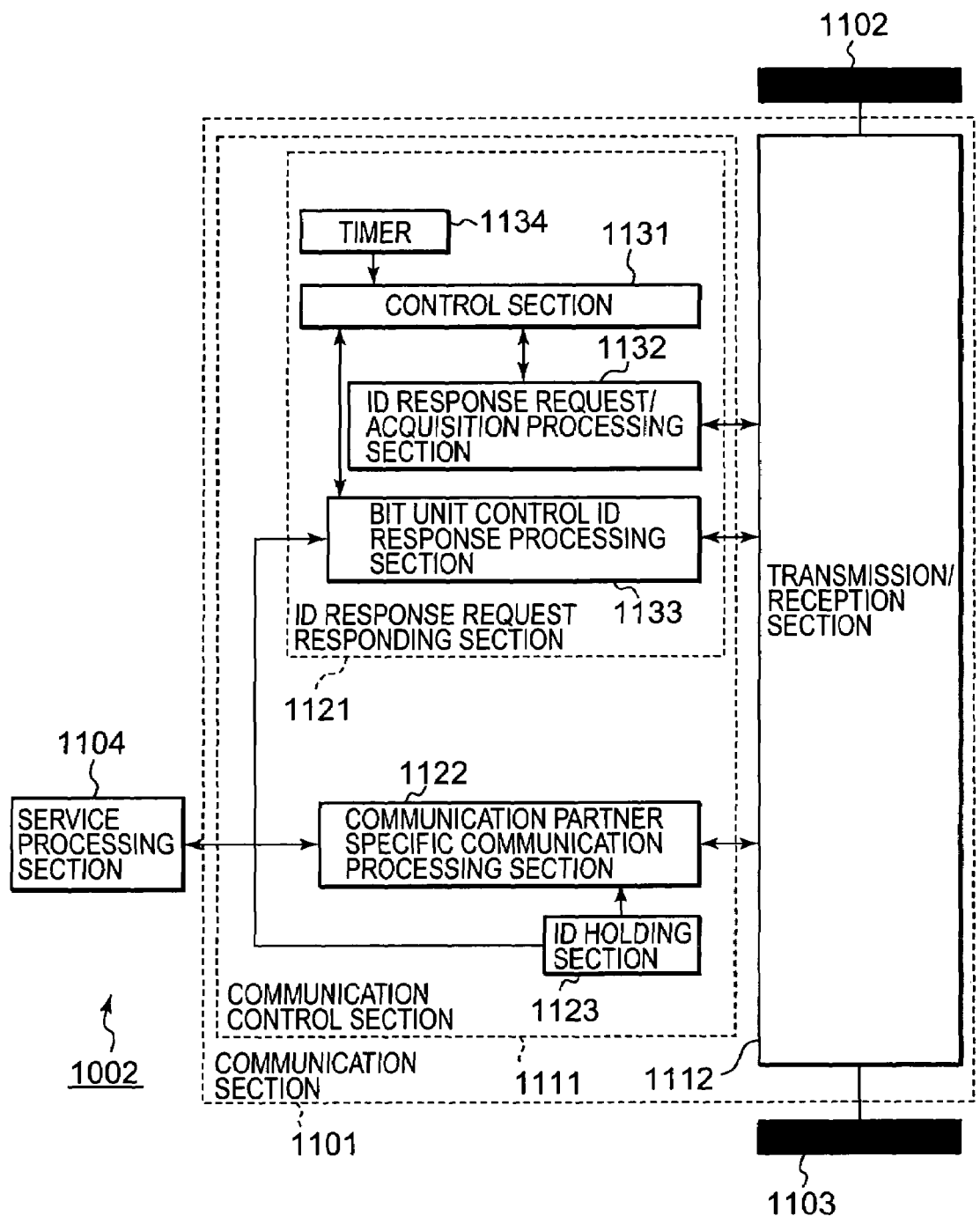
FIG. 37 is a block diagram showing an example of the structure of UD shown in FIG. 34.

FIG. 37 is a block diagram showing an example of the internal structure of UD 1002 shown in FIG. 34.

In FIG. 37, UD 1002 has a communication section 1101 for executing processes regarding communications, a reference electrode 1102 and signal electrode 1103 for signal transmission/reception, and a service processing section 1104 for executing processes regarding services to be provided by the reader/writer 1001.

The communication section 1101 corresponds; for example, to the transmission section 113 and reception section 123 shown in FIG. 1, the reference electrode 1102 corresponds, for example, to the transmission reference electrode 112 and reception reference electrode 122 shown in FIG. 1, and the signal electrode 1103 corresponds, for example, to the transmission signal electrode 111 and reception signal electrode 121 shown in FIG. 1. Namely, an electrostatic capacitance between the signal electrode 1103 and communication medium is larger than an electrostatic capacitance between the reference electrode 1102 and communication medium.

The communication section 1101 has a communication control section 1111 for executing a communication control process and a transmission/reception section 1112 connected to the reference electrode 1102 and signal electrode 1103 for transmission/reception of a signal via the signal electrode 1103. The communication control section 1111 controls transmission/reception of a signal from the transmission/reception section 1112 to communicate with the reader/writer 1001.

The communication control section 1111 has an ID response request responding section 1121, a communication partner specific communication processing section 1122 and an ID holding section 1123. The ID response request responding section 1121 controls a communication process for an ID response request which is request information requesting ID and supplied from the reader/writer 1001. The communication partner specific communication processing section 1122 executes a communication control process by using ID of UD 1002 held in the ID holding section 1123, when UD 1002 is designated as a communication partner by the reader/writer 1001. For example, the communication partner specific communication processing section 1122 is controlled by the service processing section 1104, and controls a communication process of acquiring information on services provided by the reader/writer 1001 and supplying a response to the information to the reader/writer 1001. The ID holding section 1123 is constituted of a recording medium such as a RAM, a Read Only Memory (ROM), a flash memory and a hard disc, and holds ID of UD 1002.

The ID response request responding section 1121 has a control section 1131, an ID response request acquisition processing section 1132, a bit unit control ID response processing section 1133 and a timer 1134.

The control unit 1131 controls the ID response request acquisition processing section 1132 and bit unit control ID response processing section 1133 in accordance with time information supplied from the timer 1131, to make the sections execute a response process to the ID response request. The ID response request acquisition processing section 1132 is controlled by the control unit 1131, and acquires an ID response request transmitted from the reader/writer 1001 via the transmission/reception section 1112. The bit unit control ID response processing section 1133 controls the transmission/reception section 1112 to execute a process of controlling transmission of an ID response in the bit unit as described with reference to FIG. 35, in response to the ID response request acquired by the ID response request acquisition processing unit 1132.

Figure 38:
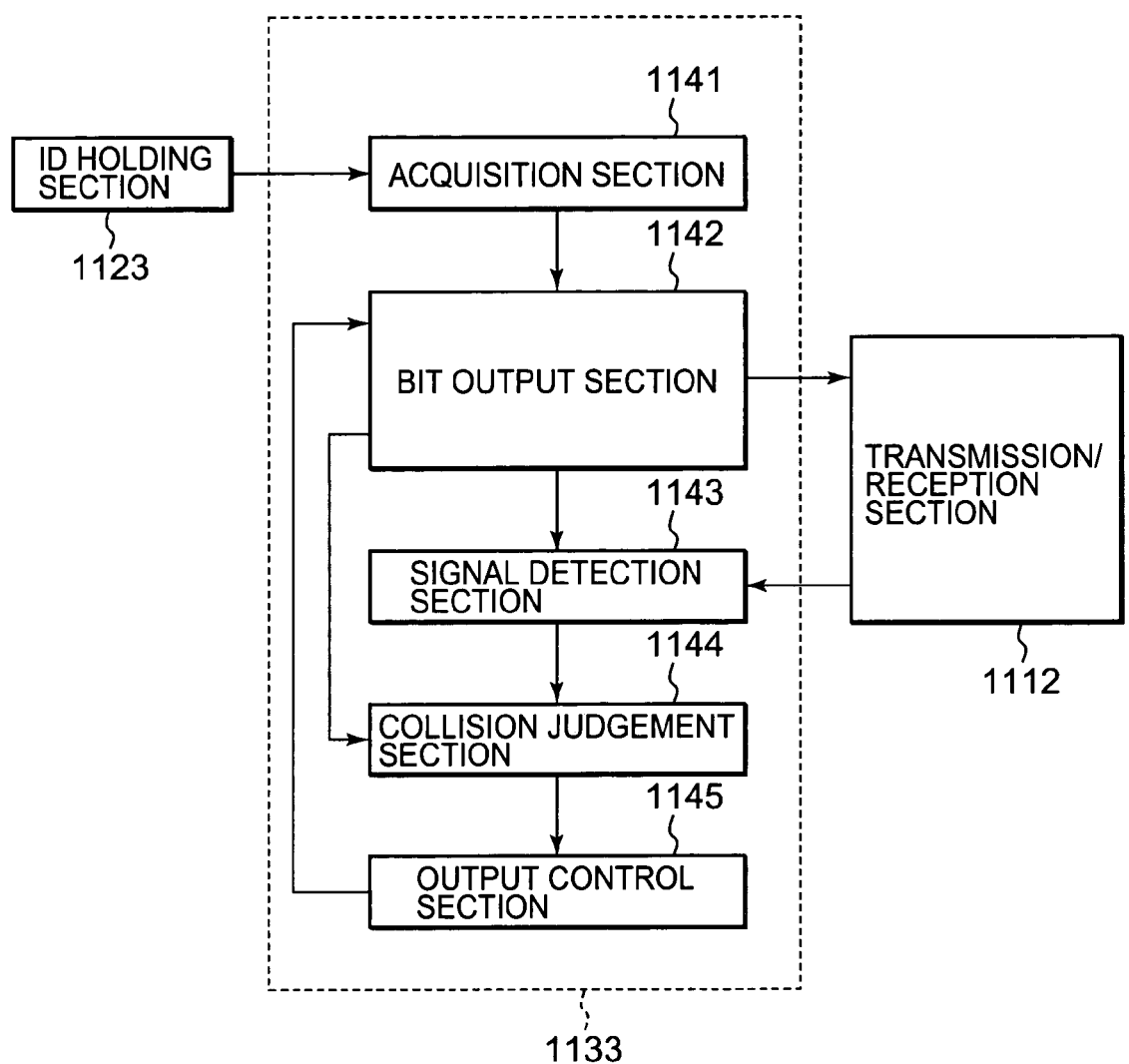
FIG. 38 is a block diagram showing an example of the structure of a bit unit control ID response processing unit shown in FIG. 37.

FIG. 38 is a block diagram showing an example of the detailed structure of the bit unit control ID response processing section 1133.

In FIG. 38, the bit unit control ID response processing section 1133 has an ID acquisition section 1141, a bit output section 1142, a signal detection section 1143, a collision judgment section 1144 and an output control section 1145.

The ID acquisition section 1141 acquires ID of UD 1002 held in the ID holding section 1123, and supplies ID to the bit output section 1142. As ID is supplied from the ID acquisition section 1141, the bit output section 1142 supplies ID to the transmission/reception section 1112 one bit after another as an ID response. The bit output section 1142 supplies the output value also to the collision judgment section 1144.

As the bit output section 1142 outputs the ID response, the signal detection section 1143 detects the ID response which is a signal to be transmitted to the communication medium via the transmission/reception section 1112, and supplies the value of the signal (ID response) to the collision judgment section 1144.

The collision judgment section 1144 compares the value supplied from the bit output section 1142 with the value supplied from the signal detection section 1143, and judges a collision occurrence from the comparison results. The collision judgment section 1144 supplies the judgment results to the output control section 1145. Namely, if the value of the signal detected by the signal detection section 1143 is different from the value supplied from the bit output section 1142, the collision judgment section 1144 judges a collision occurrence and notifies this effect to the output control section 1145. In this case, the collision judgment section 1144 notifies the output value from the bit output section 1142 also to the output control section 1145.

If the value of the signal detected by the signal detection section 1143 is coincident with the value supplied from the bit output section 1142, the collision judgment section 1144 notifies this effect to the output control section 1145.

In accordance with the judgment result supplied from the collision judgment section 1144, the output control section 1145 controls an output process for ID by the bit output section 1142. Namely, if the collision judgment section 1144 judges a collision occurrence and the value of ID output from the bit output section 1142 is "0", the output control section 1145 controls the bit output section 1142 to stop an output of ID.

UD 1003 and UD 1004 have a similar structure to that of UD 1002 and execute a similar process. Namely, the structure of UD 1002 shown in FIGS. 37 and 38 and the above description made with reference to FIGS. 37 and 38 are applicable to both UD 1003 and UD 1004. The description of UD 1003 and UD 1004 is therefore omitted.

Next, description will be made on a process to be executed by each device to realize a process sequence of acquiring identification information (ID) of UD communicable with the reader/writer 1001 described with reference to FIG. 35 as one example.

Figure 39:
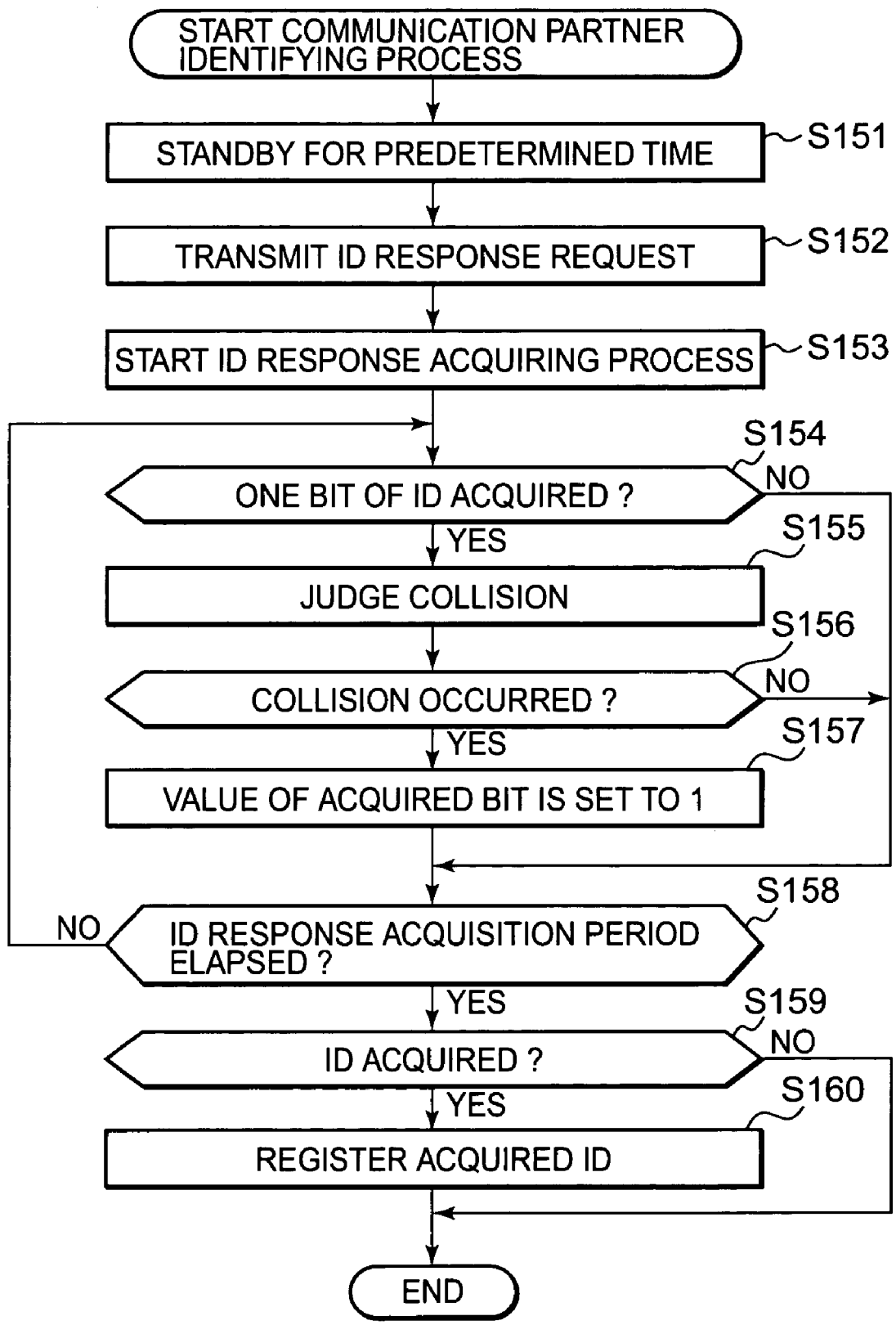
FIG. 39 is a flow chart illustrating an example of a communication partner identifying process.

With reference to the flow chart shown in FIG. 39, description will be made on a communication partner identifying process to be executed first by the reader/writer 1001.

The communication partner identifying section 1041 of the communication section 1011 of the reader/writer 1001 repetitively executes the communication partner identifying process at predetermined timings, for example, while the service provision section 1014 does not execute a service provision process.

As the communication partner identifying process starts, at Step S151 the control section 1051 of the communication partner identifying section 1041 stands by for a predetermined time and then controls the ID response request processing section 1052 to advance to Step S152. At Step S152 the ID response request processing section 1052 controls the transmission/reception section 1032 to transmit an ID response request to UDs through broadcasting (transmit to many and unspecified UDs). After the process at Step S152 is completed, the ID response request processing section 1052 notifies a process completion to the control section 1051. Upon reception of the notice, the control section 1051 controls the ID response acquisition processing section 1053 to advance the process to Step S153. At Step S153 the ID response acquisition processing section 1053 controls the transmission/reception section 1032 to start an ID response acquisition process of acquiring an ID response transmitted from UD.

At Step S154 the ID response acquisition processing section 1053 started the ID response acquisition process judges in the ID response acquisition process whether one bit of ID is acquired as the ID response. If it is judged that one bit of ID is acquired, the ID response is supplied to the collision judgment section 1054 to advance the process to Step S155. At Step S155 the collision judgment section 1054 effect a collision judgment. Specifically, the collision judgment section 1054 judges a collision occurrence if the ID response supplied from the ID response acquisition processing section 1053 has both features of "0" and "1". In accordance with the judgment result, at Step S156 the collision judgment section 1054 judges whether a collision occurred. If it is judged that a collision occurred, this effect is notified to the value setting section 1055 to advance the process to Step S157. At Step S157 the value setting section 1055 controls the ID response acquisition processing section 1053 to set the value of the bit acquired as the ID response to "1" to advance the process to Step S158.

If it is judged at Step S154 that the ID response is not acquired and one bit of ID is not acquired, the ID response acquisition processing section 1053 omits the processes at Steps S155 to S157 to advance the process to Step S158. If it is judged at Step S156 that a collision does not occur, the collision judgment section 1054 notifies this effect to the ID response acquisition processing section 1053 to advance the process to Step S158.

At Step S158 the control section 1051 controlling the ID response acquisition processing section 1053 judges from time information supplied from the timer 1057 whether an ID response acquisition period has elapsed. If it is judged that the acquisition period does not elapsed, the process returns to Step S154 to repeat the following processes. Namely, the control section 1051 and the ID response acquisition processing section 1053 to value setting section 1055 repeat the processes from Step S154 to Step S158 to acquire ID of UD one bit after another.

If it is judged at Step S158 that the ID response acquisition period has elapsed, the control section 1051 advances the process to Step S159. At Step S159 the control section 1051 judges whether the ID response acquisition process by the ID response acquisition processing section 1053 acquires ID. If it is judged that ID is acquired, this ID is supplied to the ID registration processing section 1056 to advance the process to Step S160. At Step S160 the ID registration processing section 1056 supplies the acquired ID to the ID holding section 1042 which holds and registers ID of a communicable UD. After the ID registration processing section 1056 completes the process at Step S160, the control section 1051 terminates the communication partner identifying process.

If it is judged at Step S159 that ID is not acquired, the control section 1051 omits the process at Step S160 and terminates the communication partner identifying process.

In the example described above, the value setting section 1055 sets the value of the acquired bit to "1" at Step S157. This corresponds to that UD output a value "0" at a collision occurrence stops the following ID transmission. For example, if UD output a value "1" at a collision occurrence stops the following ID transmission, the value setting section 1055 sets the value of the acquired bit to "0" at Step S157.

Figure 40:
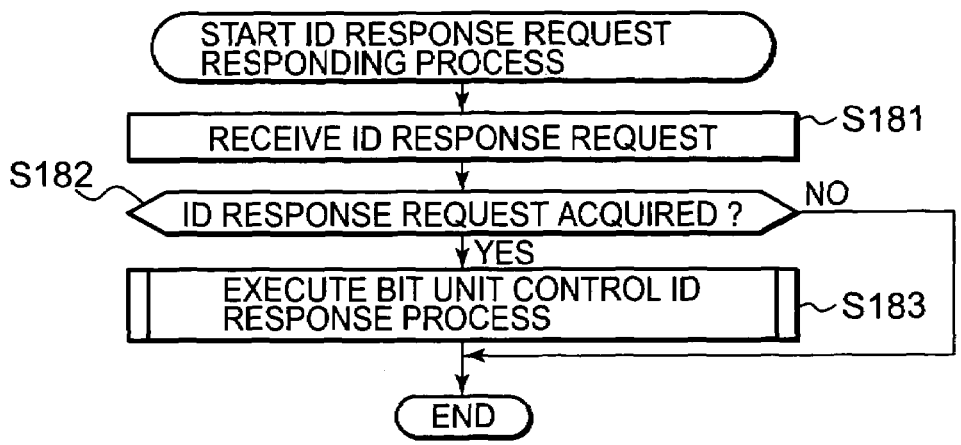
FIG. 40 is a flow chart illustrating an example of an ID response request responding process.

Next, with reference to the flow chart shown in FIG. 40, description will be made on an ID response request responding process to be executed by UDs 1002 to 1004 in correspondence with the above-described processes by the reader/writer 1001. In the following, description is limited only to the case UD 1002 executes this process. Since UDs 1002 to 1004 execute similar processes, the description of the processes to be executed by UD 1003 and UD 1004 are omitted because the description is duplicated with that of UD 1002.

The ID response request responding section 1121 of the communication control section 1111 of UD 1002 repetitively executes the ID response request responding process at predetermined timings either periodically or not periodically.

As the ID response request responding process starts, at Step S181 the ID response request acquisition processing section 1132 receives first an ID response request. At Step S182 the control section 1131 controls the ID response request acquisition processing section 1132 to judge whether the ID response request acquisition processing section 1132 acquires an ID response request. If it is judged that the request is acquired, the control section 1131 advances the process to Step S183. At Step S183 the bit unit control ID response processing section 1133 executes a bit unit control ID response process. The details of the bit unit control ID response process will be later described. As the bit unit control ID response process of controlling the ID response in a bit unit is completed, the bit unit control ID response processing section 1133 terminates the ID response request responding process. If it is judged at Step S182 that the ID response request is not acquired, the control section 1131 omits the process at Step S183 and terminates the ID response responding process.

Figure 41:
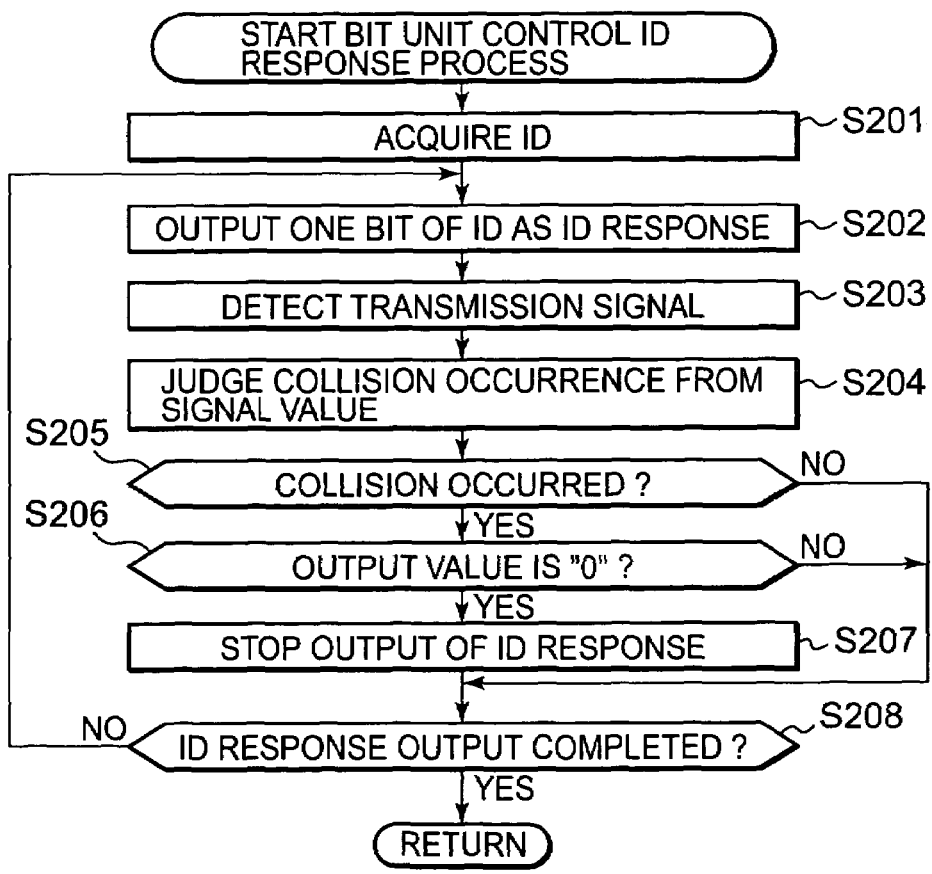
FIG. 41 is a flow chart illustrating an example of a bit unit control ID response process.

Next, with reference to the flow chart shown in FIG. 41, description will be made on the bit unit control ID response process to be executed at Step S183 shown in FIG. 40.

As the bit unit control ID response process starts, at Step S201 the ID acquisition section 1141 acquires ID from the ID holding section 1123, and supplies ID to the bit output section 1142 to advance the process to Step S202. At Step S202 the bit output section 1142 acquired ID extracts one bit of ID in a predetermined order, and outputs the extracted value as an ID response via the transmission/reception section 1112. For example, the bit output section 1142 extracts one bit after another in the order from an upper bit toward a lower bit of ID, and supplies the bits to the transmission/reception section 1112 which outputs the bits. In this case, the bit output section 1142 supplies the output ID response values also to the collision judgment section 1144. As the ID response is output, the bit output section 1142 advances the process to Step S203.

At Step S203 the signal detection section 1143 controls the transmission/reception section 1112 to detect a transmission signal transmitted through the user 1021 as the communication medium. Namely, the signal detection section 1143 detects the transmission signal transmitted through the user 1021 including not only the signal output from the bit output section 1142 at Step S202 but also signals output from other devices including the reader/writer 1001, UD 1003 and UD 1004, and supplies the signal values to the collision judgment section 1144 to advance the process to Step S204.

At Step S204 the collision judgment section 1144 compares the value supplied from the bit output section 1142 with the value supplied from the signal detection section 1143, and judges from the comparison results whether a collision (signal collision) occurred. If other devices output a signal having a value different from that output from the bit output section 1142, the value of the transmission signal transmitted through the user 1021 becomes different from the signal value output from the bit output section 1142, or the value output from the bit output section 1142 is mixed with both "0" and "1" signals. Namely, if the value of the transmission signal transmitted through the user 1021 is different from the signal value output from the bit output section 1142, it means a collision occurrence. Therefore, the collision judgment section 1144 judges a collision occurrence through comparison between the value supplied from the bit output section 1142 and the value supplied from the signal detection section 1143.

If the collision judgment section 1144 judges at Step S205 from the judgment result that a collision occurred, the collision judgment section 1144 supplies the signal value (i.e., the value of one bit of ID) output from the bit output section 1142 to the output control section 1145 and advances the process to Step S206. At Step S206 the output control section 1145 judges whether the supplied output value is "0". If it is judged that the supplied output value is "0", the process is advanced to Step S207 whereat the bit output section 1142 is controlled to stop an output of the ID response.

As the process at Step S207 is completed, the output control section 1145 advances the process to Step S208. If it is judged at Step S205 that a collision does not occur, the collision judgment section 1144 advances the process to Step S208. If it is judged at Step S206 that the output value is "1", the output control section 1145 advances the process to Step S208.

At Step S208 the bit output section 1142 judges whether an ID response output is completed. If it is judged that there exists a bit still not transmitted and the ID response output is not completed, the process returns to Step S202 to repeat the following processes. If it is judged at Step S208 that all bits of ID are output and the ID response output is completed, the bit output section 1142 terminates the bit unit control ID response process to return the process to Step S183 shown in FIG. 40 and terminate the ID response request responding process.

As described above, UDs 1002 to 1004 each confirm a collision occurrence for each bit when ID is output, and an ID response of UD output a predetermined value at the collision occurrence is stopped. Accordingly, the reader/writer 1001 can acquire ID without providing time slots for the ID response process, irrespective of a presence/absence of a collision occurrence. Namely, the reader/writer 1001 can acquire ID in a short time irrespective of a presence/absence of a collision. It is therefore possible for each device of the reader/writer 1001 and UDs 1002 to 1004 to suppress the communication process speed from being lowered by a signal collision. In other words, the communication system can suppress the communication process speed from being lowered by a signal collision.

It is obvious that time slots may be additionally used for the ID response process. In this case, the communication system 100 (each device of the reader/writer 1001 and UDs 1002 to 1004) can suppress a collision occurrence probability and suppress the communication process speed from being lowered by a signal collision.

If a collision occurs by additionally providing time slots, each UD assigns again the ID response process to a time slot (selects a time slot which executes the ID response process).

This assignment of the ID response process is generally performed by a random number generated by each UD. For this ID response process assignment, as described earlier, each UD confirms a collision occurrence for each bit when ID is output, and the next assignment may be controlled in accordance with the confirmation result.

Figure 42:
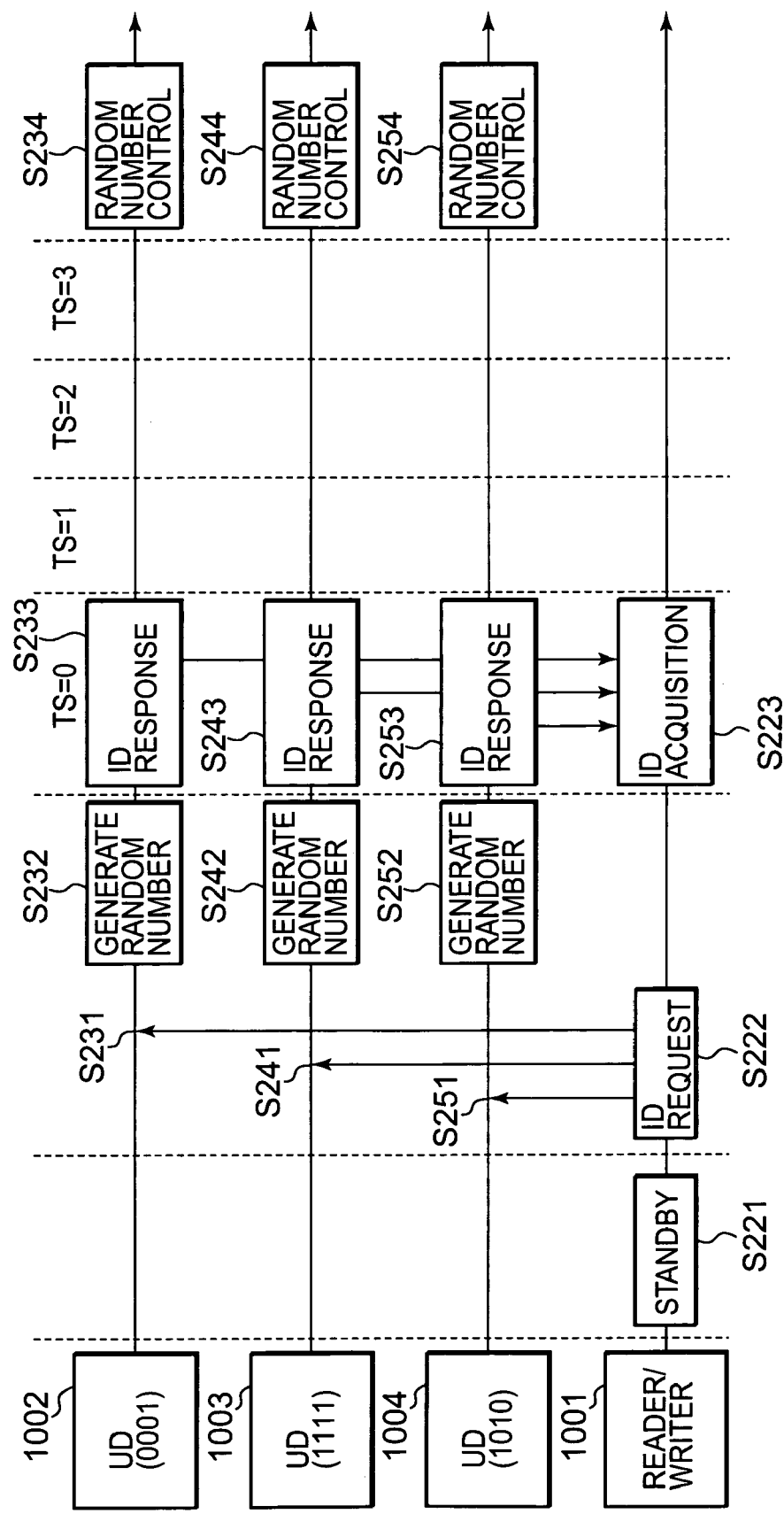
FIG. 42 is a timing chart illustrating another example of the identification information acquisition process.

FIG. 42 is a timing chart illustrating an example of the process sequence to be executed when the reader/writer 1001 acquires identification information of UD in the case wherein each UD controls assignment of the ID response process to a time slot. In the following, it is assumed for the convenience of description that the user 1021 mounting UD 1002, user 1022 mounting UD 1003 and user 1023 mounting UD 1004 are positioned on the signal electrode 1013 of the reader/writer 1001.

As shown in FIG. 42, at Step S221 the reader/writer 1001 stands by for a predetermined time, and at Steps S222 transmits an ID request requesting identification information (ID) to UDs on the signal electrode 1013 through broadcasting (transmission to many and unspecified UDs). UDs 1002 to 1004 acquire the broadcast ID request, as shown at Steps S231, S241 and S251, respectively.

As the ID request is acquired, at Steps S232, S242 and Step S252 UDs 1002 to 1004 each generate a random number for selecting a time slot for the ID response process (assigning the ID response process to a time slot). In FIG. 42, UDs 1002 to 1004 each generate a 2-bit random number, and in accordance with the random number value, the ID response process is assigned to one of four time slots (TS=0 to TS=3). In the example shown in FIG. 42, all UDs 1002 to 1004 assign the ID response process to the time slot (TS=0) having a time slot number of "0".

Therefore, UDs 1002 to 1004 execute the ID response process at the timing of TS=0 as shown at Steps S233, S243 and S253, respectively, and transmits the requested ID to the reader/writer 1001 one bit after another. In response to this, the reader/writer 1001 acquires the supplied ID by the ID acquisition process at Step S223. In the example shown in FIG. 42, UDs 1002 to 1004 transmit the ID response at the same timing (time slot), so that a collision (signal collision) occurs.

The reader/writer 1001 invalidates all IDs acquired in the ID acquisition process at Step S223, and executes again the above-described ID acquisition process (processes at Steps S221 to S223). In this case, in order to suppress a collision occurrence in the next process (cycle), UDs 1002 to 1004 control assignment of the ID response process to a time slot in the next cycle (selection of the time slot for executing the ID response process). Specifically, at Steps S234, S244 and S254 UDs 1002 to 1004 execute a random number control process of determining a random number for the next cycle. Assignment of the ID response process for the next cycle to a time slot is performed using a value generated during this process. Namely, in the cycle after a collision occurrence, assignment of the ID response process to a time slot is performed using not by a random number value (instead of the random number value) but by a value controlled by each UD.

Figure 43:
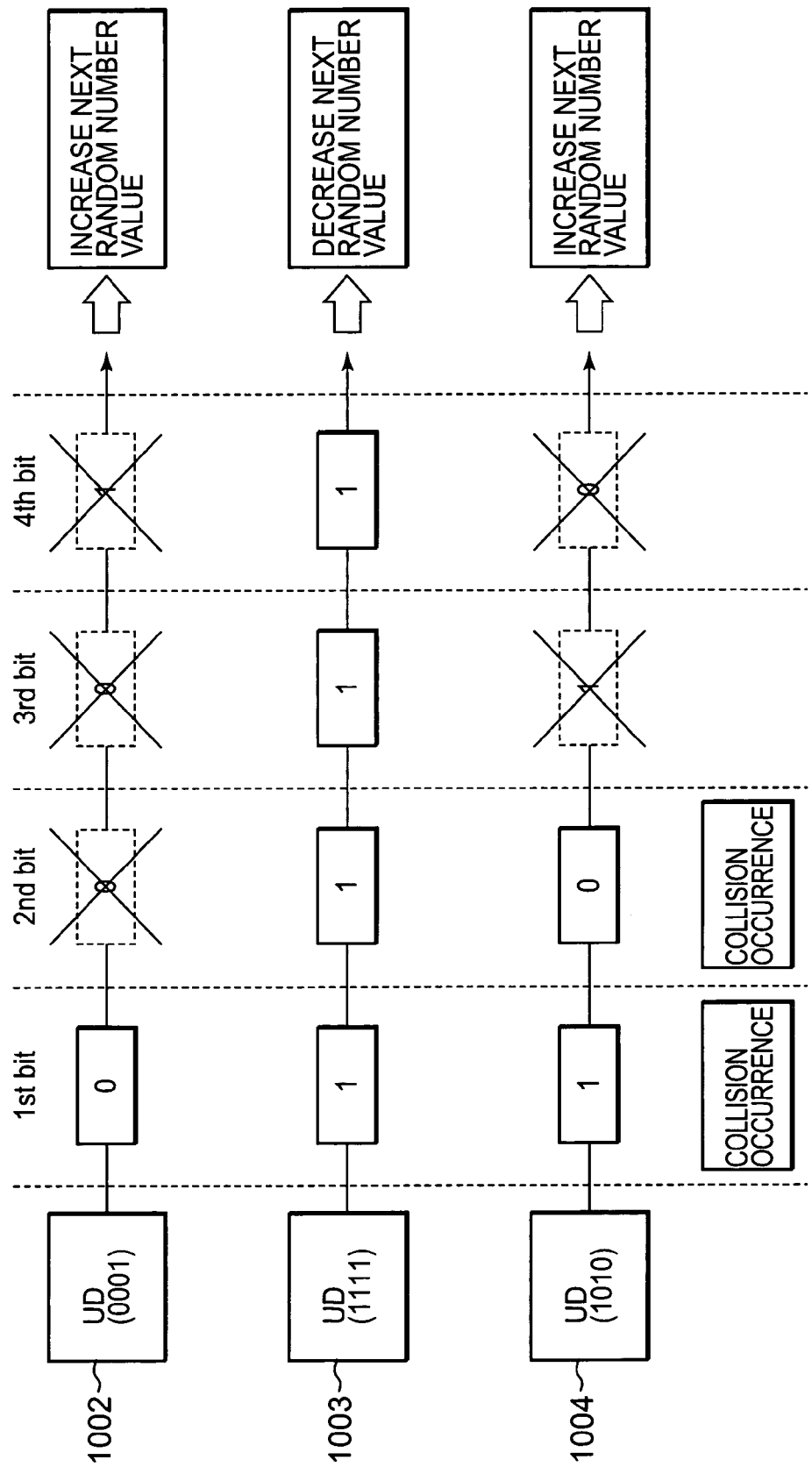
FIG. 43 is a diagram illustrating an example of a random number value control method.

FIG. 43 is a diagram illustrating an example of a random number value control method in the random number control process shown in FIG. 42.

In the example shown in FIG. 43, similar to the description made with reference to the timing chart of FIG. 35, UDs 1002 to 1004 each output ID one bit after another, detect a collision occurrence, and in accordance with the detection results, control an ID output. In the example shown in FIG. 43, the device output the value of "0" at the time of a collision occurrence operates in such a manner that the next random number value is set larger in the random number control process, whereas the device output the value of "1" at the time of a collision occurrence operates in such a manner that the next random number value is set smaller in the random number control process. For example, UDs 1002 to 1004 operate to fix the upper bit value of the 2-bit random number value to "1" in the random number control process if the value of "0" is output at the time of a collision occurrence, and to fix the upper bit value of the 2-bit random number value to "0" in the random number control process if the value of "1" is output at the time of a collision occurrence.

Therefore, UD output the value of "0" at the time of a collision occurrence assigns in the next cycle the ID response process to the time slot (TS=2) having the time slot number of "2" or to the time slot (TS=3) having the time slot number of "3", whereas UD output the value of "1" at the time of a collision occurrence assigns in the next cycle the ID response process to the time slot (TS=0) having the time slot number of "0" or to the time slot (TS=1) having the time slot number of "1". Namely, by controlling the random number value in this manner, each UD can suppress consecutive collision occurrences by the same UDs, i.e., each device of the reader/writer 1001 and UDs 1002 to 1004 can suppress a collision occurrence probability and can suppress the communication process speed from being lowered by a signal collision.

Figure 44:
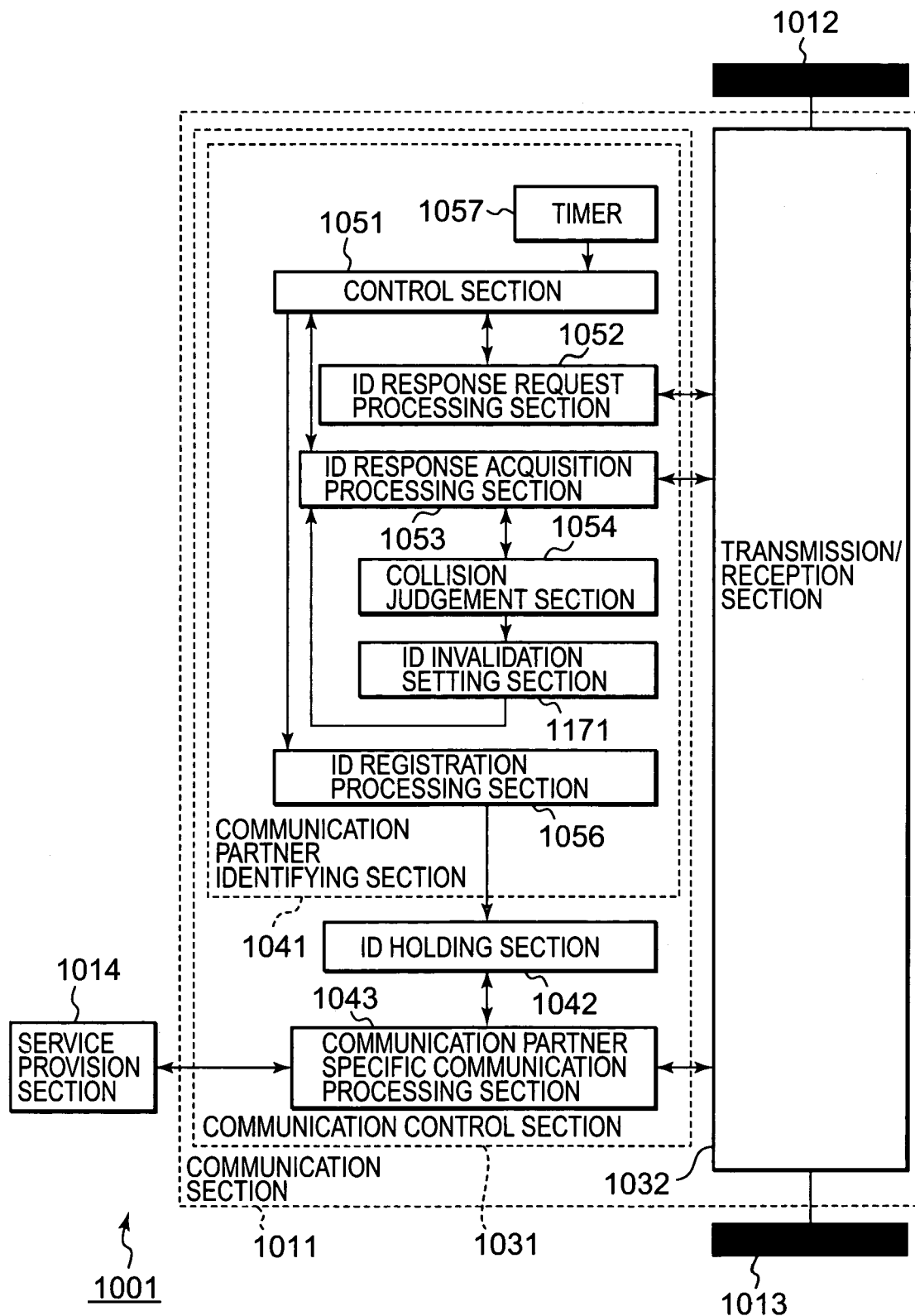
FIG. 44 is a block diagram showing another example of the structure of the reader/writer shown in FIG. 34.

FIG. 44 is a block diagram showing an example of the internal structure of a reader/writer 1001 operating in this manner.

As shown in FIG. 44, although the reader/writer 1001 has fundamentally the same structure as that of the reader/writer 1001 shown in FIG. 36, the reader/writer 1001 has an ID invalidation setting section 1171 in place of the value setting section 1055. If the collision judgment section 1054 judges a collision occurrence, the ID invalidation setting section 1171 invalidates the ID values acquired in the time slot. Namely, although the reader/writer 1001 shown in FIG. 36 forcibly sets the value acquired at the time of a collision occurrence to "1", the reader/writer 1001 shown in FIG. 44 invalidates the acquired IDs and the ID acquisition process is executed again.

Figure 45:
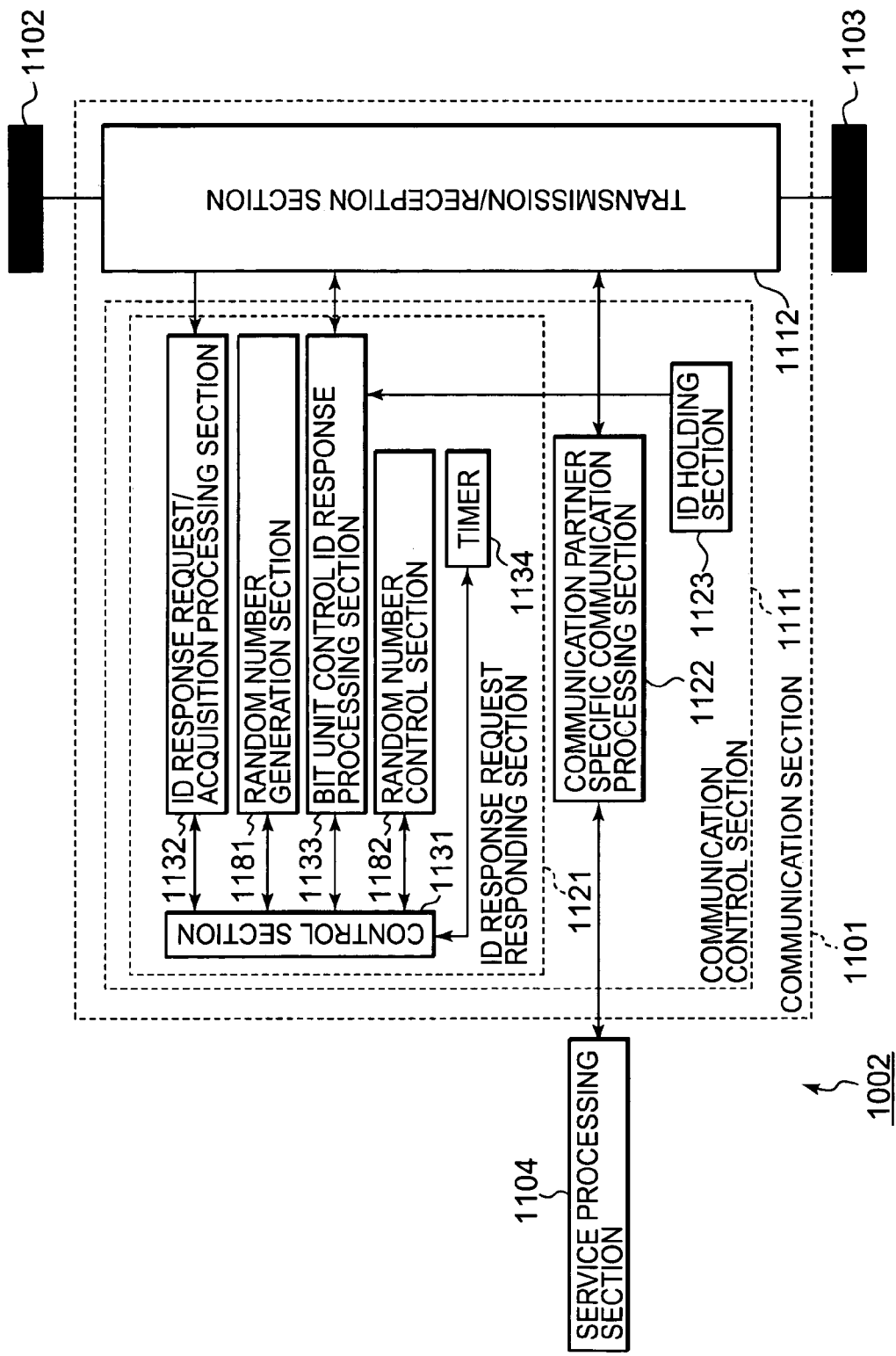
FIG. 45 is a block diagram showing another example of the structure of UD shown in FIG. 34.

FIG. 45 is a block diagram showing an example of the internal structure of UD 1002 operating in the manner described above.

As shown in FIG. 45, similar to the ID response request responding section 1121 of UD 1002 shown in FIG. 37, the ID response request responding section 1121 of UD 1002 operating in the manner described above has a control section 1131, an ID response request acquisition processing section 1132, a bit unit control ID response processing section 1133 and a timer 1134. In addition, the ID response request responding section has a random number generation section 1181 and a random number control section 1182.

The random number generation section 1181 is controlled by the control section 1131, and executes a process (Step S232 in FIG. 42) of generating a random number having a predetermined number of bits in order to assign the ID response process to one of a plurality of time slots prepared. The random number control section 1182 is controlled by the control section 1131, and executes a process (Step S234 in FIG. 42) of controlling the value of a random number to be used in the next cycle, when a collision occurs.

The structures of UD 1003 and UD 1004 are similar to that of UD 1002 and the above description is applicable, so that the description thereof is omitted.

Next, description will be made on a process to be executed by each device.

Figure 46:
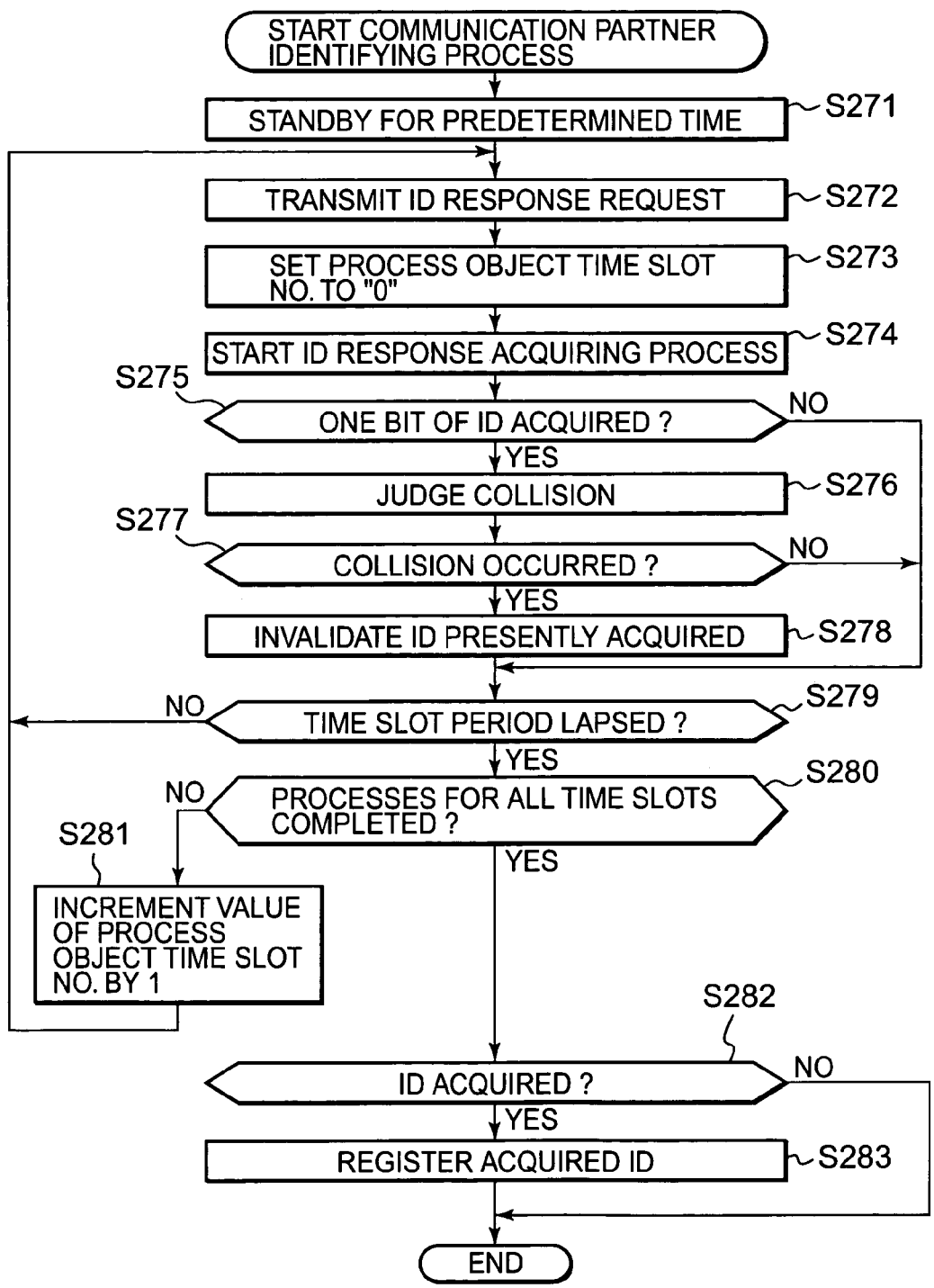
FIG. 46 is a flow chart illustrating another example of the communication partner identifying process.

First, with reference to the flow chart shown in FIG. 46, description will be made on a communication partner identifying process to be executed by the communication partner identifying section 1041 of the reader/writer 1001.

At Step S271 the control section 1051 stands by for a predetermined time in accordance with time information supplied from the timer 1057. After the lapse of the predetermined time, the control section 1051 advances the process to Step S272. At Step S272 the ID response request processing section 1052 controls the transmission/reception section 1032 to transmit an ID response request to UDs through broadcasting (transmission to many and unspecified UDs). After the ID response request is transmitted, the ID response request processing section 1052 advances the process to Step S273.

At Step S273 the control section 1051 sets "0" to a process object time slot number representative of the number of the time slot in which the ID response acquisition process is executed, to thereafter advance the process to Step S274. At Step S274 the ID response acquisition processing section 1053 starts the ID response acquisition process. At Step S275 the ID response acquisition processing section 1053 judges whether one bit of ID is acquired in the ID response acquisition process. If it is judged that ID is acquired, the value of the acquired ID is supplied to the collision judgment section 1054 to thereafter advance the process to Step S276.

In accordance with the supplied value, at Step S276 the collision judgment section 1054 judges whether a collision occurred, and at Step S277 it is judged from the judgment result whether a collision occurred. For example, if a collision occurrence is judged because the value acquired by the ID response acquisition processing section 1053 has both features of "0" and "1", the collision judgment section 1054 supplies the judgment result to the ID invalidation setting section 1171 to thereafter advance the process to Step S278.

At Step S278 the ID invalidation setting section 1171 invalidates IDs to be acquired at this time (in the whole time slot or cycle). Namely, when a collision occurred, the ID invalidation setting section 1171 operates in such a manner that when a collision occurred, at least IDs with collision occurrence are neglected (not acquired) and the communication partner identifying process is executed again.

After the process at Step S278 is completed, the ID invalidation setting section 1171 advances the process to S279. Further, if it is judged at Step S275 that one bit of ID is not acquired, the ID response acquisition processing section 1053 advances the process to Step S279. Furthermore, if it is judged at Step S277 that a collision does not occur, the collision judgment section 1054 advances the process to Step S279.

At Step S279 the ID response acquisition processing section 1053 judges whether the time slot period has elapsed. If it is judged that the time slot period has elapsed, the process returns to Step S275 to repeat the following processes. Namely, the ID response acquisition processing section 1053 repeats the processes at Steps S275 to S279, and acquires all bits of IDs supplied from UDs during one time slot period unless a collision occurs. However, if a collision occurred, at Step S275 the ID response acquisition processing section 1053 judges that the acquired values are invalid (valid values are not acquired), in accordance with the invalidation setting (the process at Step S278) effected by the ID invalidation setting section 1171, to thereafter advance the process to Step S279.

If it is judged at Step S279 that the time slot period has elapsed, the ID response acquisition processing section 1053 advances the process to Step S280. At Step S280 the control section 1051 judges whether the processes are completed for all prepared time slots. If it is judged that the processes are not completed for all time slots, because the process object time slot number value does not reach the maximum value, then the control section 1051 advances the process to Step S281 whereat the process object slot number value is incremented by "1". The control section 1051 returns the process to Step S275 to repeat the following processes. Namely, the control section 1051 operates in such a manner that the processes at Steps S275 to S281 are made to be repeated and the ID response acquisition process is made to be executed for all time slots.

For example, if the ID invalidation setting section 1171 makes settings at Step S278 in such a manner that IDs acquired for all time slots are invalidated when a collision occurred, it is judged that ID is not acquired in the process at Step S275 for all time slots after the collision occurred, and the processes at Steps S276 to S278 are omitted. Further, for example, if the ID invalidation setting section 1171 makes settings at Step S278 in such a manner that IDs acquired are invalidated only for the time slot in which a collision occurred, invalidation settings of IDs are released for the next and following time slots.

If it is judged at Step S280 that the processes are completed for all time slots, because the process object time slot number value reaches the maximum value, then the control section 1051 advances the process to Step S282. At Step S282 the control section 1051 judges whether the ID response acquisition process acquires IDs. If it is judged that IDs are acquired, the acquired IDs are supplied to the ID registration processing section 1056 to thereafter advance the process to Step S283. At Step S283 the ID registration processing section 1056 registers the supplied IDs in the ID holding section 1042 to be held, to thereafter terminate the communication partner identifying process. If it is judged at Step S282 that IDs are not acquired because of, e.g., a collision occurrence, the control section 1051 terminates the communication partner identifying process.

Figure 47:
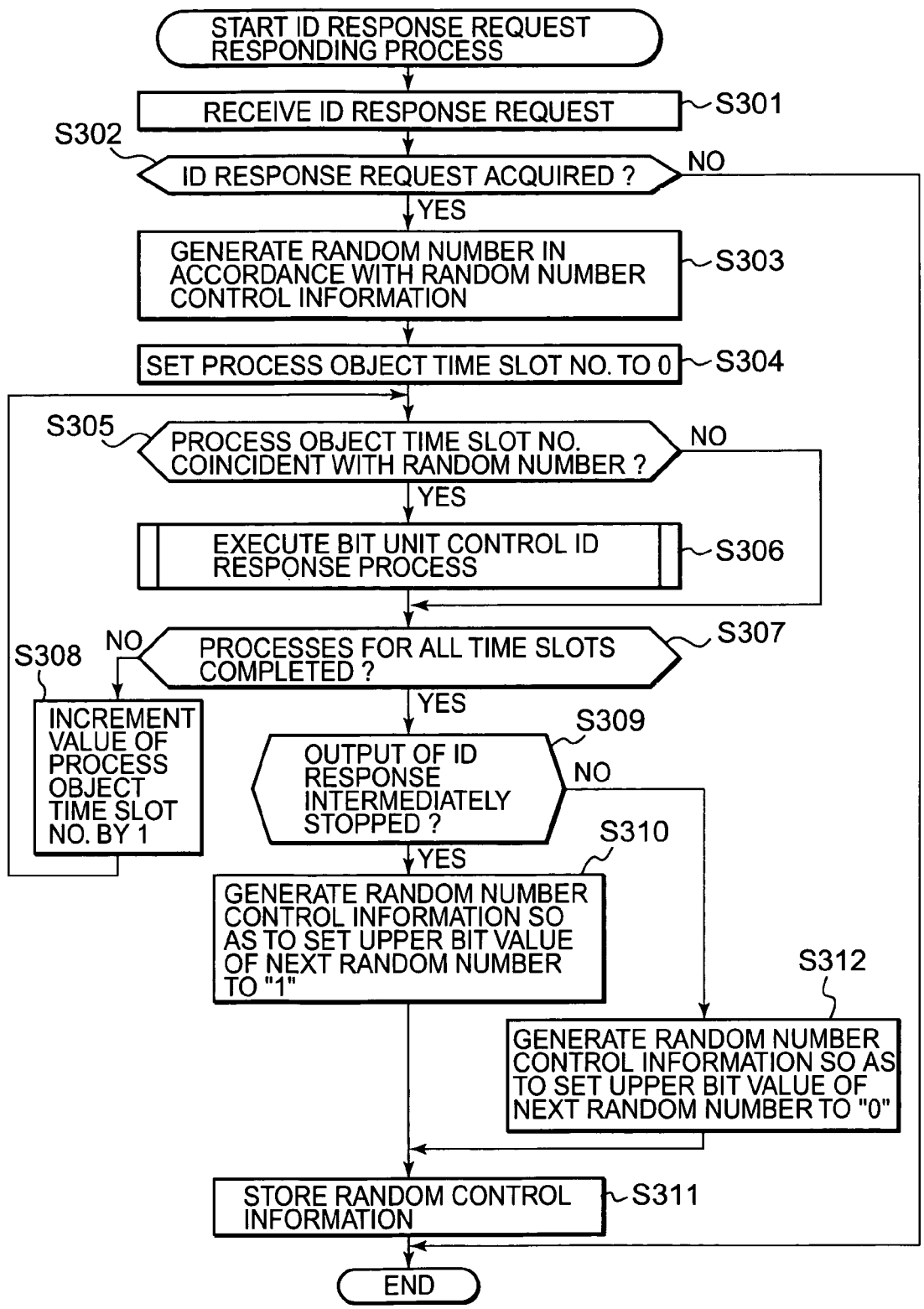
FIG. 47 is a flow chart illustrating another example of the ID response request responding process.

Next, with reference to the flow chart of FIG. 47, description will be made on an ID response request responding process to be executed by UDs 1002 to 1004 in correspondence with the above-described processes by the reader/writer 1001. In the following, description is limited to only the case UD 1002 executes this process. Since UDs 1002 to 1004 execute similar processes, the description of the processes to be executed by UD 1003 and UD 1004 are omitted because the description is duplicated with that of UD 1002.

As the ID response request responding process starts, at Step S301 the ID response request acquisition processing section 1132 receives an ID response request, and it is judged at Step S302 whether the ID response request is received. Similar to the process at Step S231 shown in FIG. 42, if it is judged that the ID request (ID response request) from the reader/writer 1001 is acquired, the ID response request acquisition processing section 1132 advances the process to Step S303.

At Step S303 the random number generation section 1181 is controlled by the control section 1131, and generates a random number in accordance with random number control information supplied to the control section 1131. The random number information is control information to be used for designating in advance a portion or entirety of the digits of a random number value to be generated by the random number generation section 1181. The random number information is generated by a random number control process (process at Step S310 or S312) by the random number control section 1182 to be described later, and held in the control section 1131. Namely, at the second and following cycles, if the control section 1131 holds random number control information generated at the preceding cycle, the control section supplies the random number control information to the random number generation section 1181. The random number generation section 1181 generates a random number by randomly setting a portion of the digits not designated by the supplied random number control information. Namely, if there exists designation by the random number control information, the random number generation section 1181 generates the random number as a pseudo "random number" in conformity with the contents of the random number control information, such as a number constituted of one or a plurality of digits designated by the random number control information, each digit having a value designated by the random number control information, and one or a plurality of rest digits of a random number randomly set and a value generated by using a random number randomly set by a method designated by the random number control information.

Generally, a "random number" randomly set by the random number generation section 1181 is actually a "pseudo" random number generated by a predetermined method. For the simplicity of description, in this specification, the "random number" set randomly by the random number generation section 1181 is called a "real random number" (non-pseudo random number), and the "random number" generated in conformity with the contents of the random number control information is called a "pseudo random number".

As the random number (read random number or pseudo random number) is generated in the manner described above, the random number generation section 1181 supplies the random number to the control section 1131 to thereafter advance the process to Step S304. At Step S304 the control section 1131 sets "0" to a process object time slot number representative of the number of the present time slot in which the bit unit control ID response process is executed, to thereafter advance the process to Step S305.

At Step S305 the control section 1131 judges whether the process time slot number is coincident with the value of a random number (random number value) generated by the random number generation section. If it is judged that the process object time slot number is coincident with the random number (i.e., the present time slot is assigned to the ID response process), the control section 1131 advances the process to Step S306. At Step S306 the bit unit control ID response processing section 1133 executes the bit unit control ID response process in the manner described with reference to the flow chart of FIG. 41. Namely, the bit unit control ID response processing section 1133 transmits the ID response to the reader/writer 1001 in the present time slot under control of a bit unit of ID. As the bit unit control ID response process is completed, the bit unit control ID response processing section 1133 advances the process to Step S307.

If it is judged at Step S305 that the process object time slot number does not coincide with the random number and the present time slot is not assigned to the ID response process, then the control section 1131 omits the bit unit control ID response process at Step S306, and advances the process to Step S307 after a lapse of a normal ID response wait time.

At Step S307 the control section 1131 judges whether the processes are completed for all time slots. If it is judged that the process object time slot number does not reach the maximum number (the number of prepared time slots) and the processes are not completed for all time slots, the control section 1131 advances the process to Step S308 whereat the value of the process object time slot number is incremented by "1". After the process at Step S308 is completed, the control section 1131 returns the process to Step S305 to repeat the following processes. Namely, the control section 1131 controls each section to repeat the processes at Steps S305 to 308 until the processes regarding the ID response are completed for all time slots.

If it is judged at Step S307 that the process object time slot number reaches the maximum number (the number of prepared time slots) and the processes are completed for all time slots, the control section 1131 advances the process to Step S309 whereat the bit unit control ID response processing section 1133 is controlled to judge whether the bit unit control ID response process executed at Step S306 by the bit unit control ID response processing section 1133 stopped intermediately the ID response output (whether the process at Step S207 was executed). Namely, the control section 1131 judges whether a collision occurred in the bit unit control ID response process and the output value was "0".

This judgment process corresponds to the process in the example shown in FIG. 41, and the judgment conditions correspond to the bit unit control ID response process described with reference to the flow chart of FIG. 41. Namely, in the example shown in FIG. 41, if the ID response output is intermediately stopped while the output value is "1" at the time of a collision occurrence, the control section 1131 judges whether a collision occurred in the bit unit control ID response process and the output value was "1".

The control section 1131 supplies the judgment result to the random number control section 1182.

If the control section 1131 judges that the ID response output was stopped intermediately, in accordance with this judgment the random number control section 1182 advances the process to Step S310 whereat the random number control section 1182 generates the random number control information in such a manner that "1" is set to the upper bit value of the next random number value (value of the 2-bit information random number in the next cycle). The random number control section 1182 supplies the generated random number control information to the control section 1131 to thereafter advance the process to Step S311. At Step S311 the control section 1131 stores the supplied random number control information to use it in the next cycle, to thereafter terminate the ID response request responding process.

If the control section 1131 judges that the ID response output was not stopped intermediately, in accordance with this judgment the random number control section 1182 advances the process to Step S312 whereat the random number control section 1182 generates the random number control information in such a manner that "0" is set to the upper bit value of the next random number value (value of the 2-bit information random number in the next cycle). The random number control section 1182 supplies the generated random number control information to the control section 1131 to thereafter advance the process to Step S311. At Step S311 the control section 1131 stores the supplied random number control information to use it in the next cycle, to thereafter terminate the ID response request responding process.

If it is judged at Step S302 that the ID response request is not acquired, the ID response request acquisition processing section 1132 terminates the ID response request responding process.

As described above, the reader/writer 1001 and UDs 1002 to 1004 (i.e., communication system 1000) can suppress a collision occurrence probability and can suppress the communication process speed from being lowered by a signal collision, because a plurality of time slots are prepared for the ID response process.

Further, the reader/writer 1001 and UDs 1002 to 1004 (i.e., communication system 1000) can further suppress a collision occurrence probability and can further suppress the communication process speed from being lowered by a signal collision, because a series of processes regarding the ID response is repeated until a collision does not occur, and during this repetition, the random number value is controlled in the next cycle.

Furthermore, the reader/writer 1001 and UDs 1002 to 1004 (i.e., communication system 1000) can suppress consecutive collision occurrences by the same UDs during repetition of a series of processes regarding the ID response, because the random number control method is changed with the value output at the time of a collision occurrence on the basis of the result of the bit unit control ID response process.

In the foregoing, the random number control section 1182 controls the random number by different methods at Steps S310 and S312 while the ID response output is intermediately stopped or not stopped. The embodiment is not limited thereto. For example, one of Steps S310 and S312 may be omitted, and the random number is controlled either while the ID response output is intermediately stopped or while the ID response output is not intermediately stopped.

Obviously, the random number control methods at Steps S310 and S312 are not limited to those described above, but any methods may be used. For example, a predetermined constant may be set, bit values having different random numbers may be set, or a random number generation method may be designated.

Further, for example, a random number generation probability may be weighted for each value of a random number to be generated by the random number generation section 1181. For example, the random number control section 1182 sets 40% to a probability that the random number generation section 1181 generates a random number value of "0", 30% to a probability that the random number generation section 1181 generates a random number value of "1", 20% to a probability that the random number generation section 1181 generates a random number value of "2", and 10% to a probability that the random number generation section 1181 generates a random number value of "3". In this case, the random number control section 1182 controls by probability the random number to be generated by the random number generation section 1181. By weighting the generation probability, the random number control section 1182 can make a random number having a predetermined value be easy or difficult to be generated.

In the foregoing, although the number of time slots is set to a predetermined number, the number of time slots may be made variable. For example, the number of time slots may be set to 1 (or 0) at the initial stage, and the number of time slots is increased each time a collision occurs (e.g., the number of bits of a random number to be generated by the random number generation section 1181 is incremented by "1").

Figure 48:
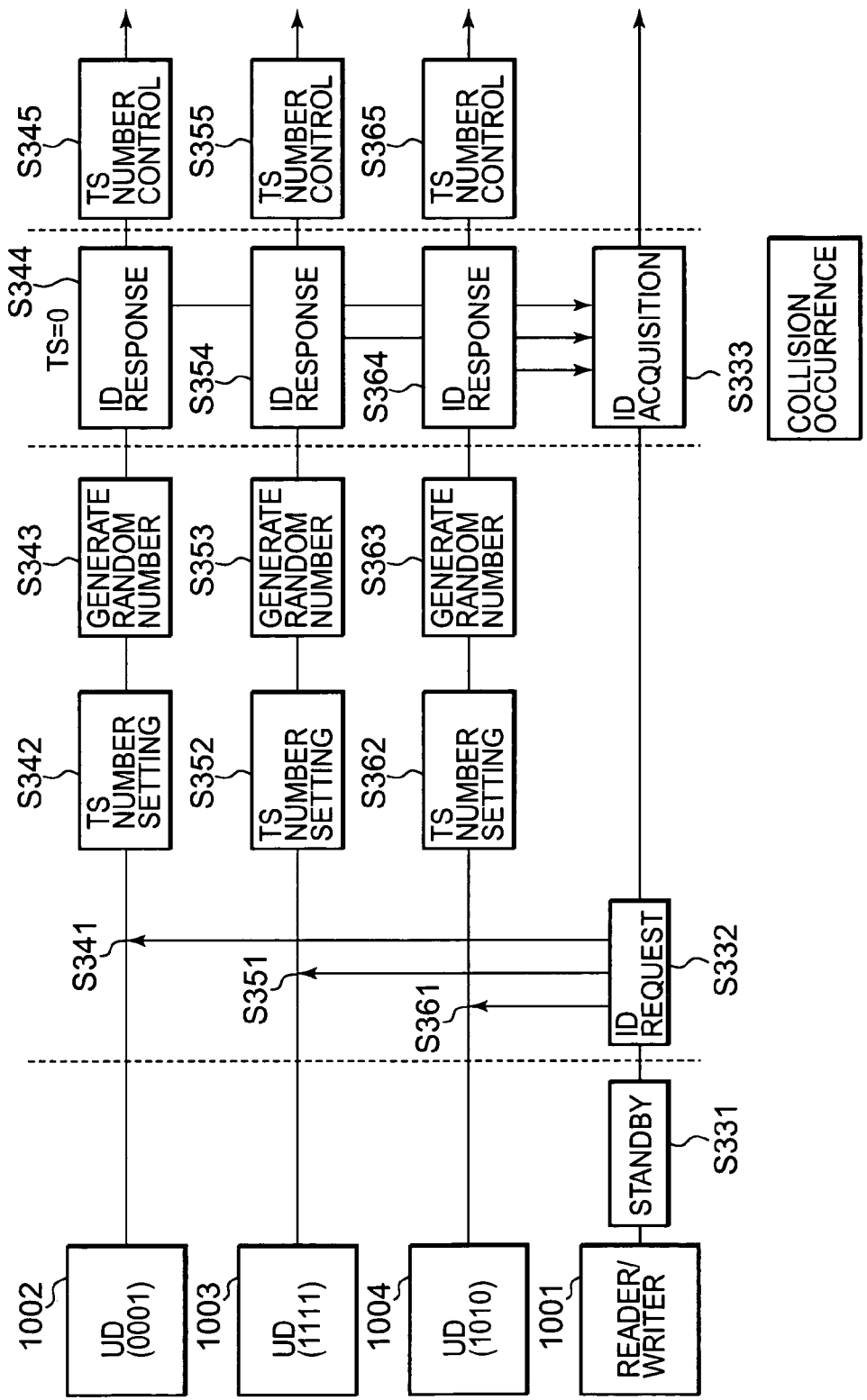
FIG. 48 is a flow chart illustrating still another example of the identification information acquisition process.

FIG. 48 is a timing chart illustrating an example of the process sequence to be executed when the reader/writer 1001 acquires identification information of UD in the case wherein each UD controls the number of time slots. In the following, it is assumed for the convenience of description that the user 1021 mounting UD 1002, user 1022 mounting UD 1003 and user 1023 mounting UD 1004 are positioned on the signal electrode 1013 of the reader/writer 1001.

As shown in FIG. 48, at Step S331 the reader/writer 1001 stands by for a predetermined time, and at Steps S332 transmits an ID request requesting identification information (ID) to UDs on the signal electrode 1013 through broadcasting (transmission to many and unspecified UDs). UDs 1002 to 1004 acquire the broadcast ID request, as shown at Steps S341, S351 and S361, respectively.

As the ID request is acquired, at Steps S342, S352 and Step S362 UDs 1002 to 1004 each set the number of time slots, e.g., a range of allowable random number values (e.g., the number of bits of a random number) (TS number setting). In accordance with the setting information (the number of time slots), at Steps S343, S353 and Step S363 UDs 1002 to 1004 each generate a random number to be used for selecting the time slot in which the ID response process is executed (to be used for assigning the ID response process to a time slot). In the example shown in FIG. 47, UDs 1002 to 1004 set the number of time slots to "1" (time slot number TS=0, only). In this case, the number of bits of a random number is set to "0" (set so as not to generate a random number).

Therefore, as shown at Steps S344, S354 and Step S364 UDs 1002 to 1004 each execute the ID response process in the time slot (TS=0) having a time slot number of "0", and transmit the requested ID one bit after another to the reader/writer 1001. The reader/writer 1001 acquires the supplied IDs by the ID acquisition process at Step S333. In the example shown in FIG. 48, since UDs 1002 to 1004 transmit the ID responses at the same timing (in the same time slot), a collision (signal collision) occurs.

The reader/writer 1001 invalidates all IDs acquired by the ID acquisition process at Step S333, and executes again the above-described ID acquisition process (process at Steps S331 to S333). In order to suppress a collision occurrence in the next cycle, at Steps S345, S355 and S365 UDs 1002 to 1004 each execute a process (TS number control) of controlling the number of time slots in the next cycle.

Specifically, in order to lower a collision occurrence probability, UDs 1002 to 1004 generally control to increase the number of time slots in the next cycle more than that in the present cycle, by increasing the number of bits of a random number or by other methods.

Figure 49A:
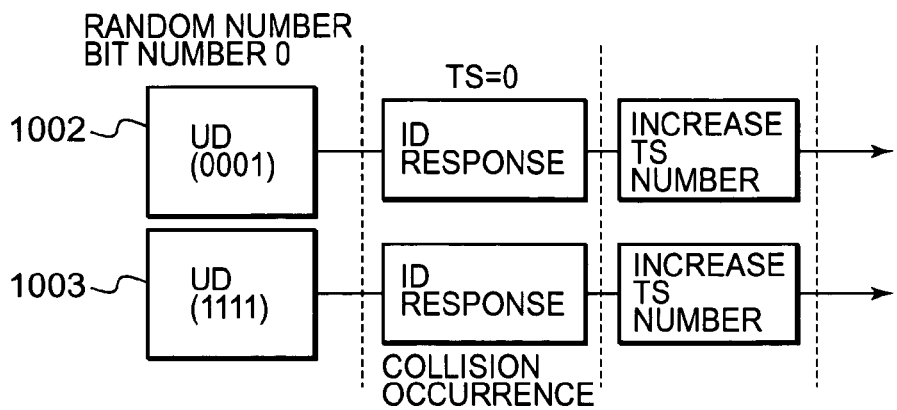
FIG. 49A is a diagram illustrating a first example of how the number of time slots is controlled.

FIG. 49 is a diagram illustrating an example of how the number of time slots is controlled. In FIG. 49, for the simplicity of description, description is directed to only UDs 1002 and 1003. For example, as shown in FIG. 49A, UDs 1002 and 1003 set the number of bits of a random number to an initial value of "0". In this case, the time slot for the ID response has only one time slot number of "0" (TS=0). Therefore, in this case, as shown in FIG. 49A, UDs 1002 and 1003 perform the ID response at the same time, so that a collision occurs. UDs 1002 and 1003 increase the number of time slots in the next cycle (the random number value is increased by one bit (TS number increase).

Figure 49B:
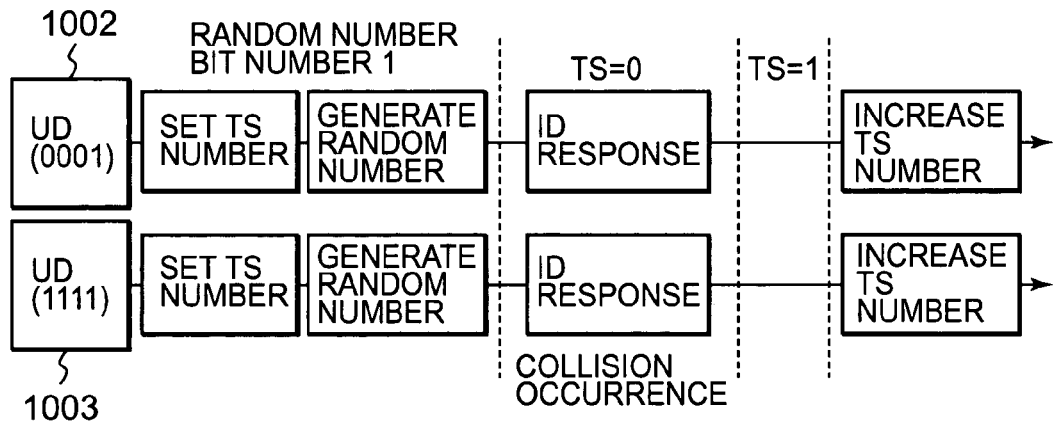
FIG. 49B is a diagram illustrating a second example of how the number of time slots is controllled.

Therefore, as shown in FIG. 49B, UDs 1002 and 1003 each have two time slots in the next cycle: a time slot having a time slot number of "10" (TS=0) and a time slot having a time slot number of "1" (TS=1). In the example shown in FIG. 49B, since the ID response process is assigned to the time slot having the time slot number of "0" (TS=0) in both UDs 1002 and 1003, similar to the case shown in FIG. 49A, a collision occurs. UDs 1002 and 1003 increase further the number of time slots in the next cycle (increase the random number by one bit) (TS number increase).

Figure 49C:
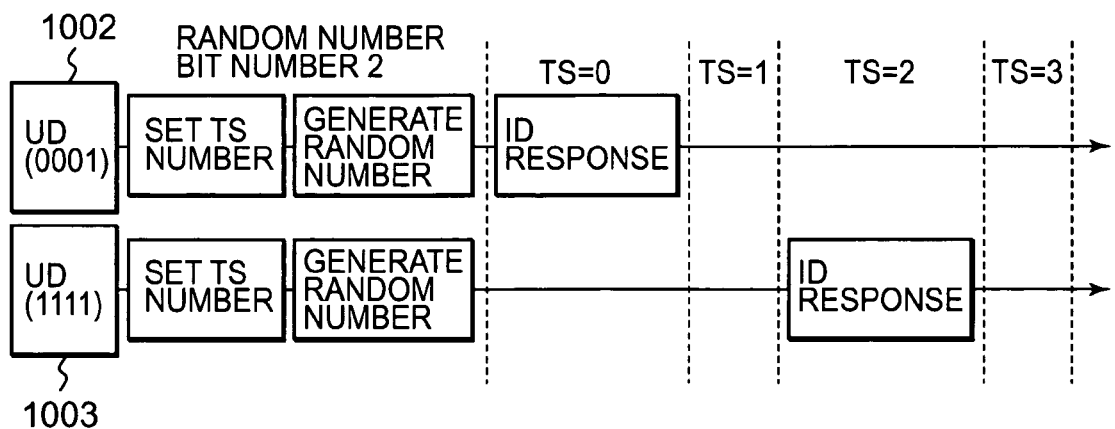
FIG. 49C is a diagram illustrating a third example of how the number of time slots is controlled.

Therefore, as shown in FIG. 49C, UDs 1002 and 1003 each have four time slots having the time slot numbers of "0" to "3" (TS=0 to TS=3) in the next cycle. In the example shown in FIG. 49C, in UD 1002, the time slot having the time slot number of "0" (TS=0) is assigned to the ID response process, and in UD 1003, the time slot having the time slot number of "2" (TS=2) is assigned to the ID response process. In this case, therefore, a collision will not occur.

In this manner, at Steps S345, Step S355 and S365 UDs 1002 to 1004 control to increase the number of time slots in the next cycle more than that in the present cycle, by increasing the number of bits of a random number or by other methods, to thereby lower a collision occurrence probability.

In other words, since UDs 1002 to 1004 increase the number of time slots in response to a collision occurrence, if a collision does not occur, the number of time slots is not increased. Namely, UDs 1002 to 1004 can reduce the number of unnecessary time slots (unnecessary process time). It is therefore possible for the reader/writer 1001 and UDs 1002 to 1004 (i.e., communication system 1000) to suppress the communication speed from being lowered by a signal collision.

Obviously, UDs 1002 to 1004 may control to reduce the number of time slots in the next cycle or may control not to change the number of time slots in the next cycle (hold a present state).

Figure 50:
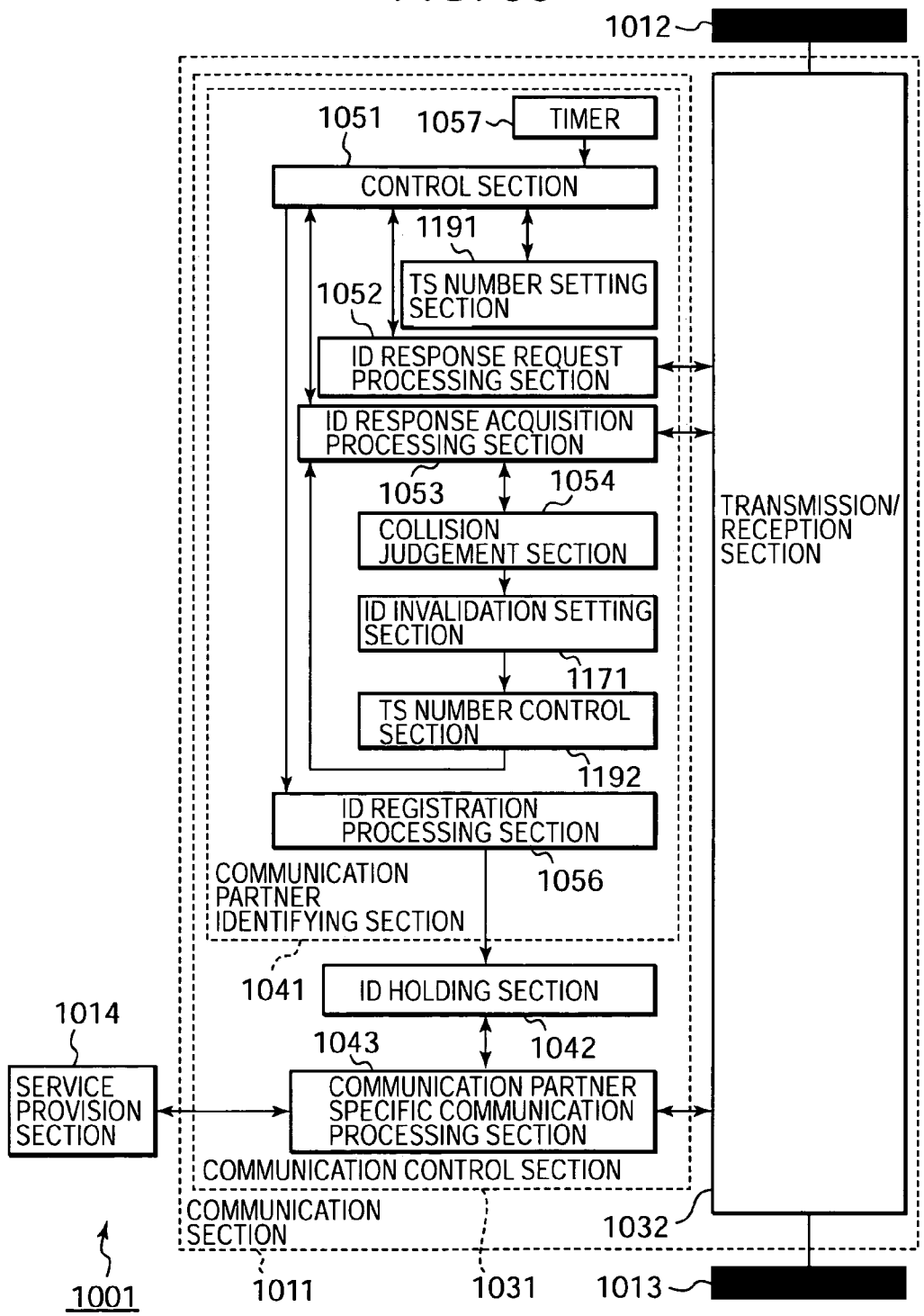
FIG. 50 is a block diagram showing still another example of the structure of the reader/writer shown in FIG. 34.

FIG. 50 is a block diagram showing an example of the internal structure of the reader/writer 1001 adopting the case described above.

As shown in FIG. 50, although the reader/writer 1001 adopting this case has fundamentally the structure similar to that of the reader/writer 1001 shown in FIG. 44, the reader/writer 1001 has a time slot number setting section (TS number setting section) 1191 and a time slot number control section (TS number control section) 1192. The TS number setting section 1191 is sets a time slot number in accordance with the control information generated by the control section 1192 and held by the control section 1051. The TS number control section 1192 generates control information when a collision occurs, in accordance with a predetermined algorithm, in order to change (e.g., increase the number of time slots more than the present time slot number) the time slot number in the next cycle. The generated control information is made to be held in the control section 1051 via the ID response acquisition processing section. The algorithm is required to be the same algorithm to be used by a communication partner UD. Namely, although the time slot number changes by repeating the process of transmission/reception of ID described above, the same time slot number is always set at the devices of the communication system 1000. If a collision does not occur, the TS number control section 1192 may initialize the settings of the time slot number.

Figure 51:
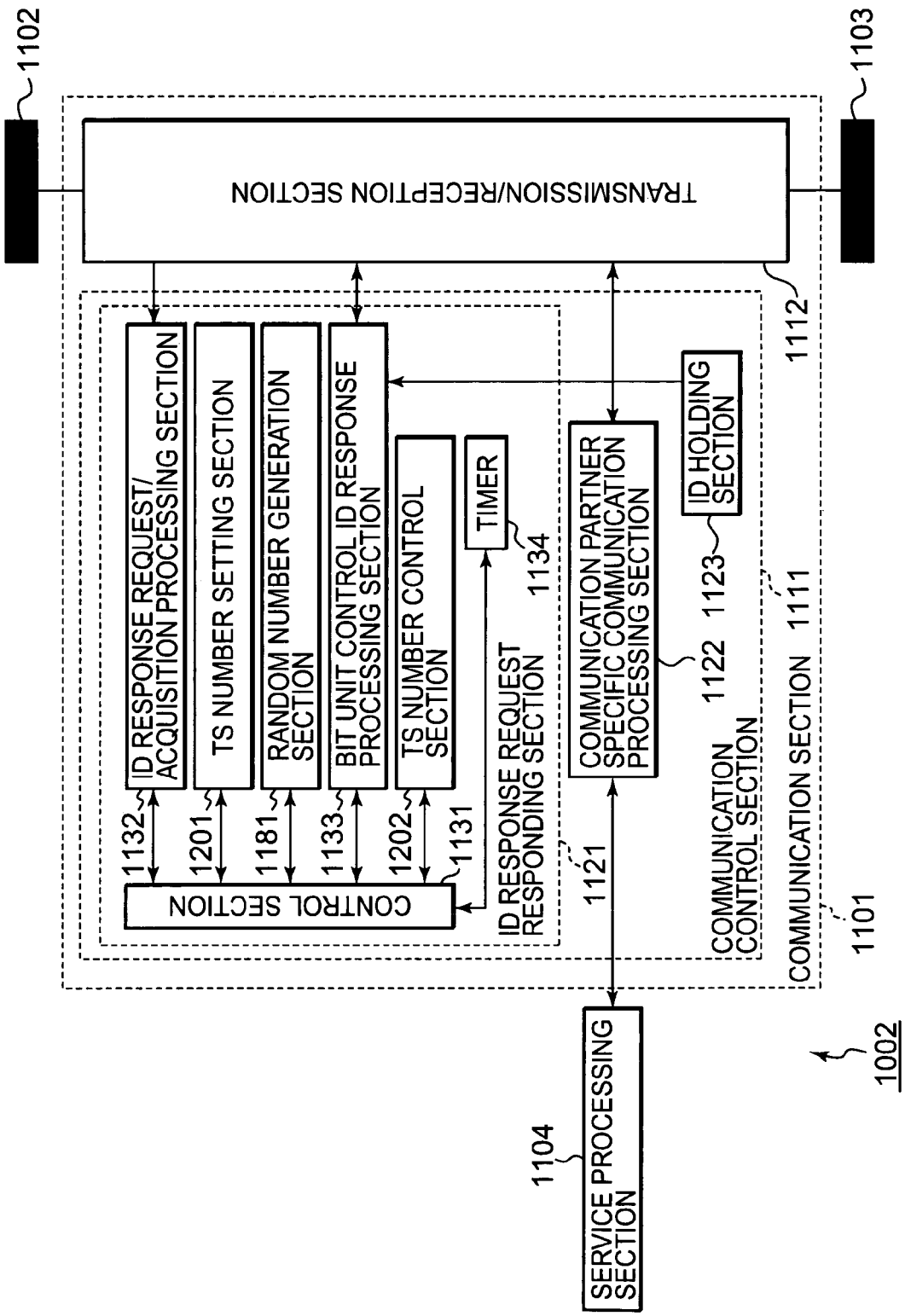
FIG. 51 is a block diagram showing still another example of the structure of UD shown in FIG. 34.

FIG. 51 us a block diagram showing an example of the internal structure of UD 1002 adopting the case described above.

As shown in FIG. 51, similar to the ID response request responding section 1121 of UD 1002 shown in FIG. 45, the ID response request responding section 1121 of UD 1002 in this case has a control section 1131, an ID response request acquisition processing section 1132, a bit unit control ID response processing section 1133, a timer 1134 and a random number generation section 1181, and in addition a time slot number setting section (TS number setting section) 1201 and a time slot number control section (TS number control section) 1202.

The TS number setting section 1201 is controlled by the control section 1131, and sets the number of time slots to which the ID response process is assigned. For example, in accordance with the control information held by the control section 1131, the TS number setting section 1201 sets a time slot number. The TS number control section 1202 generates control information when a collision occurs, to set a time slot number in the next cycle in accordance with the predetermined algorithm. The generated control information is made to be held in the control section 1131. The algorithm is required to be the same algorithm used by the communication partner reader/writer.

Next, a process to be executed by each device will be described.

With reference to the flow charts of FIGS. 52 and 53, description will be made on a communication partner identifying process to be executed by the reader/writer 1001 in this case.

As the communication partner identifying process starts, at Step S382 the control section 1051 stands by for a predetermined time, and thereafter advances the process to Step S382. At Step S382 the ID response request processing section 1052 controls the transmission/reception section 1032 to transmit an ID response request.

At Step S383 the TS number setting section acquires the control information 1191 for the time slot number from the control section 1051, and sets the time slot number on the basis of the control information to thereafter advance the process to Step S384.

At Step S384 the control section 1051 sets the process object time slot number to "0", and advances the process to Step S385. At Step S385 the ID response acquisition processing section 1053 controls the transmission/reception section 1032 to start the ID response acquisition process. At Step S386 the ID response acquisition processing section 1053 judges whether one bit of ID is acquired. If it is judged that one bit is acquired, the acquired information is supplied to the collision judgment section 1054 to thereafter advance the process to Step S387.

In accordance with the supplied value, at Step S387 the collision judgment section 1054 performs a collision judgment, and judges at Step S388 from the judgment result whether a collision occurred. For example, if the value acquired by the ID response acquisition processing section 1053 has both features of "0" and "1" and it is judged that a collision occurred, then the collision judgment section 1054 supplies the judgment result to the ID invalidation section 1171 to thereafter advance the process to Step S389.

At Step S389 the ID invalidation setting section 1171 invalidates presently acquired IDs (in this time slot or in the whole cycle). Namely, when a collision occurs, the ID invalidation setting section 1171 neglects (does not acquire) at least the IDs with a collision occurrence in order to execute again the communication partner identifying process.

After the process at Step S389 is completed, the ID invalidation setting section 1171 advances the process to Step S390. At Step S390) the TS number control section 1192 generates control information for time slots in accordance with the predetermined algorithm, and makes the control information to be held in the control section 1051 via the ID response acquisition processing section 1053, in order to increase the next time slot number more than the present time slot number. Although the time slot number is increased in this example for the simplicity of description, if the algorithm operates to decrease the time slot number, the TS number control section 1192 generates control information in accordance with this algorithm, in order to decrease the next time slot number. The TS number control section 1192 completed the process at Step S390 advances the process to Step S401 shown in FIG. 53.

Figure 53:
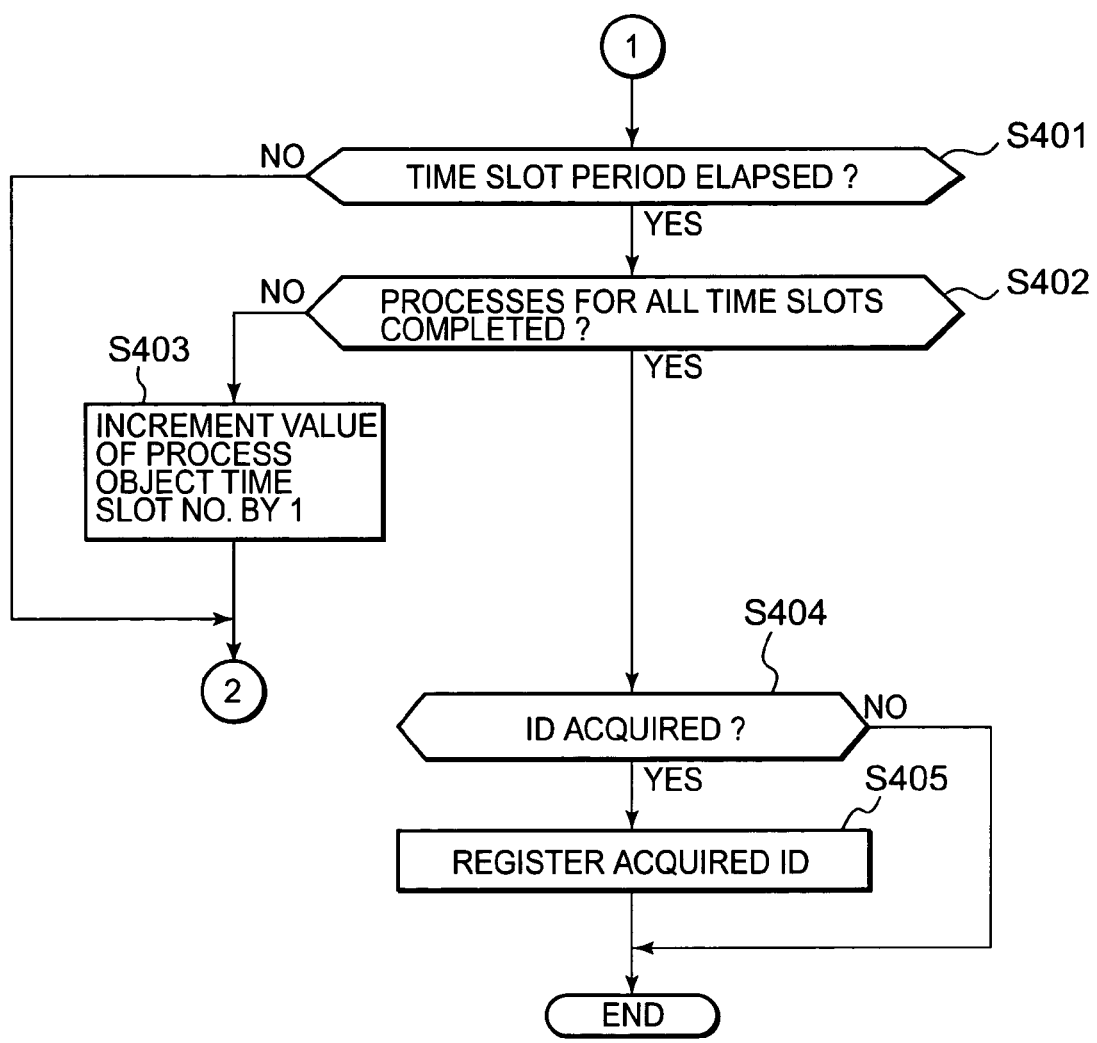
FIG. 53 is a flow chart illustrating still another example of the communication partner identifying process, following the flow chart shown in FIG. 52.

If it is judged at Step S386 that one bit of ID is not acquired, the ID response acquisition processing section 1053 advances the process to Step S401 shown in FIG. 53. If it is judged at Step S388 that a collision does not occur, the collision judgment section 1054 advances the process to Step S391. At Step S391 the TS number control section 1192 makes via the ID response acquisition processing section 1053 the control section 1051 delete the control information held by the control section 1051, to thereby initialize the setting of the time slot number. As the process at Step S391 is completed, the TS number control section 1192 advances the process to Step S401 shown in FIG. 53.

At Step S401 shown in FIG. 53, the ID response acquisition processing section 1053 judges whether the time slot period has elapsed. If it is judged that the time slot period does not elapse, the process returns to Step S386 shown in FIG. 52 to repeat the following processes. Namely, the ID response acquisition processing section 1053 makes the process at Step S386 shown in FIG. 52 to the process at Step S401 shown in FIG. 53 be repeated, to thereby acquire all bits of IDs supplied from UDs during one time slot period unless a collision occurs. However, if a collision occurs, in the process at Step S386 shown in FIG. 52, the ID response acquisition processing section 1053 judges that the presently acquired values are invalid (valid values of IDs are not acquired), in accordance with the invalidation setting (process at Step S389 shown in FIG. 52) made previously by the ID invalidation setting section 1171, to thereafter advance the process to Step S401 shown in FIG. 53.

If it is judged at Step S401 shown in FIG. 53 that the time slot period lapsed, the ID response acquisition processing section 1053 advances the process to Step S402. At Step S402 the control section 1051 judges whether processes are completed for all time slots set by the process at Step S383 shown in FIG. 52. If it is judged that the process object time slot number does not reach the maximum value and processes are not completed for all time slots, the control section 1051 advances the process to Step S403 shown in FIG. 53 whereat the value of the process object time slot number is incremented by "1". The control section 1051 returns the process to Step S386 shown in FIG. 52 to repeat the following processes. Namely, the control section 1051 makes the process at Step S386 shown in FIG. 51 to the process at Step S403 shown in FIG. 53 be repeated, to thereby execute the ID response acquisition process for all time slots.

Figure 52:
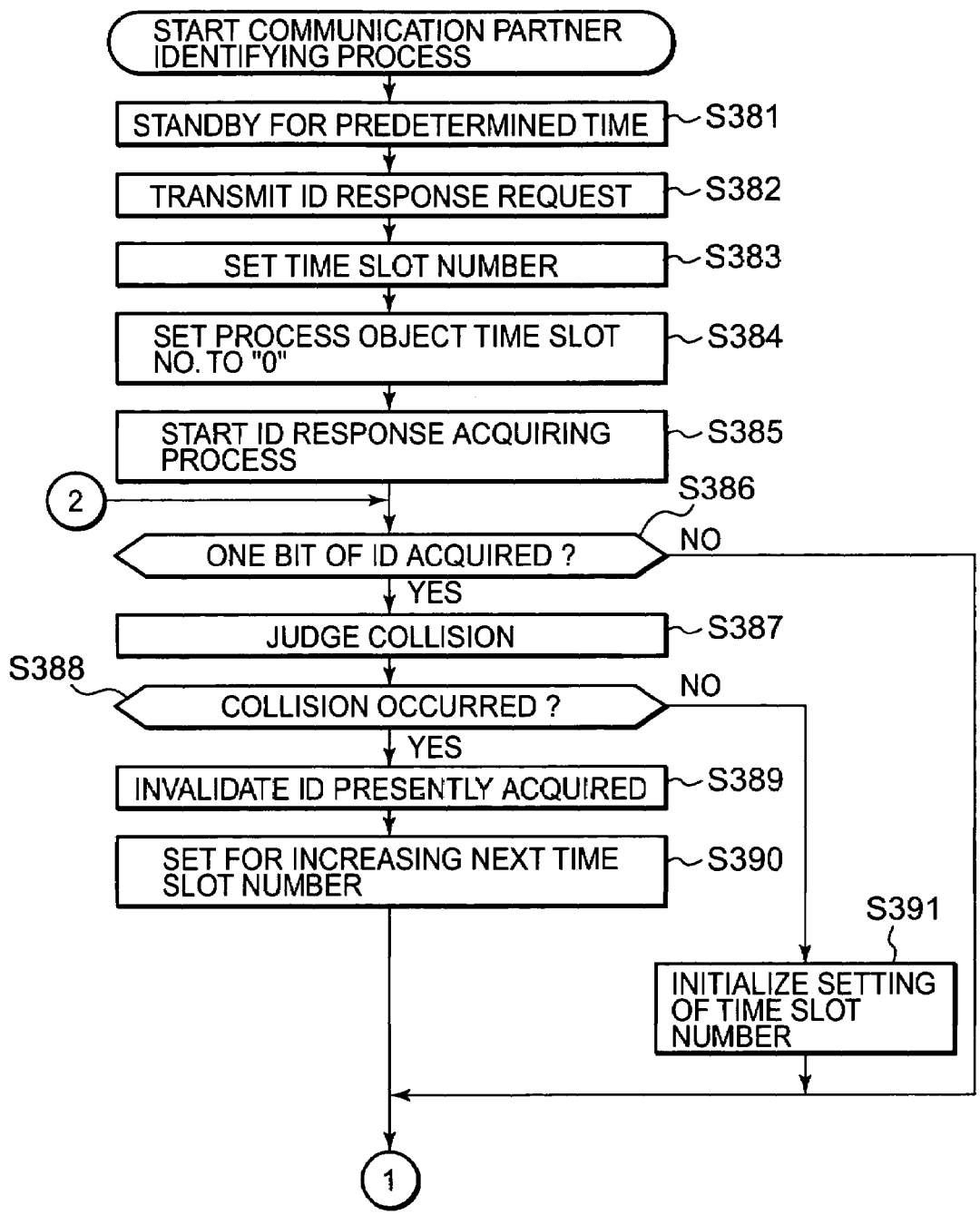
FIG. 52 is a flow chart illustrating still another example of the communication partner identifying process.

For example, if a collision occurs and the ID invalidation setting section 1171 makes settings at Step S389 shown in FIG. 52 that IDs acquired for all time slots are invalidate, the process at Step S386 shown in FIG. 52 judges that IDs are not acquired for all the following time slots, and the process at Step S387 shown in FIG. 52 to the process at Step S391 shown in FIG. 52 are omitted.

If it is judged at Step S402 shown in FIG. 53 that the process object time slot number reaches the maximum value and processes are completed for all time slots, the control section 1051 advances the process to Step S404. At Step S404 the control section 1051 judges from the ID response acquisition process whether IDs are acquired. If it is judged that IDs are acquired, the acquired IDs are supplied to the ID registration processing section 1056 to thereafter advance the process to Step S405. At Step S405 the ID registration processing section 1056 makes the ID holding section 1042 register and hold the supplied IDs, to thereafter terminate the communication partner identifying process. For example, if it is judged at Step S404 that IDs are not acquired because of a collision occurrence or the like, the control section 1051 terminates the communication partner identifying process.

Figure 54:
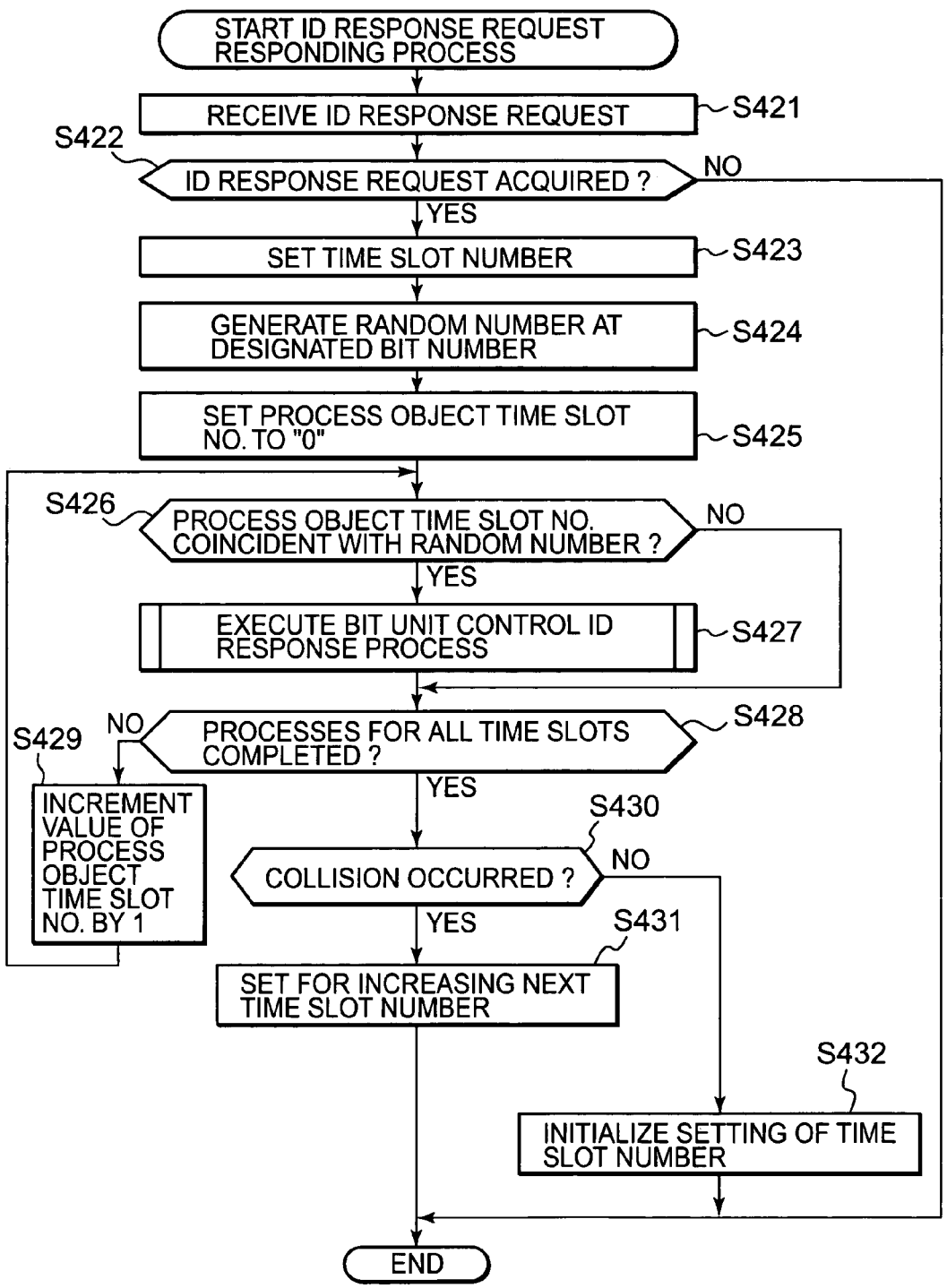
FIG. 54 is a flow chart illustrating still another example of the ID response request responding process.

Next, with reference to the flow chart shown in FIG. 54, description will be made on the ID response request responding process to be executed by UDs 1002 to 1004 in correspondence with the above-described processes of the reader/writer 1001. In the following, description is limited only to the case UD 1002 executes this process. Since UDs 1002 to 1004 execute similar processes, the description of the processes to be executed by UD 1003 and UD 1004 are omitted because the description is duplicated with that of UD 1002.

As the ID response request responding process starts, at Step S421 the ID response request acquisition processing section 1132 receives an ID response request, and it is judged at Step S422 whether the ID response request is received. Similar to the process at Step S341 shown in FIG. 48, if it is judged that the ID request (ID response request) from the reader/writer 1001 is acquired, the ID response request acquisition processing section 1132 advances the process to Step S423.

At Step S423 the TS number setting section 1201 is controlled by the control section 1131, and sets a time slot number in accordance with the control information for controlling the time slot number, supplied from the control section 1131. This control information is control information generated by the TS number control section 1201. The control information is generated by a TS number control process (process at Step S431 or Step S432) by the TS number control section 1202 to be described later, and held by the control section 1131. Namely, the control section 1131 supplies the control information to the TS number setting section 1201 to execute the process at Step S423. After the process at Step S423 is completed, the process advances to Step S424.

At Step S424 the random number generation section 1181 is controlled by the control section 1131, and generates a random number having the number of bits (corresponding to the time slot number set at Step S423) designated by the control section 1131. Namely, the control section 1131 designates the number of bits in accordance with the control information for setting the time slot number.

The random number generation section 1181 supplies the generated random number to the control section 1131 to thereafter advance the process to Step S425. At Step S425 the control section 1131 sets "0" to the process object time slot number representative of the number of (present) time slots in which the bit unit ID response process is executed, to thereafter advance the process to Step S426.

At Step S426 the control section 1131 judges whether the process object time slot number is coincident with the value of the random number (random number value) generated by the random number generation section 1181. If it is judged that the process object time slot number is coincident with the random number value (i.e., the present time slot is assigned to the ID response process), the control section 1131 advances the process to Step S427. At Step S427 the bit unit control ID response processing section 1133 executes the bit unit control ID response process in a manner described with reference to the flow chart of FIG. 41. Namely, the bit unit control ID response processing section 1133 transmits the ID response to the reader/writer 1001 in the present time slot under control of a bit unit of ID. As the bit unit control ID response process is completed, the bit-unit control ID response processing section 1133 advances the process to Step S428.

If it is judged at Step S426 that the process object time slot number does not coincide with the random number and the present time slot is not assigned to the ID response process, then the control section 1131 omits the bit unit control ID response process at Step S427, and advances the process to Step S428 after a lapse of a normal ID response wait time.

At Step S428 the control section 1131 judges whether the processes are completed for all time slots. If it is judged that the process object time slot number does not reach the maximum number (the number of prepared time slots) and the processes are not completed for all time slots, the control section 1131 advances the process to Step S429 whereat the value of the process object time slot number is incremented by "1". After the process at Step S429 is completed, the control section 1131 returns the process to Step S426 to repeat the following processes. Namely, the control section 1131 controls each section to repeat the processes at Steps S426 to S429 until the processes regarding the ID response are completed for all time slots.

If it is judged at Step S428 that the process object time slot number reaches the maximum number (the number of prepared time slots) and the processes are completed for all time slots, the control section 1131 advances the process to Step S430 whereat the bit unit control ID response processing section 1133 is controlled to judge whether a collision occurred in the bit unit control ID response process executed at Step S427 by the bit unit control ID response processing section 1133.

If it is judged that a collision occurred, the control section 1131 advances the process to Step S431. The TS number control section 1202 is controlled by the control section 1131, and makes settings in accordance with a predetermined algorithm in such a manner that the number of time slots in the next cycle is increased. This algorithm is shared with the reader/writer 1001, and the settings of the time slot number are always the same as those of the reader/writer 1001.

After the time slot number is set, the TS number control section 1202 terminates the ID response request responding process.

If it is judged at Step S430 that a collision does not occur, the control section 1131 advances the process to Step S432 whereat the settings of the time slot number are initialized in accordance with a predetermined algorithm, by deleting the control information held by the control section 1131 or by other methods. After the initialization is completed, the TS number control section 1202 terminates the ID response request responding process. If it is judged at Step S422 that the ID response request is not acquired, the ID response request responding section 1132 terminates the ID response request responding process.

As described above, the reader/writer 1001 and UDs 1002 to 1004 (i.e., communication system 1000) can suppress a delay in the communication process to be caused by unnecessary time slots and can suppress the communication process speed from being lowered, because the number of time slots for the ID response process is controlled in correspondence with a collision occurrence.

In the foregoing, the TS number control section 1202 may control the time slot number in the next cycle in a probability manner. Namely, the TS number control section 1202 generates control information for making settings of the time slot number by the TS number setting section 1201 in a probability manner. For example, the TS number control section 1202 generates the control information for setting a probability (N %) for making the TS number setting section 1201 increase the time slot number in the next cycle more than the present time slot number. In accordance with weighting in the control information, the TS number setting section 1201 sets the TS number randomly. Namely, in this case, the TS number setting section 1201 makes settings in such a manner than the time slot number in the next cycle increased more than the present time slot number at a probability of N %.

Conventionally, the time slot number is fixed to four (a random number has two bits). By setting the time slot number to two (a random number has one bit), the communication system can suppress the communication process speed from being lowered.

Figure 55:
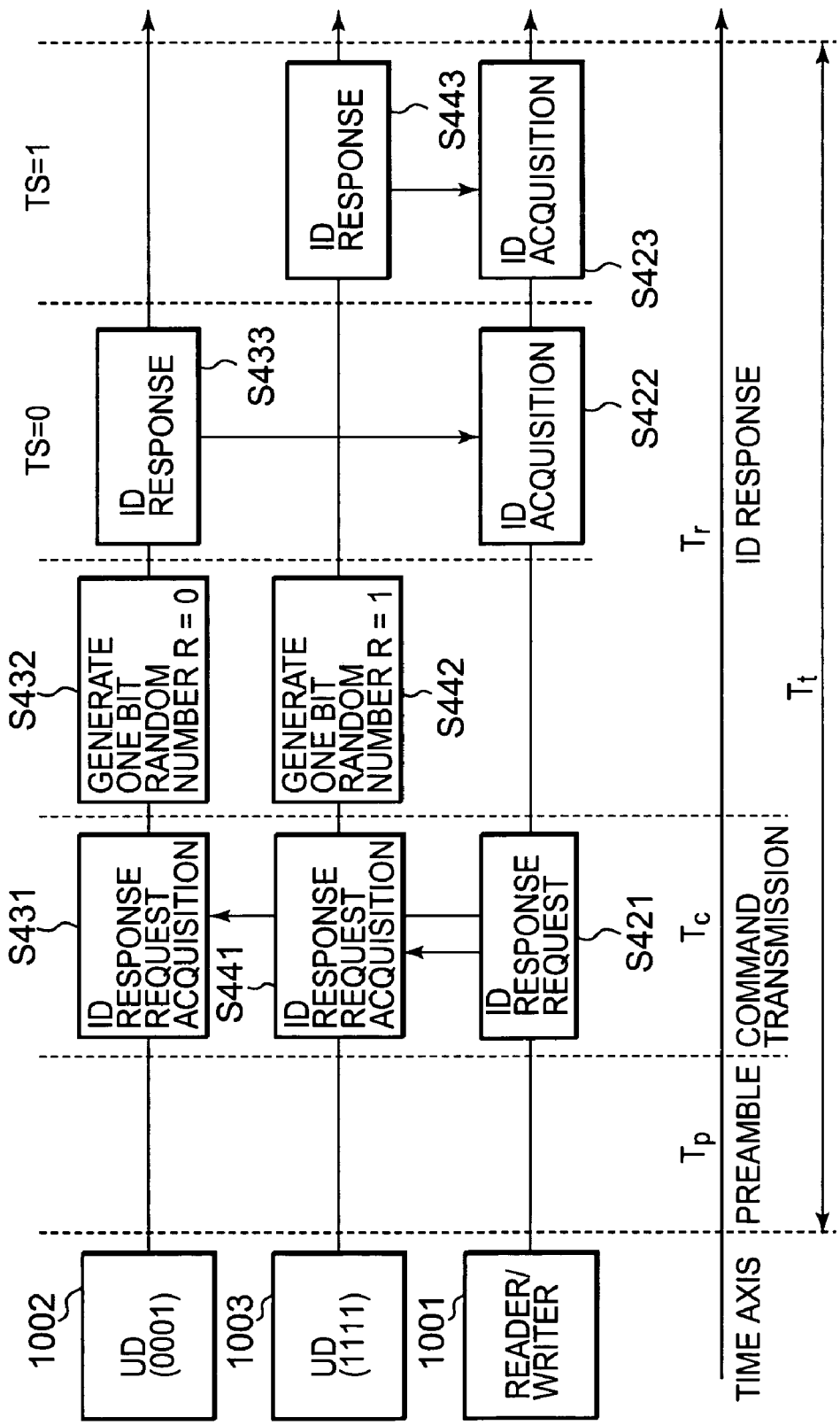
FIG. 55 is a flow chart illustrating still another example of the identification information acquisition process.

FIG. 55 is a timing chart illustrating another ID transmission/reception method for the communication system shown in FIG. 1. As shown in FIG. 55, a process time for a signal transfer (ID transmission/reception) is constituted of a Preamble time (Tp) for distinguishing from the previous cycle; a Command transmission time (Tc) taken to transmit a command; and an ID response time (Tr) taken to return an ID. In this case, the ID response time Tr changes with a random number value, and becomes Tr/4 for R=0 and Tr×(i+1)/4 for R=i (i is a natural number).

First, description will be made on the case in which the time slot number is 4 (2-bit random number). In this case, if there is one UD (device) communicable with the reader/writer 1001, an average response time is given by the following formula (25):

$$Ta = Tp + Tc + Tr \times 5/8 \quad (25)$$

The last term (Tr×5/8) of the formula (25) is an average value (Trm) of Tr taking one of the values from Tr/4 to Tr, and this average value is calculated by the following formula (26):

$$Trm = \{1/4 + 2/4 + 3/4 + 4/4\} \times Tr/4 \quad (26)$$

Consider next there are two UDs (devices) communicable with the reader/writer 1001.

An average process time (average response time) when the process is completed at the i-th time is represented by Ti, and a process time of one cycle is represented by Tt (i.e., Tt=Pt+Tc+Tr). An average process time when the process is completed at the first time (i=0) is calculated by the following formula (27):

$$T1 = Tp + Tc + Tr \times 5/16 \quad (27)$$

Consider the last term of the formula (27) in terms of a random number. If a combination of values (0 to 3) of two-bit random numbers generated by two devices (UDs 1002 and 1003) is one of, e.g., (0,1), (0,2), (0,3), (1,0), (2,0) and (3,0), the reader/writer 1001 can receive a response in Tr/4 time. If a combination of two random number values is one of (1, 2), (1,3), (2,1) and (3,1), the reader/writer 1001 can receive a response in Tr×2/4 time. If a combination of two random number values is one of (2,3) and (3,2), the reader/writer 1001 can receive a response in Tr×3/4 time. Therefore, the average response time Trm which is an average of Tr is calculated by the following formula (28):

$$6/16 \times Tr/4 + 4/16 \times Tr \times 2/4 + 2/16 \times Tr \times 3/4 = Tr \times 5/16 \quad (28)$$

For example, if the combination of two random number values is one of (0,0), (1,1), (2,2) and (3,3), a collision occurs. A collision occurrence probability is therefore 1/16=1/4.

Similarly, an average process time T2 when the process is completed at the second time is calculated by the following formula (29):

$$T2 = Tt + Tp + Tc + Tr \times 5/16 = Tt + T1 \quad (29)$$

Similarly, an average process time T3 when the process is completed at the third time is calculated by the following formula (30):

$$T3 = Tt \times 2 + Tp + Tc + Tr \times 5/16 = Tt \times 2 + T1 \quad (30).$$

Therefore, an average process time Ti when the process is completed at the i-th time is calculated by the following formula (31):

$$Ti = Tt \times (i-1) + Tp + Tc + Tr \times 5/16 = Tt \times (i-1) + T1 \quad (31)$$

The average process time Ta can therefore be given by the following equation (32). In the formula (32), "3/4" indicates a probability of no collision, and "(1/4)^i" indicates a probability that a collision occurs i times consecutively.

$$Ta = (T1 \times 3/4) + 1/4 \times (T2 \times 3/4) + (1/4)^2 \times (T3 \times 3/4) + \ldots \\
+ (1/4)^{(i-1)} \times (Ti \times 3/4) + \ldots = 3/4 \{T1 + (Tt + T1) \times 1/ \\
4 + (2Tt + t1) \times (1/4)^2 + \ldots\} = 3/4 fT1 \{1 + 1/4 + (1/4) \\
^2 + \ldots\} + Tt \{1/4 + 2 \times (1/4)^2 + \ldots + 1 \times (i/4)^j + \ldots \\
\} ] \quad (32)$$

A variable Sn given by the following formula (33) is incorporated:

$$Sn=1/4+2\times(1/4)^2+\ldots+j\times(1/4)^j+\ldots+n\times(1/4)^n \quad (33)$$

The following formula (34) is obtained from the formula (33):

$$1/4 Sn=1\times(1/4)^2+\ldots+(j-1)\times(1/4)^j+\ldots+(n-1)\times(1/4)^n+n\times(1/4)^{(n+1)} \quad (34)$$

The following formula (35) is obtained from the formulas (33) and (34):

$$Sn-1/4 Sn=3/4 Sn=1/4+(1/4)^2+\ldots+(1/4)^j+\ldots+(1/4)^n-n\times(1/4)^{(n+1)} \quad (35)$$

If the value of the variable n in the formula (35) is made infinite (n→∞), the value of the last term of the right side of the formula (35) is "0". Namely, 3/4Sn=4/3 and Sn=16/9.

The average process time Ta can therefore be calculated from the following formula (36).

$$Ta=3/4\{T1\times 4/3+Tr\times 16/9\}=T1+Tr\times 4/3=Tp\times 7/3+Tc\times 7/3+Tr\times 79/48 \quad (36)$$

Next, description will be made on the case in which a random number has one bit.

In FIG. 55, UDs 1001 and 1003 are communicable with the reader/writer 1001. The random number is set to one bit (the number of time slots is two). At Step S421 the reader/writer 1001 transmits an ID response request through broadcasting, and UDs 1002 and 1003 acquire the ID response request at Steps S431 and S441, respectively. As the ID response request is acquired, UDs 1002 and 1003 generate a random number of one bit at Steps S432 and S442, respectively. In the example shown in FIG. 55, UD 1002 generates a random number (R=0) having a value of "0" and UD 1003 generates a random number (R=1) having a value of "1".

As shown at Step S433, UD 1002 returns an ID response in the first time slot (T=0) in accordance with the random number value. At Step S422 the reader/writer 1001 acquires this ID. As shown at Step S443, UD 1003 returns an ID response in the second time slot (T=1). At Step S423 the reader/writer 1001 acquires this ID. In this manner, as each UD returns an ID response in a different time slot, a collision will not occur.

Next, description will be made on a process time in this case (a random number bit length is one bit).

Similar to the above-described two-bit random number, an average process time when the process is completed at the first time i=1) is calculated from the following formula (37):

$$T1=Tp+Tc+Tr\times 1/4 \quad (37)$$

One time slot time is Tr/4. Namely, the ID response time Tr is Tr/4×2=Tr/2 at the maximum. Since only two time slots exist if the random number is one bit, the reader/writer 1001 can receive ID necessarily in Tr/4 if a collision does not occur.

An average process time T2 when the process is completed at the second time (i=2) is calculated from the following formula (38):

$$T2=(Tp+Tc+Tr/2)+Tp+Tc+Tr\times 1/4=Tt'+T1 \quad (38)$$

Tt' is a process time of one cycle in this case. Namely, Tt'=Tp+Tc+Tr/2. The ID response time in Tt' is a half as compared to the process time Tr of one cycle for the two-bit random number.

Similarly, an average process time T3 when the process is completed at the third time (i=3) is calculated from the following formula (39):

$$T3=Tt'\times 2+Tp+Tc+Tr\times 1/4=Tt'\times 2+T1 \quad (39)$$

The average process time Ta can therefore be given by the following formula (40). In the formula (40), "1/2" indicates a probability of no collision, and "(1/2)^i" indicates a probability that a collision occurs i times consecutively.

$$Ta=(T1\times 1/2)+1/2\times(T2\times 1/2)+(1/2)^2\times(T3\times 1/2)+\ldots$$
$$+(\text{a probability that a collision occurs } (i-1) \text{ times consecutively})\times(Ti\times(1/2))+\ldots=1/2\{T1+(Tt'+T1)\times 1/2+(2Tt'+T1)\times(1/2)^2+\ldots\}=1/2\{T1\{1+1/2+(1/2)^2+\ldots\}+Tt'\{1\times 1/2+2\times(1/2)^2+\ldots+j\times(1/2)^j+\ldots\}\}=1/2\{T1\times 2+Tt'\times 2\}=T1+Tt'=2Tp+2Tc+Tr\times 3/4 \quad (40)$$

A difference value between the average process time Ta1 in the case in which a random number bit length is one bit and the average process time Ta2 described above in which a random number bit length is two bits, is given by the following formula (41):

$$Ta2-Ta1=(Tp\times 7/3+Tc\times 7/3+Tr\times 79/48)-(2Tp+2Tc+Tr\times 3/4)=Tp/3+Tc/3+Tr\times 43/48 \quad (41)$$

The process time for the two-bit length is longer than that for the one-bit length. Assuming that a probability for the user having two UDs (devices) is 10%, and that for the user having only one UD is 90%, the average time Ta2' for the two-bit length is calculated from the following formula (42):

$$Ta2'=(Tp+Tc+Tr\times 5/8)\times 0.9+(Tp\times 7/3+Tc\times 7/3+Tr\times 79/48)\times 0.1 \quad (42)$$

Similarly, the average time Ta1' for the one-bit length is calculated from the following formula (43):

$$Ta1'=(Tp+Tc+Tr\times 1/4)\times 0.9+(2Tp+2Tc+Tr\times 3/4)\times 0.1 \quad (43)$$

From the formulas (42) and (43), a difference value between the average time Ta2' for the two-bit length and the average time Ta1' for the one-bit length can be calculated from the following formula (44)

$$Ta2'-Ta1'=Tp/30+Tc/30+Tr\times 205/480 \quad (44)$$

Tp, Tc and Tr are estimated. For example, assuming that a command length is four bytes and ID is four bytes, the ID response time Tr for the random number bit length of two bits requires a time corresponding to 32 bytes for four time slots. If Tc=20 ms, Tr is 80 ms or longer. Assuming that there is some margin, Tr is assumed to be 100 ms, and Tp is assumed to be 10 ms. By substituting each value in the formula (44), the formula (44) can be represented by the following formula (45):

$$Ta2'-Ta1'=10/30+20/30+100\times 205/480=43.7(ms). \quad (45)$$

The process time therefore becomes overwhelmingly long for the two-bit length bit. It is therefore preferable to set the time slot number to two bits (one bit length of a random number), in accordance to an advantageous state of the number of portable devices actually owned.

Figure 56:
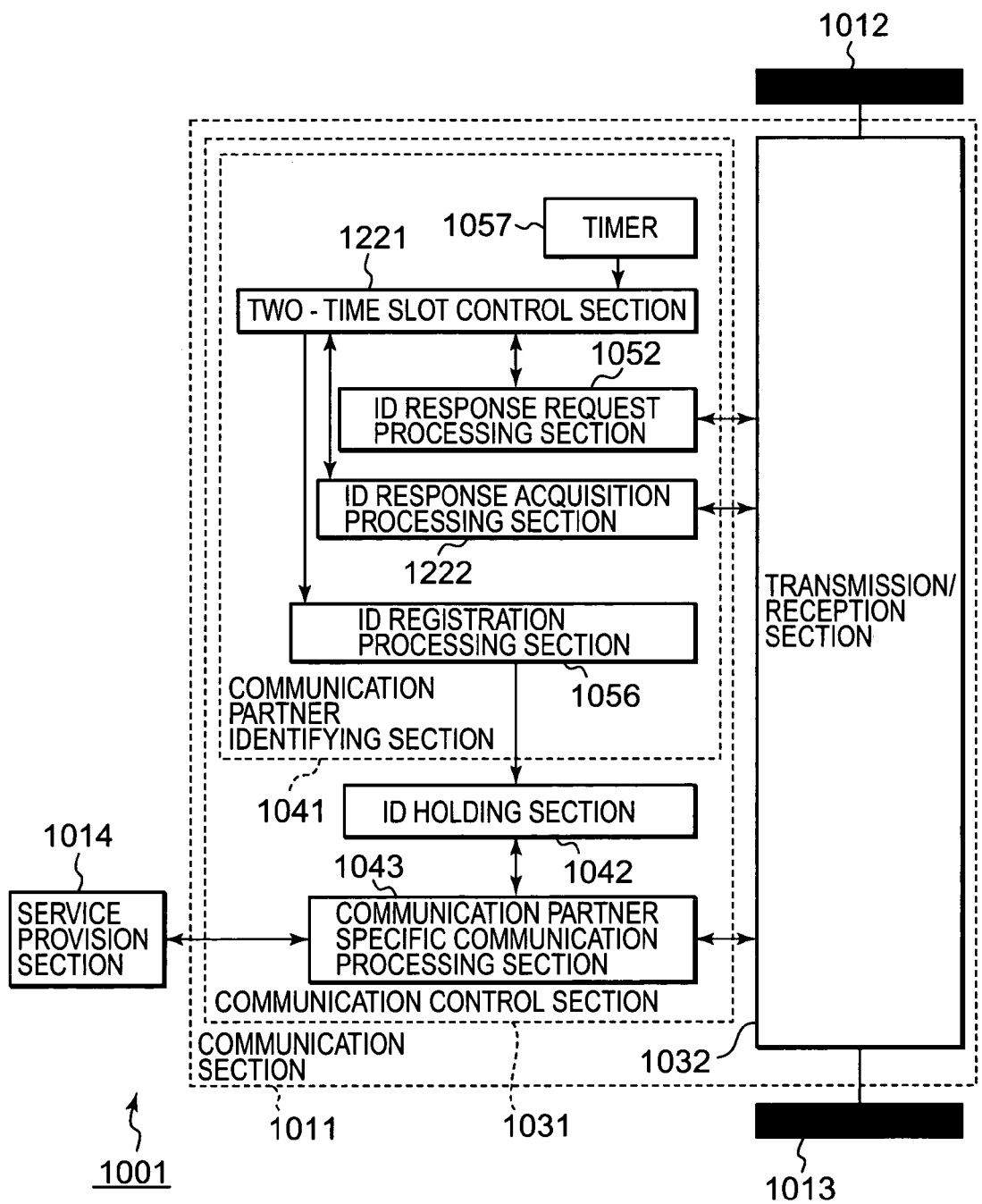
FIG. 56 is a block diagram showing still another example of the structure of the reader/writer shown in FIG. 34.

FIG. 56 is a block diagram showing an example of the internal structure of the reader/writer 1001 in which the time slot number is two bits (one-bit length of a random number).

In FIG. 56, although the communication partner identifying section 1041 of the reader/writer 1001 has fundamentally the structure similar to that shown in FIG. 36, the communication partner identifying section has a two-time slot control section 1221 in place of the control section 1051 shown in FIG. 36, and an ID response acquisition processing section 1222 in place of the ID response acquisition processing-section 1053, collision judgment section 1054 and value setting section 1055 shown in FIG. 36. The other structures are similar to those shown in FIG. 36, and the description thereof is omitted.

The two-time slot control section 1221 controls the ID response request processing section 1052, ID response acquisition processing section 1222 and ID registration processing section 1056 in accordance with the time information supplied from the timer 1057, and sets the time slot number to "2" to execute the control process regarding ID acquisition. In accordance with the time slot number setting to "2", the ID response acquisition processing section 1222 executes a process regarding ID response acquisition.

Figure 57:
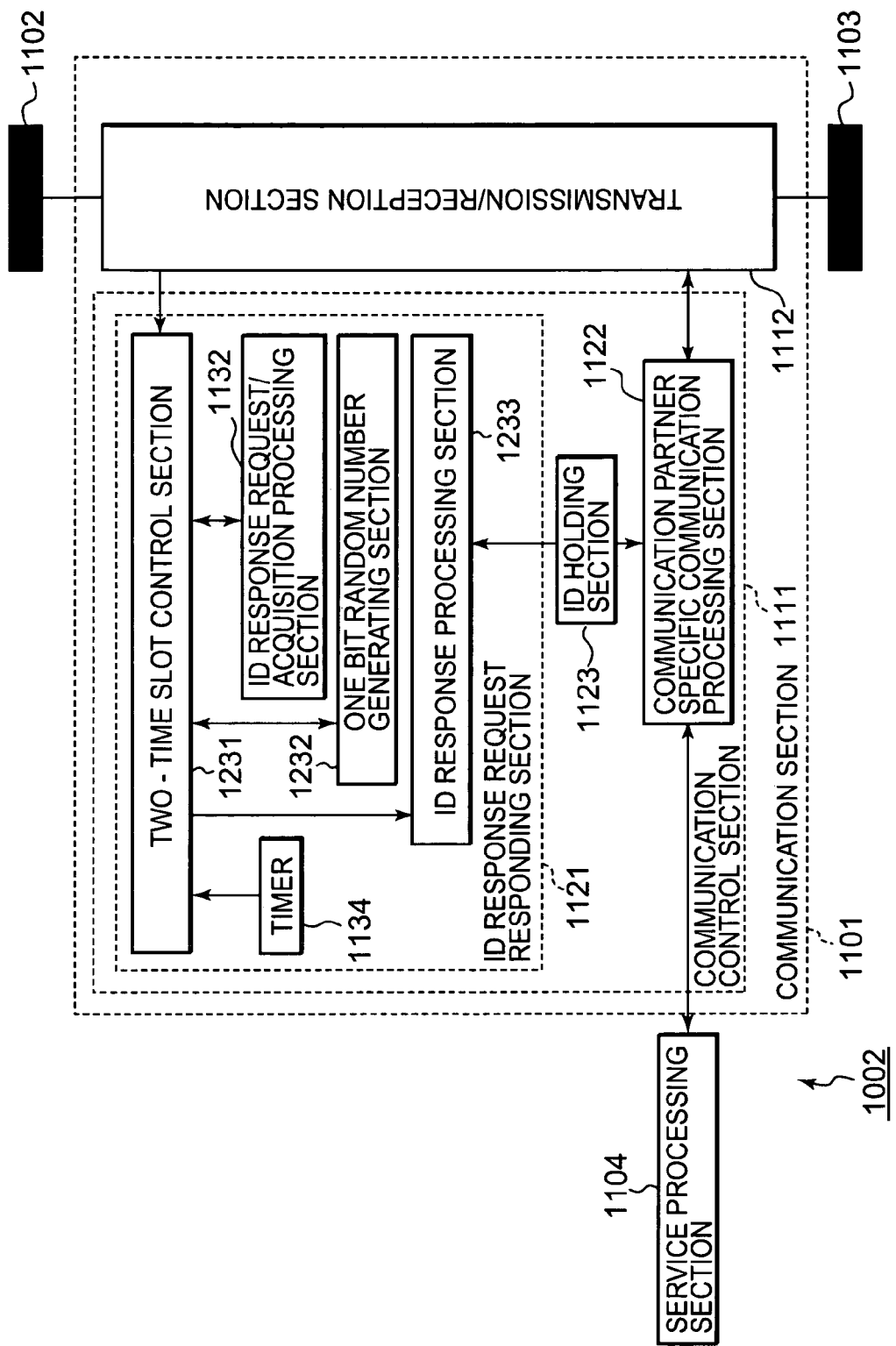
FIG. 57 is a block diagram showing still another example of the structure of UD shown in FIG. 34.

FIG. 57 is a block diagram showing an example of the internal structure of UD 1002 in this case.

As shown in FIG. 57, the ID response request responding section 1121 of UD 1002 in this case has a two-time slot control section 1231 in place of the control section 1131 shown in FIG. 37, and a one-bit random number generation section 1232 and an ID response processing section 1233 in place of the bit unit control ID response processing section 1133.

The two-time slot control section 1231 sets the time slot number to "2", and controls the ID response request acquisition processing section 1132, one-bit random number generation section 1232 and ID response processing section 1233 in accordance with the time information supplied from the timer 1134 to execute the control process regarding ID response request responding.

The one-bit random number generation section 1232 is controlled by the two-time slot control section 1231, generates an one-bit random number to be used for determining a time slot to output an ID response, and supplies the one-bit random number to the two-time slot control section 1231. The ID response processing section 1233 is controlled by the two-time slot control section 1231, and controls the transmission/reception section 1112 to transmit an ID response to the reader/writer in the time slot corresponding to the random number generated by the one-bit random number generation section 1232.

The structure of UD 1003 is similar to that of UD 1002, and the above description is applicable. The description thereof is therefore omitted.

Figure 58:
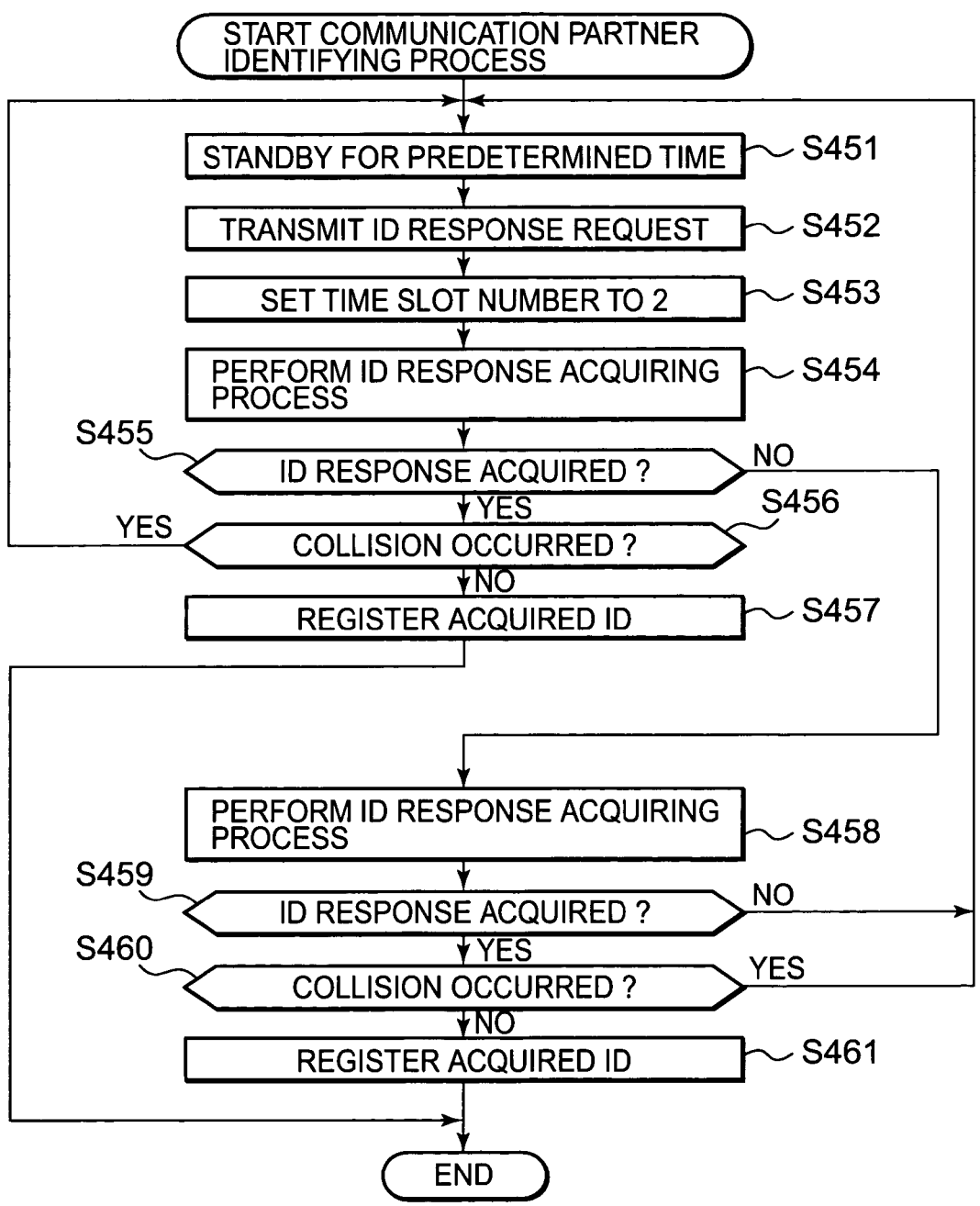
FIG. 58 is a flow chart illustrating still another example of the communication partner identifying process.

Next, with reference to the flow chart of FIG. 58, description will be made on an example of the flow of the communication partner identifying process to be executed by the reader/writer 1001 when there are two time slots.

At Step S451 the two-time slot control sections 1221 stands by for a predetermined time in accordance with time information supplied from the timer 1057. At Step S452 the ID response request processing section 1052 transmits an ID response request through broadcasting. At Step S453 the two-time slot control section 1221 sets the time slot number to "2".

At Step S454 the ID response acquisition processing section 1222 is controlled by the two-time slot control section 1221, executes the ID response acquisition process for the first time slot (TS=0), and judges at Step S455 whether the ID response is acquired. If it is judged that the ID response is acquired, the ID response acquisition processing section 1222 supplies the acquired ID response to the two-time slot control section 1221 to thereafter advance the process to Step S456. At Step S456 the two-time slot control section 1221 judges whether a collision occurred in the ID response. If it is judged that a collision does not occur, ID contained in the ID response is supplied to the ID registration processing section 1056 to thereafter advance the process to Step S457. At Step S457 the ID registration processing section 1056 is controlled by the two-time slot control section 1221, and registers the acquired ID (supplies the acquired ID to the ID holding section 1042 to be held therein). After ID is registered, the ID registration processing section 1056 terminates the communication partner identifying press.

If it is judged at Step S456 that a collision occurred, the two-time slot control section 1221 returns the process to Step S451 to repeat the following processes as the next cycle.

If it is judged at Step S455 that an ID response is not acquired in the first time slot, the ID response acquisition processing section 1222 advances the process to Step S458 to conduct the process in the second time slot.

At Step S458 the ID response acquisition processing section 1222 is controlled by the two-time slot control section 1221, executes the ID response acquisition process for the second time slot (TS=1), and judges at Step S459 whether the ID response is acquired. If it is judged that the ID response is acquired, the ID response acquisition processing section 1221 supplies the acquired ID response to the two-time slot control section 1221 to thereafter advance the process to Step S460. At Step S460 the two-time slot control section 1221 judges whether a collision occurred in the ID response. If it is judged that a collision does not occur, ID contained in the ID response is supplied to the ID registration processing section 1056 to thereafter advance the process to Step S461. At Step S461 the ID registration processing section 1056 is controlled by the two-time slot control section 1221, and registers the acquired ID (supplies the acquired ID to the ID holding section 1042 to be held therein). As ID is registered, the ID registration processing section 1056 terminates the communication partner identifying process.

If it is judged at Step S459 that the ID response is not acquired in the second time slot, the ID response acquisition processing section 1222 terminates the communication partner identifying process. If it is judged at Step S460 that a collision occurred, the two-time slot control section 1221 terminates the communication partner identifying process.

If it is judged at Step S459 that the ID response is not acquired, or if it is judged at Step S460 that a collision occurred, the two-time slot control section 1221 returns the process to Step S451 to repeat the following processes as the next cycle.

Figure 59:
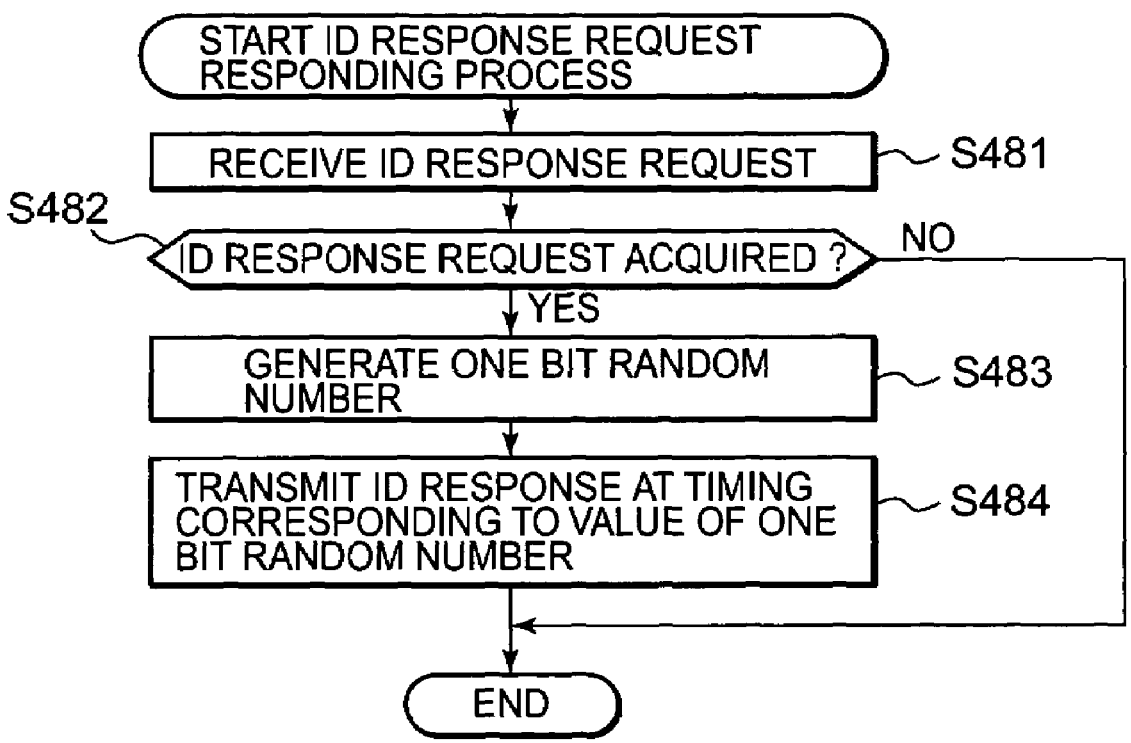
FIG. 59 is a flow chart illustrating still another example of the communication partner identifying process.

Next, with reference to the flow chart shown in FIG. 59, description will be made on the flow of the ID response request responding process to be executed by UDs 1002 and 1003 in correspondence with the communication partner identifying process. In the following, description is limited only to the case UD 1002 executes this process. Since UDs 1002 and 1003 execute similar processes, the description of the process to be executed by UD 1003 is omitted because the description is duplicated with that of UD 1002.

As the ID response request responding process starts, at Step S481 the ID response request acquisition processing section 1132 receives an ID response request, and if the ID response request is acquired, supplies the ID response request to the two-time slot control section 1231. At Step S482, the two-time slot control section 1231 judges whether the ID response request is acquired, to thereafter advance the process to Step S483.

At Step S383 the one-bit random number generation section 1232 generates one-bit random number having a bit length of one bit, and supplies the random number to the two-time slot control section 1231. In accordance with the value of the one-bit random number, the two-time slot control section 1231 controls the ID response processing section 1233 to execute the ID response process. Under the control by the two-time slot control section 1231, at Step S484 the ID response processing section 1233 transmits an ID response at the timing corresponding to the value of the on-bit random number. As the ID response transmission is completed, the ID response processing section 1233 terminates the ID response request responding process.

If it is judged at Step S482 that the ID response request is not acquired, the two-time slot control section 1231 terminates the ID response request responding process.

As described above, the reader/writer 1001 and UDs 1002 and 1003 (i.e., communication system 1000) can shorten an average process time considering also a collision occurrence, more than a conventional average process time and can suppress the communication process speed from being lowered, by reducing the random number bit length to one bit from conventional two bits and reducing the time slot number to "2" from conventional "4".

The present invention described with reference to FIGS. 34 to 59 is also applicable to other systems in addition to the communication system 1000 shown in FIG. 34.

Figure 60A:
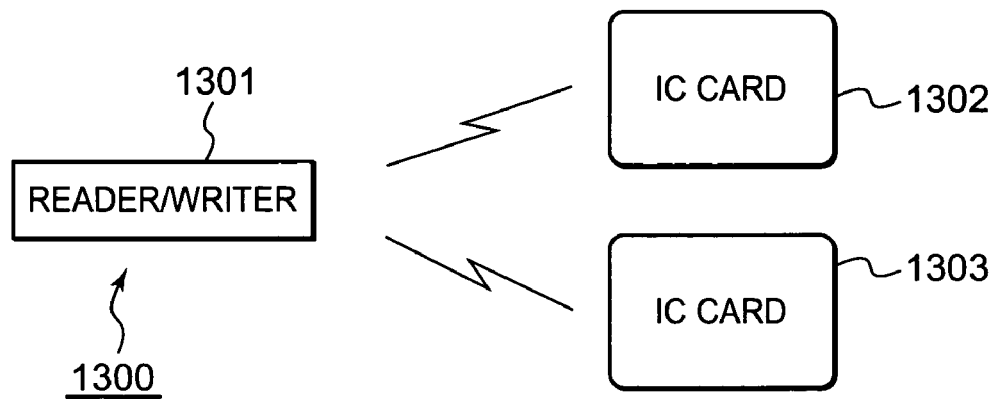
FIG. 60A is a diagram illustrating an example of the structure of a non-contact type IC card communication system, consistent with the present invention.

For example, as shown in FIG. 60A, the present invention may be applied to a non-contact type IC card system constituted of a reader/writer and IC cards. In the example shown in FIG. 60A, the non-contact type IC card system 1300 has a reader/writer 1301 for reading/writing information relative to a non-contact type IC card and non-contact type IC cards 1302 and 1003. By applying the present invention, the non-contact type IC card system 1300 can suppress a delay to be caused by a collision occurring during short distance wireless communications between the reader/writer 1301 and IC card 1302 and 1303, and can suppress the communication process speed from being lowered.

Figure 60B:
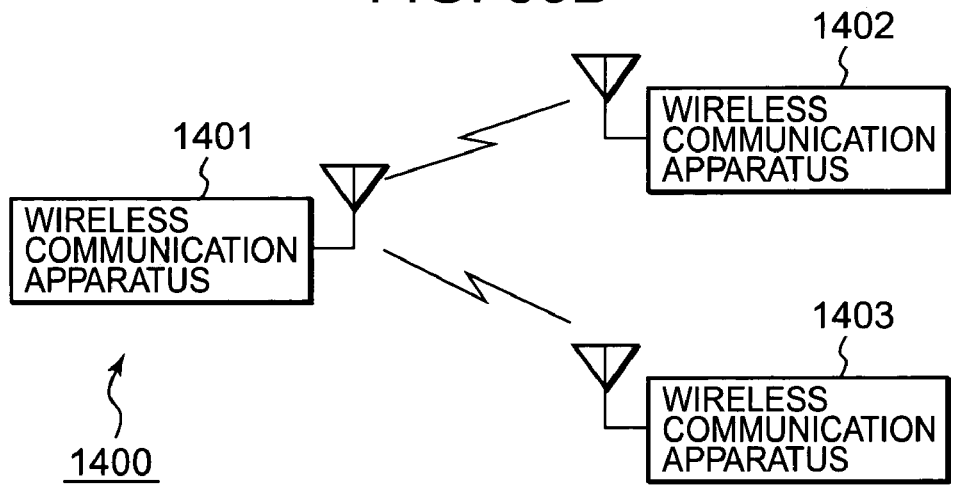
FIG. 60B is a diagram illustrating an example of a wireless communications system having a wireless communications apparatus, consistent with the present invention.

Further, for example, as shown in FIG. 60B, the present invention may be applied to a wireless communication system having wireless communication apparatus. In the example shown in FIG. 60B, the wireless communication system 1400 has three wireless communication apparatus 1401 to 1403. By applying the present invention, the wireless communication system 1400 can suppress a delay to be caused by a collision occurring during wireless communications among the apparatus and can suppress the communication process speed from being lowered.

Figure 60C:
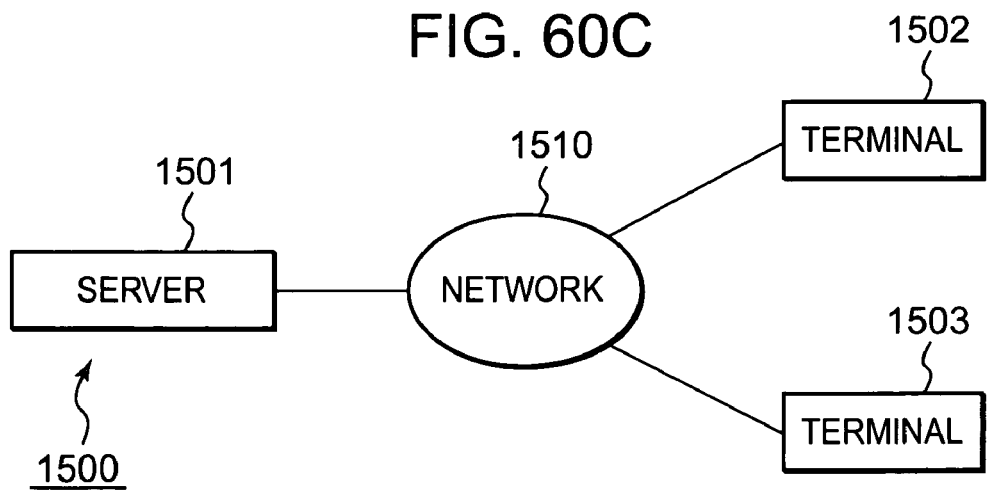
FIG. 60C is a diagram illustrating a network system connection by wired lines consistent with the present invention.

Furthermore, for example, as shown in FIG. 60C, the present invention may be applied to a network system connected by wired lines (network). In the example shown in FIG. 60C, the network system 1-500 has a server 1501, terminals 1502 and 1503 typically personal computers and a network 1510 typically the Internet. The terminals 1502 and 1503 are connected to the server 1501 via the network 1510. By applying the present invention, the network system 1500 can suppress a delay to be caused by a collision occurring during communications such as searching a terminal from the server 1501 and can suppress the communication process speed from being lowered.

A series of processes described above may be executed by hardware or software. In this case, the apparatus described above may be constituted of a personal computer such as shown in FIG. 61.

In FIG. 61, a central processing unit (CPU) 1601 of a personal computer 1600 executes various processes in accordance with programs stored in a read only memory (ROM) 1602 or programs loaded in a random access memory 1603 from a storage section 1613. Data and the like necessary for CPU 1601 to execute various processes are stored in RAM 1603 when appropriate.

CPU 1601, ROM 1602 and RAM 1603 are interconnected by a bus 1604. An input/output interface 1610 is also connected to the but 1604.

Connected to the input/output interface 1610 are an input section 1611 made of a keyboard, a mouse and the like, an output section 1612 made of a display such as a cathode ray tube (CRT) and a liquid crystal display (LCD) and a speaker, a storage section 1613 made of a hard disc or the like, and a communication section 1614 made of a modem or the like. The communication section 1614 performs a communication process via a network including the Internet.

A drive 1615 is also connected to the input/output interface 1610 when necessary. Removable media 1621 such as a magnetic disk, an optical disc, a magnetic optical disc and a semiconductor memory are mounted on the drive. Programs read from the removable media are installed in the storage section 1613 when necessary.

When the series of processes described above is executed by software, programs constituting the software are installed from a network or a recording medium.

For example, as shown in FIG. 61, the recording medium may be constituted of not only the removable media 1621 including a magnetic disk (including a flexible disk), an optical disc (including a compact disk-read only memory (CD-ROM), a digital versatile disk (DVD) and a semiconductor memory, respectively recording programs and distributed for distributing programs to users separately from the apparatus main body, but also ROM 1602 and the hard disk included in the storage section 1613, respectively recording programs and distributed to users in a state assembled in the apparatus main body in advance.

In this specification, steps describing the program provided by a recording medium contain not only a process to be executed time sequentially in the order of written statements but also a process to be executed parallel or independently without being processed time sequentially.

In this specification, a system is the whole apparatus constituted of a plurality of apparatuses. The structure described as one apparatus in the foregoing may be divided to realize the apparatus by using a plurality of apparatus. Conversely, the structure described as a plurality of apparatus in the forgoing may be collected to realize a single apparatus. It is obvious that other structures may be added to the structure of each apparatus. Further, if the structure and operation of the whole system are substantially the same, some of the structure of an apparatus may be contained in the structure of another apparatus.

The present invention contains subject matter related to Japanese Patent Application JP 2005-178427 filed in the Japanese Patent Office on Jun. 17, 2005, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication system, comprising:
 a first communication apparatus for transmitting a first signal on a communication medium; and
 a second communication apparatus, comprising:
  a transmitter for transmitting a second signal on the communication medium;
  a detector for detecting the first signal on the communication medium at the time the second signal is transmitted;
  signal collision judgment means for judging, by comparing a bit of the first signal to a bit of the second signal, whether a signal collision occurs on the communication medium; and
  control means for controlling transmission of the second signal in response to a judgment that a signal collision has occurred, the controlling comprising:

when the compared bit of the second signal is a first value, controlling the transmitter to continue transmission of the second signal; and when the compared bit of the second signal is a second value, controlling the transmitter to terminate transmission of the second signal.

2. A first communication apparatus for transmitting a first signal to a second communication apparatus via a communication medium, the first communication apparatus comprising:

a transmitter for transmitting the first signal to the second communication apparatus via the communication medium;

a detector for detecting a second signal on the communication medium at the time the first signal is transmitted;

signal collision judgment means for judging, by comparing a bit of the first signal to a bit of the second signal, whether a signal collision occurs on the communication medium; and control means for controlling transmission of the first signal in response to a judgment that a signal collision has occurred, the controlling comprising:

when the compared bit of the first signal is a first value, controlling the transmitter to continue transmission of the first signal; and when the compared bit of the first signal is a second value, controlling the transmitter to terminate transmission of the first signal.

3. The first communication apparatus according to claim 2, wherein the detector detects the second signal on the communication medium each time one bit of the transmission signal is transmitted.

4. The first communication apparatus according to claim 2, wherein if the compared bit of the first signal is different than the compared bit of the second signal, the signal collision judgment means judges that a signal collision has occurred.

5. The first communication apparatus according to claim 2, wherein if the signal collision judgment means judges that a signal collision has occurred, the control means further controls a subsequent timing at which the first signal is transmitted, in accordance with a value of the compared bit of the first signal at the time the signal collision occurred.

6. The first communication apparatus according to claim 5, wherein the control means adjusts the transmission timing of the first signal if the value of the compared bit of the first signal is a predetermined value.

7. The first communication apparatus according to claim 2, wherein if the signal collision judgment means judges that a signal collision has occurred, the control means increases the number of transmission time slots for a subsequent transmission of the first signal.

8. The first communication apparatus according to claim 2, wherein the transmitter transmits the first signal in one of two predetermined time slots.

9. A method of a first communication apparatus for transmitting a first signal to a second communication apparatus via a communication medium, the method comprising:

transmitting the first signal to the second communication apparatus via the communication medium;

detecting a second signal on the communication medium at the time the first signal is transmitted;

judging, by comparing a bit of the first signal to a bit of the second signal, whether a signal collision has occurred on the communication medium; and controlling transmission of the first signal in response to a judgment that a signal collision has occurred, the controlling comprising:

when the compared bit of the first signal is a first value, continuing transmission of the first signal; and when the compared bit of the first signal is a second value, terminating transmission of the first signal.

10. A computer-readable storage medium storing a computer program which, when executed by a first communication apparatus, causes the first communication apparatus to perform a method for transmitting a first signal to a second communication apparatus via a communication medium, the method comprising:

transmitting the first signal to the second communication apparatus via the communication medium;

detecting a second signal on the communication medium at the time the first signal is transmitted;

judging, by comparing a bit of the first signal to a bit of the second signal, whether a signal collision has occurred on the communication medium; and controlling transmission of the first signal in response to a judgment that a signal collision has occurred, the controlling comprising:

when the compared bit of the first signal is a first value, continuing transmission of the first signal; and when the compared bit of the first signal is a second value, terminating transmission of the first signal.

* * * * *